United States Patent
Fertik et al.

(10) Patent No.: US 11,205,398 B2
(45) Date of Patent: Dec. 21, 2021

(54) EVALUATING AND REDUCING MYOPIAGENIC EFFECTS OF ELECTRONIC DISPLAYS

(71) Applicant: WaveShift LLC, Palo Alto, CA (US)

(72) Inventors: Michael Benjamin Selkowe Fertik, Menlo Park, CA (US); Thomas W. Chalberg, Jr., Menlo Park, CA (US)

(73) Assignee: WaveShift LLC, Palo Alto, CA (US)

( * ) Notice: Subject to any disclaimer, the term of this patent is extended or adjusted under 35 U.S.C. 154(b) by 0 days.

(21) Appl. No.: 16/798,955

(22) Filed: Feb. 24, 2020

(65) Prior Publication Data

US 2020/0265796 A1    Aug. 20, 2020

Related U.S. Application Data

(63) Continuation of application No. 16/070,771, filed as application No. PCT/US2017/013990 on Jan. 18, 2017, now Pat. No. 10,621,948.

(Continued)

(51) Int. Cl.
*G09G 5/02*     (2006.01)
*G06F 3/0483*     (2013.01)
(Continued)

(52) U.S. Cl.
CPC .............. *G09G 5/02* (2013.01); *G06F 3/0483* (2013.01); *G06F 3/04842* (2013.01);
(Continued)

(58) Field of Classification Search
CPC ............. G09G 5/02; G09G 2320/0242; G09G 2320/0271; G09G 2320/066;
(Continued)

(56) References Cited

U.S. PATENT DOCUMENTS

| | | |
|---|---|---|
| 3,524,976 A | 8/1970 | Wang |
| 4,183,050 A | 1/1980 | Tsuchiya et al. |

(Continued)

FOREIGN PATENT DOCUMENTS

| | | |
|---|---|---|
| CN | 101533635 A | 9/2009 |
| EP | 1469454 A2 | 10/2004 |

(Continued)

OTHER PUBLICATIONS

"Optimizing C++/Code optimization/Faster operations." Wikibooks. Published Aug. 26, 2016. Retrieved Aug. 13, 2020. Retrieved from the Internet: URL<https://en.wikibooks.org/w/index.php?title=Optimizing_C++/Code_optimization/Faster_Operations&oldid=3109657>. 6 pages.

(Continued)

*Primary Examiner* — Antonio A Caschera
(74) *Attorney, Agent, or Firm* — Fish & Richardson P.C.

(57) ABSTRACT

A system includes a full-color electronic display, an eye-tracking module arranged to track an eye of a viewer of the display during operation of the system, at least one programmable processor, and a machine-readable medium storing instructions that, when executed by the at least one programmable processor to perform operations, including: (i) assessing uncorrected image data with one or more image frames, including determining an initial color of pixels in an image frame; (ii) assessing, based on data from the eye-tracking module, a location on the display where the viewer's eye is looking; (iii) modifying a color of red pixels from its initial color to a modified red color based on the location of the pixel relative to the location on the display where the viewer's eye is looking and the initial color of the pixel; and (iv) displaying, on the display, the image frames in which the one or more pixels have the modified color and other pixels have their initial color.

17 Claims, 28 Drawing Sheets

Related U.S. Application Data

(60) Provisional application No. 62/279,954, filed on Jan. 18, 2016.

(51) Int. Cl.
    *G06F 3/0484*     (2013.01)
    *G06T 7/00*     (2017.01)
    *H04N 9/64*     (2006.01)

(52) U.S. Cl.
CPC ........ *G06F 3/04847* (2013.01); *G06T 7/0014* (2013.01); *G06T 2207/30041* (2013.01); *G09G 2320/0242* (2013.01); *G09G 2320/0271* (2013.01); *G09G 2320/066* (2013.01); *G09G 2320/0666* (2013.01); *G09G 2320/0693* (2013.01); *G09G 2320/08* (2013.01); *G09G 2340/06* (2013.01); *G09G 2354/00* (2013.01); *G09G 2380/08* (2013.01); *G09G 2380/14* (2013.01); *H04N 9/646* (2013.01)

(58) Field of Classification Search
CPC ... G09G 2320/0666; G09G 2320/0693; G09G 2320/08; G09G 2340/06; G09G 2354/00; G09G 2380/08; G09G 2380/14; G06F 3/0483; G06F 3/04842; G06F 3/04847; G06T 7/0014; G06T 2207/30041; H04N 9/646
See application file for complete search history.

(56) References Cited

U.S. PATENT DOCUMENTS

| | | | |
|---|---|---|---|
| 4,887,150 | A | 12/1989 | Chiba et al. |
| 5,673,422 | A | 9/1997 | Kawai et al. |
| 6,437,715 | B1 | 8/2002 | Cowlishaw |
| 7,471,843 | B2 | 12/2008 | Messing et al. |
| 9,490,880 | B1 | 11/2016 | Srinivas |
| 9,955,133 | B2 | 4/2018 | Neitz et al. |
| 10,587,853 | B2 | 3/2020 | Neitz et al. |
| 10,621,948 | B2 | 4/2020 | Fertik et al. |
| 2003/0025835 | A1 | 2/2003 | Segman |
| 2004/0008283 | A1 | 1/2004 | Yang et al. |
| 2004/0155854 | A1 | 8/2004 | Ma et al. |
| 2004/0263456 | A1 | 12/2004 | Miyachi et al. |
| 2005/0132087 | A1 | 6/2005 | Glinksi et al. |
| 2006/0227809 | A1 | 10/2006 | Miller |
| 2006/0267992 | A1 | 11/2006 | Kelley et al. |
| 2008/0069439 | A1 | 3/2008 | Kwak et al. |
| 2008/0152219 | A1 | 6/2008 | Ramanath et al. |
| 2008/0165291 | A1 | 7/2008 | Choi |
| 2008/0204471 | A1 | 8/2008 | Jaeger et al. |
| 2009/0092327 | A1 | 4/2009 | Chen |
| 2009/0154805 | A1 | 6/2009 | Cok et al. |
| 2009/0162029 | A1 | 6/2009 | Glen |
| 2009/0198752 | A1 | 8/2009 | Iorio |
| 2011/0018891 | A1 | 1/2011 | Peng et al. |
| 2011/0175925 | A1 | 7/2011 | Kane et al. |
| 2011/0205259 | A1 | 8/2011 | Hagood, IV |
| 2011/0279472 | A1 | 11/2011 | Lu et al. |
| 2011/0313058 | A1 | 12/2011 | Neitz et al. |
| 2013/0321663 | A1 | 12/2013 | Ohtsuka et al. |
| 2014/0055469 | A1 | 2/2014 | Liu et al. |
| 2014/0063347 | A1 | 3/2014 | Neitz et al. |
| 2014/0104304 | A1 | 4/2014 | Jaynes et al. |
| 2014/0285511 | A1 | 9/2014 | Hoshino |
| 2014/0361971 | A1 | 12/2014 | Sala |
| 2014/0368525 | A1 | 12/2014 | Faaborg et al. |
| 2015/0111782 | A1 | 4/2015 | Neitz et al. |
| 2015/0220503 | A1 | 8/2015 | Landau |
| 2015/0346817 | A1 | 12/2015 | Gallo et al. |
| 2016/0140913 | A1 | 5/2016 | Aragane |
| 2016/0270656 | A1 | 9/2016 | Samec et al. |
| 2017/0161882 | A1 | 6/2017 | Manituk et al. |
| 2017/0200296 | A1* | 7/2017 | Jones ............ G06F 40/58 |
| 2017/0205977 | A1 | 7/2017 | Fertik et al. |
| 2018/0225230 | A1 | 8/2018 | Litichever et al. |
| 2019/0035358 | A1 | 1/2019 | Fertik et al. |
| 2019/0057673 | A1 | 2/2019 | Fertik et al. |
| 2020/0143536 | A1 | 5/2020 | Kuchenbecker et al. |

FOREIGN PATENT DOCUMENTS

| | | |
|---|---|---|
| EP | 1901565 A1 | 3/2008 |
| EP | 2592618 A1 | 5/2013 |
| JP | 2002-526817 A | 8/2002 |
| JP | 2004-519972 A | 7/2004 |
| JP | 2005134866 A | 5/2005 |
| JP | 2006-295595 A | 10/2006 |
| JP | 2008-286891 A | 11/2008 |
| JP | 2009-147581 A | 7/2009 |
| JP | 2010-164900 | 7/2010 |
| JP | 2011-150127 A | 8/2011 |
| JP | 2011-248060 A | 12/2011 |
| JP | 55-58688 | 6/2014 |
| JP | 2014-515838 A | 7/2014 |
| KR | 0164265 B1 | 1/1999 |
| KR | 10-2001-0073958 A | 8/2001 |
| TW | 201531931 | 8/2015 |
| TW | 201546697 | 12/2015 |
| WO | WO2008/0139741 | 11/2008 |
| WO | WO2012/145672 A1 | 10/2012 |
| WO | WO 2017/127444 A1 | 7/2017 |

OTHER PUBLICATIONS

Limare, N. "Integer and Floating-Point Arithmetic Speed vs. Precision." Published Dec. 31, 2014. Retrieved Aug. 13, 2020. Retrieved from the Internet: URL<http://nicolas.limare.net/pro/notes/2014/12/12_arit_speed/>. 6 pages.

Communication Pursuant to Article 94(3) EPC received in European Patent Application No. 17741858,9, dated Aug. 19, 2020. 9 pages.

Boynton, R. "A System of Photometry and Colorimetry Based on Cone Excitations;" Color Research & Application; vol. 11, Issue 4; Winter 1986; pp. 244-252; First published: Winter 1986; Presented at the 20th CIE Congress, Amsterdam, Aug. 31-Sep. 8, 1983 (Year: 1983).

Extended European Search Report received in European Patent Application No. 17741858.9, dated Nov. 29, 2018. 13 pages.

Extended European Search Report received in European Patent Application No. 17741865.4, dated Oct. 12, 2018. 10 pages.

Ford, A. et al. "Colour Space Conversions." Published Aug. 11, 1998. Retrieved on Aug. 20, 2019. Retrieved from the Internet: URL:<http://www.poynton.com/PDFs/coloureq.pdf>. 31 pages.

Heeger, D. "Perception Lecture Notes: Retinal Ganglion Cell." Center for Neural Science—New York University. Published Dec. 21, 2010. Retrieved Aug. 20, 2019. Retrieved from the Internet: URL:<http://www.cns.nyu.edu/~david/courses/perception/lecturenotes/ganglion/ganglion.html>. 6 pages.

International Search Report and Written Opinion of the International Searching Authority received in International Patent Application No. PCT/US2017/013990, dated Jul. 31, 2017, 52 pages.

International Preliminary Report on Patentability received in International Patent Application No. PCT/US2017/013990, dated Aug. 2, 2018, 46 pages.

International Search Report and Written Opinion received in International Patent Application No. PCT/US2017/013969, filed Jan. 18, 2017, dated Apr. 19, 2017. 13 pages.

International Preliminary Report on Patentability received in International Patent Application No. PCT/US2017/013969, filed Jan. 18, 2017, dated Jul. 24, 2018. 9 pages.

Jones, L et al. "Parental History of Myopia, Sports and Outdoor Activities, and Future Myopia." Investigative Ophthalmology & Visual Science, vol. 48. Published Aug. 2007. pp. 3524-3532.

"LMS Color Space." Wikipedia. Last edited Aug. 16, 2019. Retrieved on Aug. 20, 2019. Retrieved from the Internet: URL<https://en.wikipedia.org/wiki/LMS_color_space>. 3 pages.

(56) References Cited

OTHER PUBLICATIONS

MacLeod et al.; "Chromaticity diagram showing cone excitation by stimuli of equal luminance;" Journal Optical Society or America, vol. 69, No. 8, Aug. 1979; pp. 1183-1186 (Year: 1979).
Nishad PM et al.; "Various Colour Spaces and Colour Space Conversion;" Journal of Global Research in Computer Science, vol. 4, No. 1, Jan. 2013; pp. 44-48 (Year: 2013).
Office Action received in Australian Patent Application No. 2017209051, dated Jul. 17, 2019. 4 pages.
Office Action received in Canadian Patent Application No. 3011808, dated Jun. 7, 2019. 6 pages.
Office Action received in Korean Patent Application No. 10-2018-7023751, dated Jul. 30, 2019. Translation included. 14 pages.
Office Action received in Japanese Patent Application No. 2018-555853, dated Jul. 1, 2019. Translation included. 10 pages.
Office Action received in Canadian Patent Application No. 3011794, dated May 7, 2019. 3 pages.
Office Action received in Australian Patent Application No. 2017210160, dated Apr. 12, 2019. 4 pages.
Pinna, B. "Watercolor Illusion." Scholarpedia. Last updated Sep. 22, 2012. Retrieved on Aug. 20, 2019. Retrieved from the Internet: URL:<http://www.scholarpedia.org/article/Watercolor_illusion>. 10 pages.
Sandler, C. "NOOK Tablet Text and Brightness Tools." Dummies. Published Feb. 29, 2012. Retrieved on Aug. 20, 2019. Retrieved from the Internet: URL:<http://www.dummies.com/how-to/content/nook-tablet-text-and-brightness-tools.html>. 3 pages.
Stockman et al.; "Spectral sensitivities of the human cones;" Journal Optical Society or America, vol. 10, No. 12, Dec. 1993; pp. 2491-2521 (Year: 1993).
Wikipedia. "Comparison of e-book formats". Last modified Sep. 26, 2015. Accessed at http://web.archive.org/web/20151216213019/https://en.wikipedia.org/wiki/Comparison_of_e-book_formats. Accessed on Apr. 17, 2017. 9 pages.
Xing, J. "Measurement and modeling of center-surround suppression and enhancement." Vision Research, vol. 41, Issue 5. Published Mar. 2001. pp. 571-583.
Office Action received in Japanese Patent Application No. 2018-555856, dated Nov. 5, 2019. Translation included. 13 pages.
Office Action received in Japanese Patent Application No. 2018-555853, dated Apr. 27, 2020. Translation included. 6 pages.
Office Action received in Japanese Patent Application No. 2018-555856, dated Jun. 1, 2020. Translation included. 7 pages.
Liu, et al., (2014), "The effects of monochromatic illumination on early eye development in rhesus monkeys" Invest Opthlamol Vis Sci, 55(3): 1901-1909.
Neitz, J. et al. "Electroretinogram measurements of cone spectral sensitivity in dichromatic monkeys." Journal of the Optical Society of America, vol. 1, Issue 12. Published Dec. 1984. pp. 1175-1180.
Office Action received in Canadian Patent Application No. 3011794, dated Jul. 13, 2020. 3 pages.
Office Action received in Canadian Patent Application No. 3011808, dated Jul. 14, 2020. 5 pages.
Office Action received in Korean Patent Application No. 10-2018-7023817, dated Jun. 23, 2020. Translation included. 6 pages.
Sabesan, R. et al. "Characterizing the Human Cone Photoreceptor Mosaic via Dynamic Photopigment Densitometry." PLoS One. Published Dec. 2015. Retrieved on Aug. 6, 2020. Retrieved from the Internet: URL<https://journals.plos.org/plosone/article?id=10.1371/journal.pone.0144891>. 12 pages.
Kim et al., "Measurements of achromatic and chromatic contrast sensitivity functions for an extended range of adaptation luminance," Proceedings of Spie, Feb. 22, 2013, 8651:14 pages.
TW Office Action in Appln. No. 106101751, dated Dec. 3, 2020, 34 pages (with English Translation).

* cited by examiner

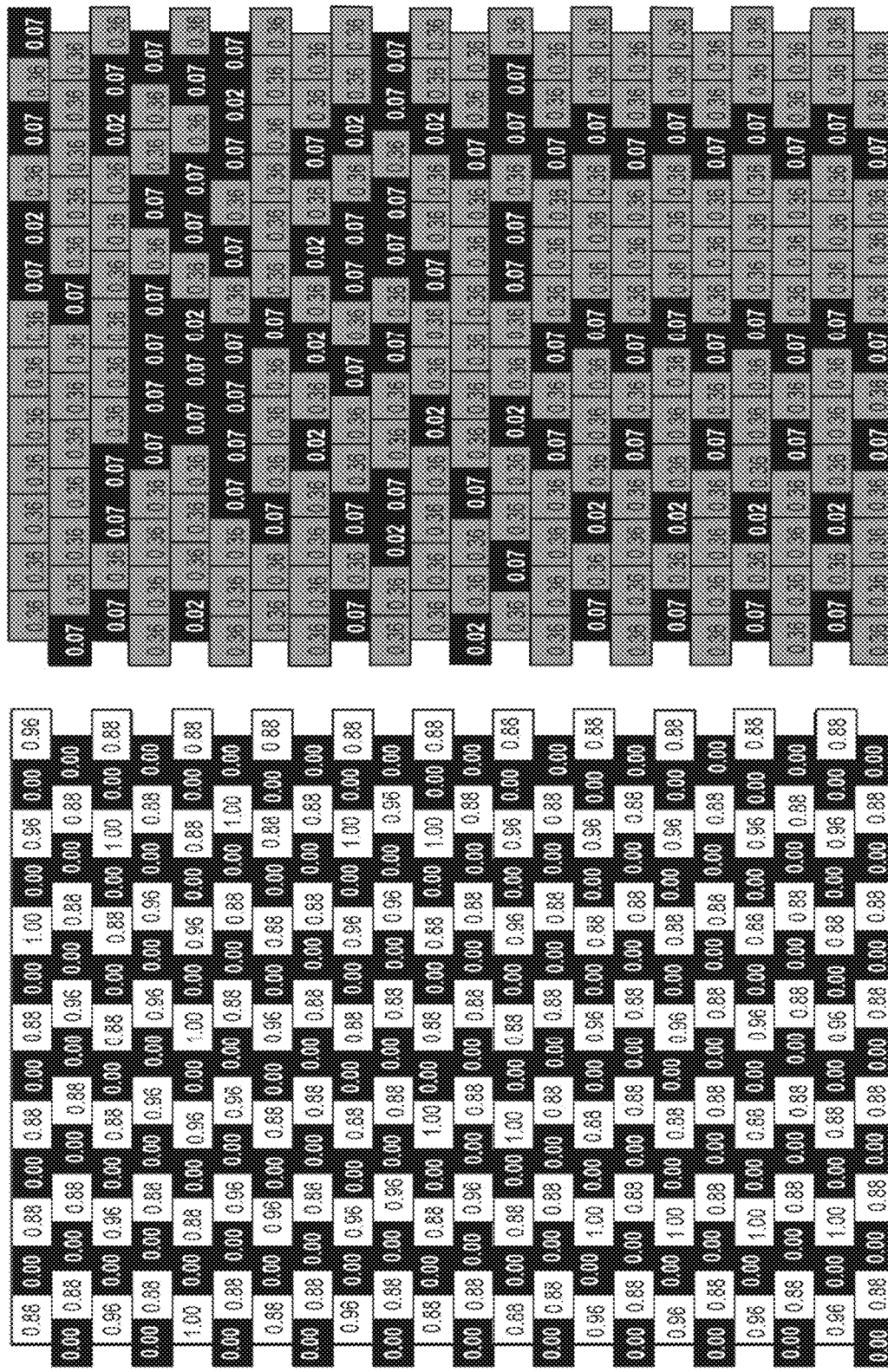

|  |  |  |  |  |  |
|---|---|---|---|---|---|
| $n_1$ | $n_2$ | $n_3$ | | $n_1$ | $n_2$ |
| $n_4$ | c | $n_5$ | $n_3$ | c | $n_4$ |
| $n_6$ | $n_7$ | $n_8$ | | $n_5$ | $n_6$ |

| Background | | | | | | | Text | | | | | | | Score (W:0.3) | % Reduction Example | Generate Examples | 0.17 | 0.84 | 0.01 | |
|---|---|---|---|---|---|---|---|---|---|---|---|---|---|---|---|---|---|---|---|---|
| R | G | B | X | Y | Z | L | M | S | R | G | B | X | Y | Z | L | M | S | | | | L | M | S | Readability | Compos |
| 250.0 | 250.0 | 250.0 | 90.9 | 95.6 | 104.1 | 90.7 | 99.0 | 100.9 | 0.0 | 0.0 | 0.0 | 0.0 | 0.0 | 0.0 | 0.0 | 0.0 | 0.0 | 419.3864772 | 0.0% | The Quick Brown Fox Jumps Over the Lazy Dog | 181.49 | 197.96 | 207.89 | 199.22 | 0.48 |
| 100.0 | 200.0 | 150.0 | 31.4 | 46.2 | 36.1 | 37.0 | 56.6 | 36.2 | 250.0 | 0.0 | 150.0 | 44.9 | 22.5 | 30.8 | 37.6 | 6.8 | 30.8 | 45.21632626 | 89.2% | The Quick Brown Fox Jumps Over the Lazy Dog | 0.01 | 78.09 | 0.90 | 65.61 | 1.45 |
| 100.0 | 200.0 | 150.0 | 31.4 | 46.2 | 36.1 | 37.0 | 56.6 | 36.2 | 250.0 | 50.0 | 150.0 | 46.1 | 24.8 | 31.2 | 39.4 | 9.9 | 31.2 | 38.476785 | 90.9% | The Quick Brown Fox Jumps Over the Lazy Dog | 0.14 | 65.57 | 0.76 | 55.11 | 1.44 |
| 250.0 | 0.0 | 150.0 | 44.9 | 22.5 | 30.8 | 37.6 | 6.8 | 30.8 | 100.0 | 200.0 | 150.0 | 31.4 | 46.2 | 36.1 | 37.0 | 56.6 | 36.2 | 46.24126666 | 89.9% | The Quick Brown Fox Jumps Over the Lazy Dog | 0.01 | 78.09 | 0.90 | 65.61 | 1.42 |
| 250.0 | 50.0 | 150.0 | 46.1 | 24.8 | 31.2 | 39.4 | 9.9 | 31.2 | 100.0 | 200.0 | 150.0 | 31.4 | 46.2 | 36.1 | 37.0 | 56.6 | 36.2 | 38.94583548 | 90.7% | The Quick Brown Fox Jumps Over the Lazy Dog | 0.14 | 65.57 | 0.76 | 55.11 | 1.42 |
| 250.0 | 0.0 | 150.0 | 44.9 | 22.5 | 30.8 | 37.6 | 6.8 | 30.8 | 50.0 | 200.0 | 150.0 | 27.5 | 44.2 | 35.9 | 39.4 | 55.9 | 35.9 | 45.67108294 | 89.1% | The Quick Brown Fox Jumps Over the Lazy Dog | 0.53 | 76.80 | 0.83 | 64.61 | 1.41 |
| 250.0 | 50.0 | 150.0 | 46.1 | 24.8 | 31.2 | 39.4 | 9.9 | 31.2 | 150.0 | 200.0 | 100.0 | 38.7 | 50.0 | 36.5 | 43.9 | 57.8 | 36.7 | 40.351953 | 90.3% | The Quick Brown Fox Jumps Over the Lazy Dog | 0.51 | 67.87 | 0.89 | 57.10 | 1.40 |
| 100.0 | 150.0 | 100.0 | 18.5 | 25.4 | 16.0 | 21.9 | 30.3 | 13.3 | 150.0 | 0.0 | 100.0 | 26.1 | 13.2 | 22.7 | 4.1 | 13.2 | 13.3 | 23.94096747 | 94.3% | The Quick Brown Fox Jumps Over the Lazy Dog | 0.03 | 39.84 | 0.56 | 33.48 | 1.40 |
| 250.0 | 0.0 | 200.0 | 49.8 | 24.5 | 56.7 | 37.8 | 6.9 | 56.3 | 100.0 | 200.0 | 150.0 | 31.4 | 46.2 | 36.1 | 37.0 | 56.6 | 36.1 | 47.15437082 | 88.8% | The Quick Brown Fox Jumps Over the Lazy Dog | 0.92 | 77.95 | 8.68 | 65.55 | 1.39 |
| 250.0 | 0.0 | 150.0 | 44.9 | 22.5 | 30.8 | 37.6 | 6.8 | 30.8 | 0.0 | 200.0 | 150.0 | 26.2 | 43.5 | 35.9 | 52.0 | 55.7 | 35.9 | 46.30142667 | 89.0% | The Quick Brown Fox Jumps Over the Lazy Dog | 0.89 | 76.37 | 0.80 | 64.31 | 1.39 |
| 50.0 | 200.0 | 150.0 | 27.5 | 44.2 | 35.9 | 39.4 | 55.9 | 35.9 | 250.0 | 0.0 | 150.0 | 44.9 | 22.5 | 30.8 | 37.6 | 6.8 | 30.8 | 46.53214275 | 88.9% | The Quick Brown Fox Jumps Over the Lazy Dog | 0.53 | 76.80 | 0.83 | 64.61 | 1.39 |
| 50.0 | 200.0 | 150.0 | 27.5 | 44.2 | 35.9 | 39.4 | 55.9 | 35.9 | 250.0 | 50.0 | 150.0 | 46.1 | 24.8 | 31.2 | 39.4 | 9.9 | 31.2 | 39.16650084 | 90.7% | The Quick Brown Fox Jumps Over the Lazy Dog | 1.02 | 64.33 | 0.70 | 54.22 | 1.38 |
| 200.0 | 0.0 | 100.0 | 26.1 | 13.2 | 22.7 | 4.1 | 13.2 | 12.3 | 100.0 | 150.0 | 100.0 | 18.5 | 25.4 | 16.0 | 21.9 | 30.3 | 16.1 | 24.21024093 | 94.2% | The Quick Brown Fox Jumps Over the Lazy Dog | 0.03 | 39.84 | 0.56 | 33.48 | 1.38 |
| 100.0 | 200.0 | 150.0 | 31.4 | 46.2 | 36.1 | 37.0 | 56.6 | 36.1 | 250.0 | 0.0 | 200.0 | 49.8 | 24.5 | 56.7 | 37.8 | 6.9 | 56.3 | 47.66998634 | 88.6% | The Quick Brown Fox Jumps Over the Lazy Dog | 0.92 | 77.95 | 8.68 | 65.55 | 1.38 |
| 250.0 | 0.0 | 150.0 | 44.9 | 22.5 | 30.8 | 37.6 | 6.8 | 30.8 | 0.0 | 200.0 | 150.0 | 26.2 | 43.5 | 35.9 | 32.0 | 55.7 | 35.9 | 46.94080068 | 88.8% | The Quick Brown Fox Jumps Over the Lazy Dog | 0.89 | 76.37 | 0.80 | 64.31 | 1.37 |
| 250.0 | 0.0 | 200.0 | 49.8 | 24.5 | 56.7 | 37.8 | 6.9 | 56.3 | 150.0 | 200.0 | 100.0 | 38.7 | 50.0 | 36.5 | 43.9 | 57.8 | 36.7 | 49.6057896 | 88.2% | The Quick Brown Fox Jumps Over the Lazy Dog | 0.91 | 80.33 | 8.29 | 67.72 | 1.37 |
| 250.0 | 0.0 | 150.0 | 44.9 | 22.5 | 30.8 | 37.6 | 6.8 | 30.8 | 100.0 | 0.0 | 100.0 | 23.0 | 42.2 | 19.0 | 31.9 | 55.0 | 19.3 | 47.20265367 | 88.7% | The Quick Brown Fox Jumps Over the Lazy Dog | 0.94 | 76.32 | 5.23 | 64.32 | 1.36 |
| 250.0 | 50.0 | 200.0 | 51.0 | 26.8 | 57.1 | 39.6 | 9.9 | 56.7 | 100.0 | 200.0 | 150.0 | 31.4 | 46.2 | 36.1 | 37.0 | 56.6 | 36.2 | 40.42240974 | 90.4% | The Quick Brown Fox Jumps Over the Lazy Dog | 0.17 | 65.43 | 9.00 | 55.08 | 1.36 |
| 250.0 | 0.0 | 150.0 | 44.9 | 22.5 | 30.8 | 37.6 | 6.8 | 30.8 | 200.0 | 0.0 | 100.0 | 28.2 | 44.9 | 36.9 | 36.9 | 56.5 | 19.6 | 48.32012788 | 88.5% | The Quick Brown Fox Jumps Over the Lazy Dog | 0.01 | 78.04 | 4.93 | 65.61 | 1.36 |
| 250.0 | 50.0 | 150.0 | 46.1 | 24.8 | 31.2 | 39.4 | 9.9 | 31.2 | 50.0 | 200.0 | 150.0 | 27.5 | 44.2 | 35.9 | 33.3 | 55.9 | 36.0 | 39.94765193 | 90.5% | The Quick Brown Fox Jumps Over the Lazy Dog | 1.02 | 64.33 | 0.70 | 54.22 | 1.36 |

| Background | | | | | | | | | Text | | | | | | | | | Score (v0.9) | % Reduction | Generate Examples | | L | M | S | Readability | Composite score |
| --- | --- | --- | --- | --- | --- | --- | --- | --- | --- | --- | --- | --- | --- | --- | --- | --- | --- | --- | --- | --- | --- | --- | --- | --- | --- | --- |
| R | G | B | X | Y | Z | L | M | S | R | G | B | X | Y | Z | L | M | S | | | Example | | | | | | |
| | | | | | | | | | | | | | | | | | | | | | | 0.17 | 0.94 | 0.01 | | |
| 250.0 | 250.0 | 250.0 | 90.9 | 95.6 | 104.1 | 90.7 | 99.0 | 103.9 | 0.0 | 0.0 | 0.0 | 0.0 | 0.0 | 0.0 | 0.0 | 0.0 | 0.0 | 419.3664772 | 0 | The quick brown fox jumps over the lazy dog | 181.49 | 197.96 | 207.89 | 199.22 | 0.48 |
| 150.0 | 250.0 | 200.0 | 57.2 | 79.0 | 66.9 | 65.0 | 94.3 | 67.0 | 250.0 | 0.0 | 150.0 | 44.9 | 22.5 | 30.8 | 37.6 | 6.8 | 30.8 | 120.4827455 | 0.7127097 | The quick brown fox jumps over the lazy dog | 14.63 | 151.38 | 26.88 | 129.91 | 1.08 |
| 150.0 | 250.0 | 150.0 | 52.3 | 77.1 | 41.0 | 64.7 | 94.3 | 41.5 | 250.0 | 0.0 | 150.0 | 44.9 | 22.5 | 30.8 | 37.6 | 6.8 | 30.8 | 120.5525 | 0.7125777 | The quick brown fox jumps over the lazy dog | 14.41 | 151.31 | 3.19 | 129.58 | 1.08 |
| 250.0 | 0.0 | 150.0 | 44.9 | 22.5 | 30.8 | 37.6 | 6.8 | 30.8 | 150.0 | 250.0 | 130.0 | 52.3 | 77.1 | 41.0 | 64.7 | 94.3 | 41.5 | 120.729888 | 0.7121364 | The quick brown fox jumps over the lazy dog | 14.41 | 151.31 | 3.19 | 129.58 | 1.07 |
| 150.0 | 0.0 | 200.0 | 49.8 | 24.5 | 56.7 | 37.8 | 6.9 | 56.3 | 150.0 | 250.0 | 100.0 | 49.1 | 75.8 | 24.1 | 64.6 | 94.3 | 24.9 | 119.6366244 | 0.7615203 | The quick brown fox jumps over the lazy dog | 13.97 | 151.08 | 24.31 | 129.52 | 1.09 |
| 150.0 | 250.0 | 100.0 | 49.1 | 75.8 | 24.1 | 64.6 | 94.3 | 24.9 | 150.0 | 0.0 | 200.0 | 49.8 | 24.5 | 56.7 | 37.8 | 6.9 | 56.3 | 120.361217 | 0.7129276 | The quick brown fox jumps over the lazy dog | 13.97 | 151.08 | 24.31 | 129.52 | 1.08 |
| 150.0 | 250.0 | 200.0 | 57.2 | 79.0 | 66.9 | 65.0 | 94.3 | 67.0 | 150.0 | 0.0 | 250.0 | 56.7 | 27.2 | 92.7 | 38.2 | 6.9 | 91.7 | 115.618538 | 0.7243186 | The quick brown fox jumps over the lazy dog | 14.34 | 151.20 | 1.87 | 129.46 | 1.12 |
| 150.0 | 0.0 | 200.0 | 49.8 | 24.5 | 56.7 | 37.8 | 6.9 | 56.3 | 150.0 | 250.0 | 200.0 | 57.2 | 79.0 | 66.9 | 65.0 | 94.3 | 67.0 | 116.16724 | 0.7229935 | The quick brown fox jumps over the lazy dog | 14.34 | 151.20 | 1.87 | 129.46 | 1.11 |
| 250.0 | 0.0 | 250.0 | 56.7 | 27.2 | 92.7 | 38.2 | 6.9 | 65.0 | 150.0 | 250.0 | 150.0 | 52.3 | 77.1 | 41.0 | 64.7 | 94.3 | 41.5 | 118.6529716 | 0.7184988 | The quick brown fox jumps over the lazy dog | 13.72 | 150.87 | 37.86 | 129.44 | 1.10 |
| 150.0 | 250.0 | 150.0 | 52.3 | 77.1 | 41.0 | 64.7 | 94.3 | 41.5 | 250.0 | 0.0 | 250.0 | 56.7 | 27.2 | 92.7 | 38.2 | 6.9 | 91.7 | 118.6905362 | 0.7184966 | The quick brown fox jumps over the lazy dog | 13.72 | 150.87 | 37.86 | 129.44 | 1.09 |
| 150.0 | 0.0 | 250.0 | 48.8 | 24.5 | 77.1 | 38.2 | 6.9 | 91.7 | 150.0 | 250.0 | 150.0 | 52.3 | 77.1 | 41.0 | 64.7 | 94.3 | 41.5 | 115.7557981 | 0.7239746 | The quick brown fox jumps over the lazy dog | 14.12 | 151.12 | 4.47 | 129.39 | 1.12 |
| 150.0 | 250.0 | 150.0 | 52.3 | 77.1 | 41.0 | 64.7 | 94.3 | 41.5 | 150.0 | 0.0 | 200.0 | 49.8 | 24.5 | 56.7 | 38.2 | 6.9 | 56.3 | 116.320451 | 0.7226051 | The quick brown fox jumps over the lazy dog | 14.12 | 151.12 | 4.47 | 129.39 | 1.11 |
| 150.0 | 250.0 | 200.0 | 57.2 | 79.0 | 66.9 | 65.0 | 94.3 | 67.0 | 150.0 | 0.0 | 250.0 | 56.7 | 27.2 | 92.7 | 38.2 | 6.9 | 91.7 | 118.7283148 | 0.7168649 | The quick brown fox jumps over the lazy dog | 13.94 | 150.94 | 7.68 | 129.24 | 1.09 |
| 150.0 | 250.0 | 200.0 | 57.2 | 79.0 | 66.9 | 65.0 | 94.3 | 67.0 | 250.0 | 0.0 | 250.0 | 56.7 | 27.2 | 92.7 | 38.2 | 6.9 | 91.7 | 120.5347185 | 0.7157754 | The quick brown fox jumps over the lazy dog | 13.94 | 150.94 | 7.68 | 129.24 | 1.07 |
| 100.0 | 250.0 | 200.0 | 49.9 | 75.2 | 66.5 | 58.1 | 93.1 | 66.6 | 250.0 | 0.0 | 100.0 | 41.7 | 21.2 | 14.0 | 37.4 | 6.8 | 14.1 | 119.4029461 | 0.7152784 | The quick brown fox jumps over the lazy dog | 8.91 | 149.03 | 68.17 | 127.38 | 1.07 |
| 250.0 | 0.0 | 100.0 | 41.7 | 21.2 | 14.0 | 37.4 | 6.8 | 14.1 | 100.0 | 250.0 | 200.0 | 49.9 | 75.2 | 66.5 | 58.1 | 93.1 | 66.6 | 120.0582809 | 0.7137512 | The quick brown fox jumps over the lazy dog | 8.91 | 149.03 | 68.17 | 127.38 | 1.07 |
| 250.0 | 0.0 | 100.0 | 41.7 | 21.2 | 14.0 | 37.4 | 6.8 | 14.1 | 100.0 | 250.0 | 150.0 | 44.9 | 73.3 | 40.6 | 57.8 | 93.0 | 41.1 | 119.400521 | 0.7158358 | The quick brown fox jumps over the lazy dog | 8.72 | 148.95 | 26.29 | 126.87 | 1.06 |
| 100.0 | 250.0 | 150.0 | 44.9 | 73.3 | 40.6 | 57.8 | 93.0 | 41.1 | 250.0 | 0.0 | 100.0 | 41.7 | 21.2 | 14.0 | 37.4 | 6.8 | 14.1 | 120.1641289 | 0.7146272 | The quick brown fox jumps over the lazy dog | 8.72 | 148.95 | 26.29 | 126.87 | 1.06 |

| Background | | | | | | | Text | | | | | | | Score (v0.5) | % Reduction | Generate Examples | | | | | | |
|---|---|---|---|---|---|---|---|---|---|---|---|---|---|---|---|---|---|---|---|---|---|---|
| R | G | B | X | Y | Z | L | M | S | R | G | B | X | Y | Z | L | M | S | | | Example | L | M | S | Readability | Composite score |
| 200.0 | 130.0 | 130.0 | 40.2 | 36.3 | 33.7 | 39.6 | 33.5 | 33.8 | 100.0 | 130.0 | 200.0 | 26.6 | 28.7 | 58.8 | 22.3 | 30.4 | 58.3 | 17.89075353 | 0.95798413 | Thequickbrownfoxjumpsoverthelazydog | 9.71 | 0.31 | 13.02 | 2.04 | 0.11 |
| 230.0 | 180.0 | 100.0 | 52.6 | 43.1 | 17.6 | 54.2 | 36.2 | 18.0 | 250.0 | 100.0 | 150.0 | 65.8 | 44.3 | 34.5 | 54.4 | 36.2 | 34.7 | 17.90110867 | 0.95797862 | Thequickbrownfoxjumpsoverthelazydog | 0.00 | 0.00 | 10.48 | 0.10 | 0.01 |

FIG. 15A

| Background | | | Text | | | | | | | | | | Score (w0.3) | % Reduction | Generate Examples | | | | | | |
|---|---|---|---|---|---|---|---|---|---|---|---|---|---|---|---|---|---|---|---|---|---|
| R | G | B | X | Y | Z | L | M | S | R | G | B | X | Y | Z | L | M | S | | | Example | 0.17 | 0.84 | 0.01 | |
| | | | | | | | | | | | | | | | | | | | | | L | M | S | Readability | Composite score |
| 150.0 | 150.0 | 20.0 | 30.5 | 33.2 | 29.0 | 31.6 | 33.2 | 4.1 | 150.0 | 50.0 | 50.0 | 14.3 | 9.0 | 4.0 | 13.7 | 5.2 | 4.1 | 45.1977102 | 0.89390209 | The quick brown fox jumps over the lazy dog | 10.92 | 37.69 | 45.33 | 33.97 | 0.75 |
| 230.0 | 100.0 | 250.0 | 61.2 | 36.3 | 94.2 | 45.2 | 19.2 | 93.3 | 150.0 | 100.0 | 200.0 | 33.9 | 32.5 | 59.1 | 29.2 | 31.5 | 58.7 | 45.21709655 | 0.89385447 | The quick brown fox jumps over the lazy dog | 6.08 | 6.08 | 15.80 | 6.44 | 0.14 |

FIG. 16A

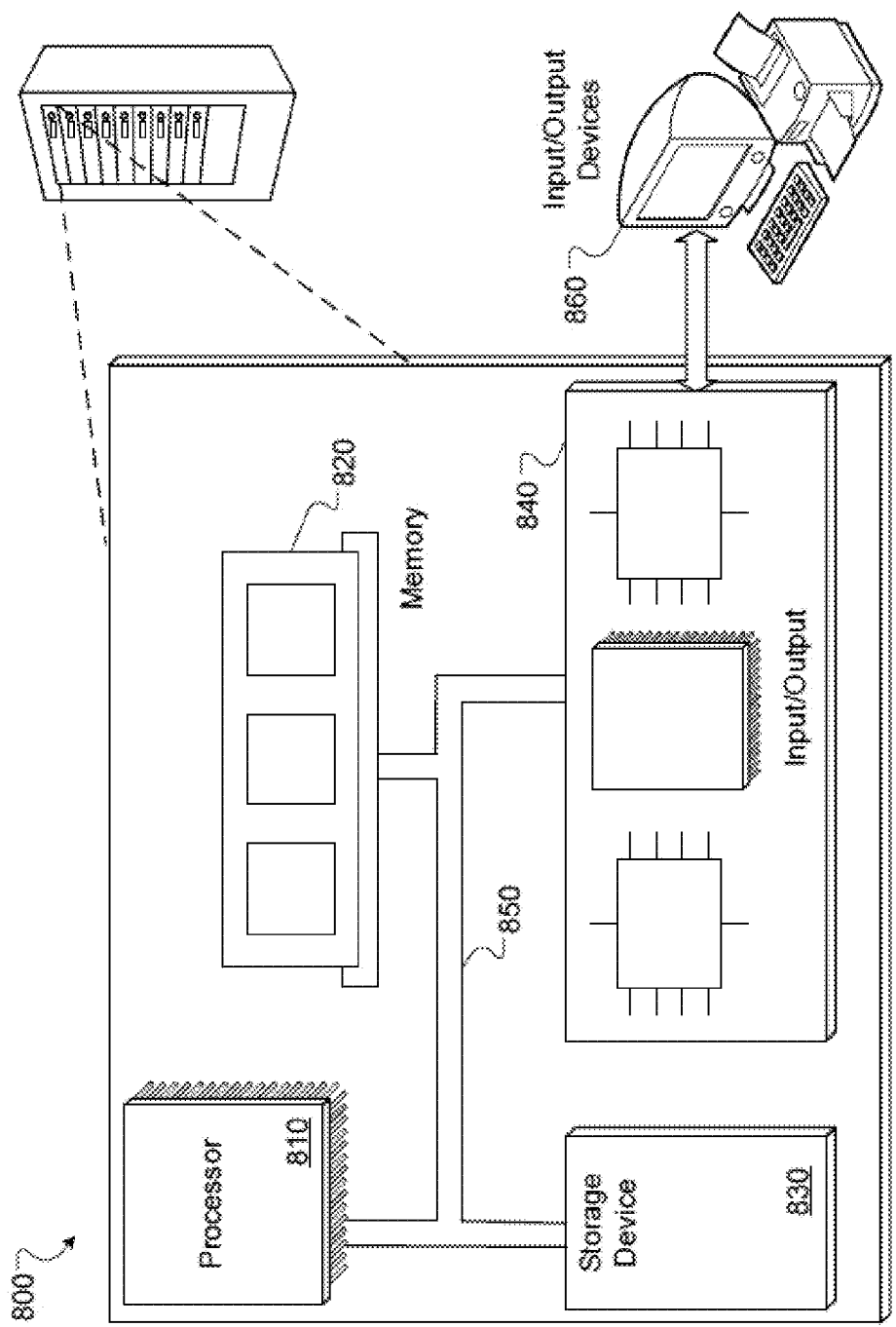

EVALUATING AND REDUCING MYOPIAGENIC EFFECTS OF ELECTRONIC DISPLAYS

CROSS-REFERENCE TO RELATED APPLICATIONS

This application is a continuation of and claims priority to U.S. patent application Ser. No. 16/070,771, entitled "EVALUATING AND REDUCING MYOPIAGENIC EFFECTS OF ELECTRONIC DISPLAYS," filed on Jul. 17, 2018, which claims priority under 35 U.S.C. § 371 to PCT Application No. PCT/US2017/013990, entitled "EVALUATING AND REDUCING MYOPIAGENIC EFFECTS OF ELECTRONIC DISPLAYS," filed on Jan. 18, 2017, which claims priority to and benefit of Provisional Application No. 62/279,954, entitled "EVALUATING AND REDUCING MYOPIAGENIC EFFECTS OF ELECTRONIC DISPLAYS," filed on Jan. 18, 2016, the entire contents of which are hereby incorporated by reference.

BACKGROUND

Electronic displays are ubiquitous in today's world. For example, mobile devices such as smartphones and tablet computers commonly use a liquid crystal display (LCD) or an organic light emitting diode (OLED) display. LCDs and OLED displays are both examples of flat panel displays, and are also used in desktop monitors, TVs, and automotive and aircraft displays.

Many color displays, including many LCD and OLED displays, spatially synthesize color. In other words, each pixel is composed of three sub-pixels that provide a different color. For instance, each pixel can have a red, green, or blue sub-pixel, or a cyan, magenta, or yellow sub-pixel. The color of the pixel, as perceived by a viewer, depends upon the relative proportion of light from each of the three sub-pixels.

Color information for a display is commonly encoded as an RGB signal, whereby the signal is composed of a value for each of the red, green, and blue components of a pixel color for each signal in each frame. A so-called gamma correction is used to convert the signal into an intensity or voltage to correct for inherent non-linearity in a display, such that the intended color is reproduced by the display.

In the field of color science when applied to information display, colors are often specified by their chromaticity, which is an objective specification of a color regardless of its luminance. Chromaticity consists of two independent parameters, often specified as hue (h) and saturation (s). Color spaces (e.g., the 1931 CIE XYZ color space or the CIELUV color space) are commonly used to quantify chromaticity. For instance, when expressed as a coordinate in a color space, a pixel's hue is the angular component of the coordinate relative to the display's white point, and its saturation is the radial component. Once color coordinates are specified in one color space, it is possible to transform them into other color spaces.

Humans perceive color in response to signals from photoreceptor cells called cone cells, or simply cones. Cones are present throughout the central and peripheral retina, being most densely packed in the fovea centralis, a 0.3 mm diameter rod-free area in the central macula. Moving away from the fovea centralis, cones reduce in number towards the periphery of the retina. There are about six to seven million cones in a human eye.

Humans normally have three types of cones, each having a response curve peaking at a different wavelength in the visible light spectrum. FIG. 1A shows the response curves for each cone type. Here, the horizontal axis shows light wavelength (in nm) and the vertical scale shows the responsivity. In this plot, the curves have been scaled so that the area under each cone is equal, and adds to 10 on a linear scale. The first type of cone responds the most to light of long wavelengths, peaking at about 560 nm, and is designated L for long. The spectral response curve for L cones is shown as curve A. The second type responds the most to light of medium-wavelength, peaking at 530 nm, and is abbreviated M for medium. This response curve is curve B in FIG. 1A. The third type responds the most to short-wavelength light, peaking at 420 nm, and is designated S for short, shown as curve C. The three types have typical peak wavelengths near 564-580 nm, 534-545 nm, and 420-440 nm, respectively; the peak and absorption spectrum varies among individuals. The difference in the signals received from the three cone types allows the brain to perceive a continuous range of colors, through the opponent process of color vision.

In general, the relative number of each cone type can vary. Whereas S-cones usually represent between 5-7% of total cones, the ratio of L and M cones can vary widely among individuals, from as low as 5% L/95% M to as high as 95% L/5% M. The ratio of L and M cones also can vary, on average, between members of difference races, with Asians believed to average close to 50/50 L:M and Caucasians believed to average close to 63% L cones (see, for example, U.S. Pat. No. 8,951,729). Color vision disorders also impact the proportion of L and M cones; protanopes have 0% L cones and deuteranopes have 0% M cones. Referring to FIG. 1B, cones are generally arranged in a mosaic on the retina. In this example, L and M cones are distributed in approximately equal numbers, with fewer S cones. Accordingly, when viewing an image on an electronic display, the response of the human eye to a particular pixel will depend on the color of that pixel and where on the retina the pixel is imaged.

SUMMARY

It is known in the art that exposure to outdoor sunlight is not a risk factor for myopia (see, for example Jones, L. A. et al. Invest. Ophthalmol. Vis. Sci. 48, 3524-3532 (2007)). Sunlight is considered an equal energy (EE) illuminant because it does not trigger the opponent color visual system (i.e., sunlight is neither red nor green, and neither blue nor yellow). The EE illuminant represents a 'white point' in the CIE 1931 color space diagram, which is shown in FIG. 1C. As opposed to visual exposure to EE illumination like sunlight, it was recently described that excessive stimulation of L cones relative to M cones can lead to asymmetric growth in a developing human eye, leading to myopia (see, for example, patent application WO 2012/145672 A1). This has significant implications for electronic displays, which are conventionally optimized to display images with deeply saturated colors, including reds, and high contrast. It is believed that the myopiagenic effect of displays may be reduced by reducing the saturation of red-hued pixels in an image, or reducing the relative amount of red to green in a pixel's color, particularly in those pixels where the amount of red exceeds the amount of green.

A more recent discovery stipulates that overall contrast between neighboring cones stimulates asymmetric growth of the eye, leading to myopia. This could be, for example, excessive stimulation of L cones over M cones, but is not limited to that type of contrast alone. The discovery further stipulates that difference in stimulation in neighboring cones is critical, as opposed to the overall ratio of L vs. M over the entire retina.

When a high contrast image falls upon the retina, edges in the image are detected in the visual system by center-surround antagonism in a receptive field on the retina. Thus images with many edges can be said to contain high contrast, causing signaling differences between adjacent neurons in the retina (cone photoreceptors and their downstream signaling partners, including bipolar cells and retinal ganglion cells), which highly activate center-surround antagonism in the visual system. Similarly, when an image containing saturated red, which is composed primarily of long wavelength light, falls upon the retina, it strongly stimulates L cones but not M cones or S cones. Each L cone, where surrounded by a number of M cones and/or S cones, acts as a highly stimulated "center" whereas the M or S cones in the "surround" are stimulated to a much lesser degree. In this way, saturated red colors can be said to provide high contrast among adjacent retinal neurons and can be said to activate a high degree of center-surround antagonism. Because high contrast causes high signaling differences between adjacent cones and other neurons in the visual system, and cause high center-surround antagonism in the visual system, these terms are used interchangeably to describe the degree of contrast within a receptive field on the retina.

The instant invention builds upon both recent biological discoveries to describe new methods, algorithms, and devices that can determine the level of myopiagenicity and reduce it, relative to current methods familiar to skilled artisans. Accordingly, among other aspects, the present disclosure features ways to characterize and/or reduce myopiagenic effects of displays while minimizing the viewer's perception of the correction on the image, and characterize and/or reduce contrast between neighboring cones in the retina.

In general, the myopiagenic reduced techniques described may be implemented in a variety of ways. For example, the techniques may be implemented in TV sets via a stand-alone set top box, or via hardware (e.g., as an image processing chip) and/or software integration with the TV set itself, the cable box, or other product that interfaces with a TV set. In addition to TV sets, the techniques may be implemented in computer monitors, mobile devices, automobile display, aviation displays, wearable displays, and other applications using color displays.

In some embodiments, the color scheme of content can be modified before delivery to an end user so that the end user gets the benefit of the myopiagenia reduction without the use of any additional hardware or software. For example, myopiagenia reduced content can be delivered to the end user via the internet or from a cable provider.

Techniques for quantifying the myopiagenic effect of a stimulus are also disclosed. Such techniques allow for comparison of different myopiagenic reducing algorithms on a stimulus. Implementations also account for both chromatic (e.g., how much red is in an image) and spatial (e.g., how much high-contrast high spatial frequency content there exists in an image) contributions of a stimulus to myopiagenia. Implementations allow for this being calculated and described either as the amount of contrast between adjacent neurons in the retina or the degree of center-surround antagonism in a receptive field.

Various aspects of the invention are summarized below.

In general, in a first aspect, the invention features a method, including: receiving initial image data for a sequence of frames including a first frame, $f_1^i$, and a second frame, $f_2^i$, wherein data for each pixel in $f_1^i$ and $f_2^i$ include a value, $r^i$, for a first color, a value, $g^i$, for a second color, and a value, $b^i$, for a third color; for at least one pixel in $f_1^i$, determining a relative level of stimulation of cones in a viewer's eye based, at least, on the value, $r^i$, for the first color and the value, $g^i$, for the second color; generating modified image data for the sequence of frames including a second frame, $f_2^m$ corresponding to the second frame, $f_2^i$, of the initial image data, where $f_2^m$ includes a value, $r^m$, for the first color and a value, $g^m$, for the second color for the first pixel based on the level of stimulation of cones in a viewer's eye by the at least one pixel in $f_1^i$; and transmitting the modified image data to an electronic display. While the term "frame" often refers to a frame in a video file, it is intended to encompass images from non-video files as well. For example, a frame can include any changing or stationary image produced by a display, such as a page in a web browser, a page in an e-reader, a screen rendering in a video game, etc.

Implementations of the method can include one or more of the following features and/or features of other aspects.

Determining a relative level of stimulation of cones can include determining a relative level of stimulation of neighboring cones in the viewer's eye.

When viewed on the electronic display, $f_2^m$ may results in reduced contrast between neighboring cones in a viewer's eye compared to $f_2^i$.

The second frame can occur after the first frame in the sequence.

In some embodiments, determining the relative level of stimulation includes comparing the value, $r^i$, for the first color to the value, $g^i$, for the second color. $r^i$ can be compared to $g^i$ for a plurality of pixels in the first frame of the initial image data. In some implementations, for the first pixel, $r^m/g^m < r^i/g^i$ when $g^i \le r^i$. $r^m/g^m$ can be equal to $r^i/g^i$ when $g^i > r^i$. When $g^i \le r^i$, $r^m/g^m$ can be equal to $\alpha \cdot r^i/g^i$, where $0 < \alpha < 1$ and the value of $\alpha$ can depend on a number of frames in the sequence preceding $f_2^i$. $\alpha$ can increase as the number of frames in the sequence preceding $f_2^i$ increases.

$f_2^m$ can include at least one pixel for which $r^m = r^i$ and $g^m = g^i$. For the pixel in $f_2^m$ for which $r^m = r^i$ and $g^m = g^i$, $g^i$ can be greater than $r^i$.

In certain embodiments, $b^m \ne b^i$ for at least one pixel in $f_2^m$.

Determining the relative level of stimulation can include determining coordinates in a universal chromaticity space representative of the color of the first pixel. The chromaticity space is the 1931 x, y CIE chromaticity space or the CIE XYZ chromaticity space, or the 1964 or 1976 CIE chromaticity space.

The relative level of stimulation can be based on a relative spectral sensitivity of L-cones and M-cones in the viewer's eye. The relative level of stimulation can be further based on a relative spectral sensitivity of S-cones in the viewer's eye. The relative level of stimulation can be further based on a relative proportion of L-cones to M-cones in the viewer's eye. The relative level of stimulation can be further based on a pixel/cone ratio of the frame when viewed.

The first, second, and third colors can be red, green, and blue, respectively. In some cases, the first, second, and third colors are cyan, magenta, and yellow.

The relative level of stimulation can be determined based on L, M, and S values determined based on at least some of the pixel's in $f_1^i$.

In general in another aspect, the invention features an apparatus that includes: an electronic processing module including an electronic processor, an input (e.g., electrical contacts such as electrodes for hardwiring or standard electrical connectors), and an output (e.g., electrical contacts such as electrodes for hardwiring or standard electrical connectors), wherein: the input is configured to receive initial image data for a sequence of frames including a first frame, $f_1^i$, and a second frame, $f_2^i$, wherein data for each pixel in $f_1^i$ and $f_2^i$ includes a value, $r^i$, for a first color, a value, $g^i$, for a second color, and a value, $b^i$, for a third color; the electronic processor is programmed to receive the initial image data from the input and, for at least one pixel in $f_1^i$, configured to compare the value, $r^i$, for the first color to the value, $g^i$, for the second color and to generate modified image data for the sequence of frames including a second frame, $f_2^m$ corresponding to the second frame, $f_2^i$, of the initial image data, where $f_2^m$ includes a value, $r^m$, for the first color and a value, $g^m$, for the second color for the first pixel based on a relative level of stimulation of cones in a viewer's eye for the at least one pixel in $f_1^i$; and the output is configured to transmit the modified image data from the electronic processing module.

Embodiments of the apparatus can include one or more of the following features and/or features of other aspects. The electronic processor can be programmed to generate modified image data based on a relative level of stimulation of neighboring cones in the viewer's eye.

The electronic processing module can be programmed to determine the relative level of stimulation based, at least, on the corresponding values of $r^i$ and $g^i$ and $b^i$ for the at least one pixel in $f_1^i$.

The apparatus can include an electronic display panel configured to receive the modified image data from the output and display the sequence of frames based on the modified image data. The electronic display can be a display selected from the group including a liquid crystal display, a digital micromirror display, an organic light emitting diode display, a projection display, quantum dot display, and a cathode ray tube display.

In some embodiments, the apparatus is a semiconductor chip or a circuit board including a semiconductor chip.

In other aspects, the invention features a set top box, a flat panel display, a television, a mobile device, a wearable computer, a projection display, and/or a video game console including the foregoing apparatus.

The set top box can be configured to receive the input from another set top box, a DVD player, a video game console, or an internet connection.

In general, in another aspect, the invention features a method, including: assessing uncorrected image data corresponding to a sequence of frames by identifying pixels having a red hue in each of the sequence of frames; providing modified image data corresponding to the sequence of frames based on the uncorrected image data and the assessment; displaying the sequence of frames including at least one corrected frame based on the modified image data, where one or more red-hued pixels in the corrected frame has a reduced degree of red saturation compared to the corresponding pixel in the uncorrected frame, wherein the degree of red saturation in the one or more red-hued pixels in the corrected frame is reduced based on the degree of red saturation in red-hued pixels in one or more of the frames displayed prior to displaying the corrected frame.

Implementations of the method can include one or more features of other aspects.

In general, in a further aspect, the invention features an apparatus that includes an input configured to receive uncorrected image data corresponding to a sequence of frames; an electronic processing module including an electronic processor, an input, and an output, the input being configured to receive uncorrected image data corresponding to a sequence of frames, the electronic processor being programmed to assess the uncorrected image data by identifying pixels having a red hue in each of the sequence of frames and configured to provide modified image data corresponding to the sequence of frames based on the uncorrected image data and the assessment, and the output being configured to transmit the modified image data from the electronic processing module to an electronic display. The modified image data corresponds to the sequence of frames including at least one corrected frame, where one or more red-hued pixels in the corrected frame has a reduced degree of red saturation compared to the corresponding pixel in the uncorrected frame, the degree of red saturation in the one or more red-hued pixels in the corrected frame being reduced based on the degree of red saturation in red-hued pixels in one or more of the frames preceding the corrected frame.

Embodiments of the apparatus can include one or more features of other aspects.

In general, in another aspect, the invention features a method, including: receiving initial image data including a first frame, $f_1^i$, wherein data for each pixel in $f_1^i$ includes a value, $r^i$, for a first color, a value, $g^i$, for a second color, and a value, $b^i$, for a third color; for at least a first pixel $f_1^i$, comparing the value, $r^i$, for the first color to the value, $g^i$, for the second color; generating modified image data including a first frame, $f_1^m$, including a value, $r^m$, for the first color at a second pixel and a value, $g^m$, for the second color at the second pixel, the second pixel being at a different location in the first frame from the first pixel, wherein a ratio $r^m/g^m$ for the second pixel is different from a ratio $r^i/g^i$ for the second pixel, the difference between the ratios being based on $r^i$ and $g^i$ of the first pixel in $f_1^i$; and transmitting the modified image data to an electronic display.

Implementations of the method can include one or more of the following features and/or features of other aspects.

Determining a relative level of stimulation of cones can include determining a relative level of stimulation of neighboring cones in the viewer's eye.

When viewed on a display, $f_1^m$ can stimulates L cones in a viewer's eye less relative to M cones in the viewer's eye than $f_1^i$.

The difference between the ratios can also be based on $r^i$ and $g^i$ of the second pixel in $f_1^i$. The difference between the ratios can be based on $r^i$ and $g^i$ of one or more additional pixels in $f_1^i$ different from the first and second pixels.

The first pixel can be an n-th nearest neighbor to the second pixel. For example, the first pixel can be a nearest neighbor pixel to the second pixel.

For the second pixel, $r^m/g^m$ can be less than $r^i/g^i$ when $g^i \leq r^i$.

For the second pixel, $r^m/g^m$ can be equal to $r^i/g^i$ when $g^i > r^i$.

For the second pixel, when $g^i \leq r^i$, $r^m/g^m$ can be equal to $\alpha \cdot r^i/g^i$, where $0 < \alpha 1$ and the value of $\alpha$ can depend on a $r^i$ and $g^i$ of the first pixel. $\alpha$ can decrease as a ratio $r^i/g^i$ for the first pixel increases.

$r^m$ can be less than $r^i$ for the second pixel. $g^m$ can be greater than $g^i$ for the second pixel.

$b^m$ can be non-equal to $b^i$ for at least some of the pixels.

The first, second, and third colors can be red, green, and blue, respectively. In some embodiments, the first, second, and third colors are cyan, magenta, and yellow.

In general, in another aspect, the invention features an apparatus, including: an input configured to receive initial image data including a first frame, $f_1^i$, wherein data for each pixel in $f_1^i$ includes a value, $r^i$, for a first color, a value, $g^i$, for a second color, and a value, $b^i$, for a third color; an electronic processing module programmed to receive the initial image data from the input and, for at least a first pixel $f_1^i$, compare the value, $r^i$, for the first color to the value, $g^i$, for the second color and to generate modified image data including a first frame, $f_1^m$, including a value, $r^m$, for the first color at a second pixel and a value, $g^m$, for the second color at the second pixel, the second pixel being at a different location in the first frame from the first pixel, wherein a ratio $r^m/g^m$ for the second pixel is different from a ratio $r^i/g^i$ for the second pixel, the difference between the ratios being based on $r^i$ and $g^i$ of the first pixel in $f_1^i$; and an output configured to transmit the modified image data from the electronic processing module.

Embodiments of the apparatus can include one or more of the following features and/or features of other aspects.

In general, in another aspect, the invention features a method, including: assessing uncorrected image data corresponding to at least one uncorrected frame by identifying pixels having a red hue in the at least one uncorrected frame; providing modified image data based on the uncorrected image data and the assessment, the modified image data corresponding to at least one corrected frame corresponding to the at least one uncorrected frame; displaying the at least one corrected frame, where one or more red-hued pixels in the corrected frame has a reduced degree of red saturation compared to the corresponding pixel in the uncorrected frame, wherein the degree of red saturation in the one or more red-hued pixels in the corrected frame is reduced based on a comparison of a degree of red saturation in two or more different portions of the uncorrected frame.

Implementations of the method can include one or more of the following features and/or features of other aspects. For example, the two or more different portions can be red-hued portions. The different portions can include one or more contiguous pixels.

The uncorrected image data can correspond to a plurality of uncorrected frames and the modified image data includes a corresponding plurality of corrected frames.

In general, in a further aspect, the invention features an apparatus, including: an electronic processing module including an electronic processor, an input, and an output, wherein: the input is configured to receive uncorrected image data corresponding to at least one uncorrected frame; the electronic processor is programmed to assess the uncorrected image data by identifying pixels having a red hue in the at least one uncorrected frame and to provide modified image data based on the uncorrected image data and the assessment; and the output is configured to transmit the modified image data from the electronic processing module to an electronic display, wherein the modified image data corresponds to at least one corrected frame, where one or more red-hued pixels in the corrected frame has a reduced degree of red saturation compared to the corresponding pixel in the uncorrected frame, and wherein the degree of red saturation in the one or more red-hued pixels in the corrected frame is reduced based on a comparison of a degree of red saturation in two or more different portions of the uncorrected frame.

Embodiments of the apparatus can include one or more of the following features and/or features of other aspects. For example, the apparatus can include an electronic display panel configured to receive the modified image data from the output and display the sequence of frames based on the modified image data. The electronic display can be a display selected from the group including a liquid crystal display, a digital micromirror display, an organic light emitting diode display, a projection display, quantum dot display, and a cathode ray tube display.

In some embodiments, the apparatus is a semiconductor chip or a circuit board including a semiconductor chip.

In other aspects, the invention features a set top box, a flat panel display, a television, a mobile device, a wearable computer, a projection display, and/or a video game console including the foregoing apparatus.

The set top box can be configured to receive the input from another set top box, a DVD player, a video game console, or an internet connection.

In general, in a further aspect, the invention features a method, including: receiving initial image data including a first frame, $f_1^i$, wherein data for each pixel in the first frame includes a value, $r^i$, for a first color, a value, $g^i$, for a second color, and a value, $b^i$, for a third color; for at least a first pixel in $f_1^i$, comparing $r^i$ to $g^i$; generating modified image data including a modified first frame, $f_1^m$, the modified first frame including a value, $r^m$, for the first color and a value, $g^m$, for the second color at the first pixel, wherein $r^m$ is different from $r^i$ for the first pixel and/or $g^m$ is different from $g^i$ for the first pixel, the difference being based on a location of the first pixel in the first frame; and transmitting the modified image data to an electronic display.

Implementations of the method can include one or more of the following features and/or features of other aspects. For example, the difference between $r^m$ and $r^i$ can increase the closer the location of the first pixel is to a nearest border of the display.

The difference between $g^m$ and $g^i$ can decrease the closer the location of the first pixel is to a nearest border of the display. The difference between $r^m$ and $r^i$ can increase the closer the location of the first pixel is to a center of the display. The difference between $g^m$ and $g^i$ can decrease the closer the location of the first pixel is to a center of the display.

In some embodiments, $b^m \neq b^i$ for at least one pixel.

In general, in a further aspect, the invention features an apparatus, including: an electronic processing module including an electronic processor, an input, and an output, wherein: the input is configured to receive initial image data for a sequence of frames including a first frame, $f_1^i$, wherein data for each pixel in $f_1^i$ includes a value, $r^i$, for a first color, a value, $g^i$, for a second color, and a value, $b^i$, for a third color; the electronic processor is programmed to receive the initial image data from the input and, for at least one pixel in $f_1^i$, configured to compare $r^i$ to $g^i$ and to generate modified image data including a modified first frame, $f_1^m$, the modified first frame including a value, $r^m$, for the first color and a value, $g^m$, for the second color at the first pixel, wherein $r^m$ is different from $r^i$ for the first pixel and/or $g^m$ is different from $g^i$ for the first pixel, the difference being based on a location of the first pixel in the first frame; and the output configured to transmit the modified image data from the electronic processing module.

Embodiments of the apparatus can include one or more features of other aspects.

In general, in a further aspect, the invention features a method, including: assessing uncorrected image data corresponding to at least one uncorrected frame by identifying pixels having a red hue in the at least one uncorrected frame; providing modified image data based on the uncorrected image data and the assessment, the modified image data corresponding to at least one corrected frame corresponding to the at least one uncorrected frame; displaying the at least one corrected frame, where one or more red-hued pixels in the corrected frame has a reduced degree of red saturation compared to the corresponding pixel in the uncorrected frame, wherein the degree of red saturation in the one or more red-hued pixels in the corrected image frame is reduced based on a respective location of the one or more pixels in the corrected frame.

Implementations of the method can include one or more of the following features and/or features of other aspects. For example, the degree of red saturation in the one or more red-hued pixels in the corrected image frame can be reduced based on a proximity of the red-hued pixels to an edge of the corrected frame. The degree of red saturation can be reduced more for pixels closer to the edge of the corrected frame than for pixels further from the edge of the corrected frame.

In general, in another aspect, the invention features an apparatus, including: an electronic processing module including an electronic processor, an input, and an output, wherein: the input is configured to receive uncorrected image data corresponding to at least one uncorrected frame; the electronic processor is programmed to assess the uncorrected image data by identifying pixels having a red hue in the at least one uncorrected frame and to provide modified image data based on the uncorrected image data and the assessment; and the output is configured to transmit the modified image data from the electronic processing module to an electronic display, wherein the degree of red saturation in the one or more red-hued pixels in the corrected image frame is reduced based on a respective location of the one or more pixels in the corrected frame.

Embodiments of the apparatus can include one or more features of other aspects.

In general, in a further aspect, the invention features a method, including: receiving initial image data including a first frame, $f_1^i$, wherein data for each pixel in the first frame includes a value for a first color, $r^i$, a value for a second color, $g^i$, and a value for a third color, $b^i$; for at least a first pixel in $f_1^i$, calculating a degree of stimulation by the first pixel on a first set of one or more cones in a viewer's eye based, at least, on $r^i$ and $g^i$ and $b^i$ for the first pixel; for at least a second pixel in $f_1^i$, different from the first pixel, calculating a degree of stimulation by the second pixel on a second set of one or more cones in the viewer's eye based, at least, on $r^i$ and $g^i$ and $b^i$ for the second pixel; determining a difference in a degree of stimulation between the first and second sets of one or more cones by the first and second pixels; and generating modified image data including a modified first frame, $f_1^m$, the modified first frame including a value for the first color, $r^m$, a value for the second color, $g^m$, and a value for the third color, $b^m$, at the first pixel, wherein one or more of $r^m$, $g^m$ and/or $b^m$ is modified compared to $r^i$, $g^i$, and/or $b^i$, respectively, and the difference in the degree of stimulation between the first and second sets of one or more cones by the first pixel is reduced for the modified image data compared to the initial image data; and transmitting the modified image data to an electronic display.

Implementations of the method can include one or more of the following features and/or features of other aspects. For example, the cones of the first set can be from one cone type (L, M or S) and the cones of the second set are a different cone type (L, M, or S).

The first and second pixels can be neighboring pixels or groups of pixels. The at least one second pixel can include each of the pixels neighboring the first pixel.

Calculating the degree of stimulation can include determining corresponding coordinates in a universal chromaticity space representative of the colors of the first and second pixels. The chromaticity space can be the 1931 x, y CIE chromaticity space or the CIE XYZ chromaticity space, or the 1964 or 1976 CIE chromaticity space.

The degree of stimulation can be based on the relative spectral sensitivity of L-cones and M-cones in the viewer's eye. The degree of stimulation can be further based on a relative proportion of L-cones to M-cones in the viewer's eye. The degree of stimulation can be further based on a pixel/cone ratio of the image when viewed.

A red saturation of the first pixel can be reduced in the modified image data relative to the initial image data.

A contrast between the first pixel and the second pixel can be reduced in the modified image data relative to the initial image data.

$r^i$ can be greater than $r^m$ and/or $g^i$ can be less than $g^m$. In some embodiments, $b^i \neq b^m$ for at least one pixel.

In general, in another aspect, the invention features an apparatus, including: an electronic processing module including an electronic processor, an input, and an output, wherein: the input is configured to receive initial image data for a sequence of frames including a first frame, $f_1^i$, wherein data for each pixel in $f_1^i$ includes a value for a first color, $r^i$, a value for a second color, $g^i$, and a value for a third color, $b^i$; the electronic processor is programmed to: (i) receive the initial image data from the input, for at least one pixel in $f_1^i$; (ii) to calculate a degree of stimulation by the first pixel on a first set of one or more cones in a viewer's eye based, at least, on $r^i$ and $g^i$ for the first pixel; (iii) for at least a second pixel in $f_1^i$, different from the first pixel, calculate a degree of stimulation by the second pixel on a second set of one or more cones in the viewer's eye based, at least, on $r^i$ and $g^i$ for the second pixel; (iv) determine a difference in a degree of stimulation between the first and second sets of one or more cones by the first and second pixels; and generate modified image data including a modified first frame, $f_1^m$, the modified first frame including a value for the first color, $r^m$, a value for the second color, $g^m$, and a value for the third color, $b^m$, at the first pixel, wherein the difference in the degree of stimulation between the first and second sets of one or more cones by the first pixel is reduced for the modified image data compared to the initial image data; and the output is configured to transmit the modified image data from the electronic processing module.

Embodiments of the apparatus can include one or more of the following features and/or features of other aspects. For example, the cones of the first set are L-cones and the cones of the second set are M-cones.

The first and second pixels can be neighboring pixels. The at least one second pixel can include each of the pixels neighboring the first pixel.

The electronic processing module can be programmed to determine the relative level of stimulation based, at least, on the corresponding values of $r^i$ and $g^i$ for the at least one pixel in $f_1^i$.

The apparatus can include an electronic display panel configured to receive the modified image data from the output port and display the sequence of frames based on the modified image data. The electronic display is a display selected from the group including a liquid crystal display, a digital micromirror display, an organic light emitting diode display, a projection display, and a cathode ray tube display.

In some embodiments, the apparatus is a semiconductor chip or a circuit board including a semiconductor chip.

In other aspects, the invention features a set top box, a flat panel display, a television, a mobile device, a wearable computer, a projection display, and/or a video game console including the foregoing apparatus.

The set top box can be configured to receive the input from another set top box, a DVD player, a video game console, or an internet connection.

In general, in another aspect, the invention features a method of evaluating differential stimulation between neighboring sets of cones of a viewer's eye when viewing an image on an electronic display, the method including: calculating a degree of stimulation of a pixel in the image on a first set of one or more cones based, at least, on a color of the pixel; calculating a degree of stimulation of a pixel in the image on a second set of one or more cones based, at least, on a color of the second pixel; and determining a difference in the degree of stimulation between the first and second sets of one or more cones.

Implementations of the method can include one or more of the following features and/or features of other aspects. For example, the cones of the first set can be L-cones and the cones of the second set can be M-cones.

The first and second pixels can be neighboring pixels. The at least one second pixel can include each of the pixels neighboring the first pixel.

Calculating the degree of stimulation can include determining corresponding coordinates in a two-dimensional chromaticity space representative of the colors of the first and second pixels. The chromaticity space can be the 1931 x, y CIE chromaticity space or the CIE XYZ chromaticity space, or the 1964 or 1976 CIE chromaticity space. The degree of stimulation can be based on the relative spectral sensitivity of L-cones and M-cones in the viewer's eye. The degree of stimulation can be further based on a relative proportion of L-cones to M-cones in the viewer's eye. The degree of stimulation can be further based on a pixel/cone ratio of the image when viewed.

The method can include evaluating a myopiagenic effect of a digital video file including the image based on the difference in the degree of stimulation between the first and second sets of one or more cones. The digital video file can include a sequence of frames, and at least one of the frames includes the image.

The method can include assigning the digital video file a score indicative of the myopiagenic effect of the digital video file based on the evaluation.

The method can include modifying the color of the first pixel and/or the second pixel to reduce the difference in the degree of stimulation between the first and second sets of one or more cones. The color modification can reduce a red saturation of the first pixel and/or the second pixel. Alternatively, or additionally, the color modification can reduce a contrast between the first pixel and the second pixel.

In general, in another aspect, the invention features a method for evaluating a myopiagenic effect of a digital video file, including: determining, for at least a first pixel in a first frame of the digital video file, a relative level of stimulation of L-cones and a level of stimulation of M-cones in a viewer's eye by the first pixel based on a color of the first pixel; and assigning a score to the digital video file indicative of the myopiagenic effect of the digital video file based on the relative level of L-cone and M-cone stimulation by the first pixel in the first frame.

Implementations of the method can include one or more of the following features and/or features of other aspects. For example, determining the relative level of stimulation of the L-cones and M-cones can include translating color data for each pixel to a co-ordinate in a two-dimensional chromaticity space. The chromaticity space can be the 1931 x, y CIE chromaticity space or the CIE XYZ chromaticity space, or the 1964 or 1976 CIE chromaticity space.

A value for the relative level of stimulation of the L-cones and M-cones can be assigned to each pixel based on the coordinate for that pixel.

The method can include determining a level of stimulation of L-cones and a level of stimulation of M-cones in the viewer's eye by one or more additional pixels in the first frame based on a color of each of the respective additional pixels; and assigning the score based on a contrast between the relative levels of M-cone and L-cone stimulation between the first pixel and the additional pixels. The one or more additional pixels can neighbor the first pixel in the frame. There can be six or eight additional pixels.

Determining the relative level of stimulation of the L-cones and M-cones can include translating color data for each pixel to a coordinate in a two-dimensional chromaticity space and assigning each pixel a value for the relative level of stimulation of the L-cones and M-cones based on the coordinate for that pixel.

Assigning the score includes calculating a neighbor sum of squares (NSS) based on the value for the relative level of stimulation. NSS can be calculated for multiple pixels in the first frame. The score can be assigned based on an average of the NSS of the multiple pixels in the first frame. Assigning the score can include accounting for a relative density of L-cones to M-cones in the viewer's eye. Assigning the score can include accounting for a pixel/cone ratio of the frame when viewed.

The determining can be repeated for multiple frames in the digital video file and the score can be assigned based on the determination for each of the multiple frames.

The method can include normalizing the score indicative of the myopiagenic effect of the digital video file and outputting the normalized score.

The method can include assigning the digital video file an alphanumeric grade based on the score indicative of the myopiagenic effect of the digital video file and outputting the alphanumeric grade.

The method can include displaying the alphanumeric grade with a medium containing the digital video file or a link to the digital video file.

The digital video file can have a format selected from the group consisting of MPEG, MP4, MOV, WMV, FLV, AVI, AVC, AVCHD, Divx, and MXF.

In general, in a further aspect, the invention features a method, including: assessing image data corresponding to pixels from one or more frames by identifying pixels having a red hue in at least one of the frames and determining a degree of red saturation for each of the red-hued pixels; and assigning a score to the image data based on the assessment, the score corresponding to a degree to which the image data, when viewed on an electronic display, differentially stimulates L-cones to M-cones in a viewer's eye.

Implementations of the method can include one or more of the following features and/or features of other aspects. For example, the data for each pixel in the image data can include a value, r, for a first color, a value, g, for a second color, and a value, b, for a third color the pixels having a red hue are identified by comparing r, g, and b for each pixel. The first color can be red, the second color can be green, and the third color can be blue.

Red-hued pixels can be identified as pixels for which r>g and r>b.

The first color can be cyan, the second color can be magenta, and the third color can be yellow.

The score can be an alphanumeric score. The method can include displaying the score in association with the image data.

The image data can be stored on a storage medium and the score is displayed on the medium or packaging for the medium.

The image data can be provided via the internet and the score is displayed in association with a hyperlink to the image data.

The image data can be formatted as a digital video file.

In general, in another aspect, the invention features a method, including: accessing an electronic file including text; displaying at least one letter of text on at least one area of background in a modified format on a color LCD display; wherein the average variance or average absolute difference in L/M cone stimulation is reduced by more than 60% compared to the unmodified format in the displayed area.

Implementations of the method can include one or more of the following features and/or features of other aspects. For example, the electronic file can be an e-book. The electronic file can be a text file for reading or word processing.

The area of modified format can be chosen according to the area being read at that moment in time (e.g., based on eye-tracking or a touch sensor). Alternatively, or additionally, the area of modified format can be chosen according to the area not being read at that moment in time.

Mathematically, the scale can be based on a measure of difference or variance, for example. For a measure of difference, one can calculate text stimulation on L cones, text stimulation on M cones, background stimulation on L cones, and background stimulation on M cones. For each small area of the retina, calculate the average stimulation overall. Then calculate the absolute value of the difference for each cone versus the average for that area. Divide this result by the average stimulation, and average this value over the entire simulated retina.

For a measure of variance, one can calculate text stimulation on L cones, text stimulation on M cones, background stimulation on L cones, and background stimulation on M cones. For each small area of the retina, calculate the average stimulation overall. Then calculate the difference for each cone and square it. Divide this result by the average stimulation, and average this value over the entire simulated retina.

In general, in another aspect the invention features a method, including: receiving an electronic file including a text, optionally on a mobile device, including a display; selecting a display mode for displaying the text from the group consisting of a color display mode and a contrast display mode; and displaying a page of the text on the flat panel display using the selected display mode, wherein: for the color display mode, the text is displayed in a text color and a background is displayed in a background color, wherein the text and background colors have at least a 30% myopia reduction compared to black text on a white background based on the LMS Myopia Reduction Scale, and for the contrast display mode, a first area of the page of text is displayed with a first contrast level between the text and the background and a second area of the page of text is displayed with a second contrast level lower than the first level.

Implementations of the method can include one or more of the following features and/or features of other aspects. For example, the text and background colors can have at least a 35%, 40%, 45%, 50%, 55%, 60%, or 65% myopia reduction (e.g., 68% or more, 70% or more, 75% or more, 80% or more, 85% or more, 90% or more, such as about 95%) compared to black text on a white background based on the LMS myopia reduction scale.

The method can include presenting a user with a selection of combinations of colors for the text and background colors, and allowing the user to select one of the combinations for the myopia-safe contrast display scheme.

The second contrast level can be provided by changing a luminance level of the background and/or the text. Alternatively, or additionally, the second contrast level can be provided by blurring edges of the text in the displayed page.

Displaying the page of text can include scanning the first area over the page of text. The first area can be determined based on the words that are being viewed.

The mobile device can include a camera facing the viewer, and the mobile device can track the movement of the viewer's eyes using the camera to determine which words are being viewed.

The first area can be scanned at a speed corresponding to 100 to 500 words of the text per minute.

The display mode can be selected by accessing the electronic file using a mobile app on the mobile device.

The electronic file can be an e-book file. The mobile device can be a smart phone, tablet computer, or dedicated e-reader. More generally, the device can be a personal computer (e.g., desktop or laptop) or other device that includes a monitor.

In general, in another aspect, the invention features a mobile device, including: a display; an electronic processing module in communication with the display, the electronic processing module being programmed to: receive an electronic file including a text; receive a selection of a display mode for displaying the text, the display mode being selected from the group consisting of a color display mode and a contrast display mode; and display, on the display a page of the text using the selected display mode, wherein: for the color display mode, the text is displayed in a text color and a background is displayed in a background color, wherein the text and background colors have at least a 30%, 35%, 40%, 45%, 50%, 55%, or 60% myopia reduction compared to black text on a white background based on the LMS Myopia Reduction Scale, and for the contrast display mode, a first area of the page of text is displayed with a first contrast level between the text and the background and a second area of the page of text is displayed with a second contrast level lower than the first level.

Embodiments of the mobile device can include one or more features of other aspects.

In general, in a further aspect, the invention features a non-transitory computer-readable medium storing a program causing a mobile device to perform steps including: receiving an electronic file including a text on the mobile device; selecting a display mode for displaying the text from the group consisting of a color display mode and a myopia-safe contrast display mode; and displaying a page of the text on a flat panel display of the mobile device using the selected display mode, wherein: for the color display mode, the text is displayed in a text color and a background is displayed in a background color, wherein the text and background colors have at least a 60% myopia reduction compared to black text on a white background based on the LMS Myopia Reduction Scale, and for the contrast display mode, a first area of the page of text is displayed with a first contrast level between the text and the background and a second area of the page of text is displayed with a second contrast level lower than the first level.

In general, in yet a further aspect, the invention features a method for displaying an e-book using a combination of colors for text and background that have a reduced myopiagenic effect compared to black text on white background, the method including: presenting a user with one or more combinations of colors for the text and background identified as having a reduced myopiagenic effect, wherein none of the presented combinations include either black or white text or either black or white background, and, when viewed by the user's retina, an image composed of text and background rendered in any of the presented color combinations provides reduced center-surround contrast on the user's retina compared to the image viewed as black text on white background; receiving a selection of one of the color combinations from the user; and displaying the e-book file using the combination of colors for the text and background selected by the user.

Implementations of the method can include one or more of the following features and/or features of other aspects. For example, the reduced center-surround contrast due to the color combinations yields a myopiagenic effect reduced by at least 35% (e.g., 40% or more, 50% or more, 60% or more, 80% or more, such as up to 90%) as calculated using a myopia scale that calculates a center-surround contrast of a modeled visual receptive field and assigns a score to the color combinations based on the calculated center-surround contrast. The center-surround contrast can be calculated based on a difference between an average stimulation of the visual receptive field center versus its and a stimulation of the surround. The visual receptive field center can correspond to a cone and the surround to its nearest neighbors. The average stimulation can be determined based on LMS stimulus values of the cone and its nearest neighbors of the visual receptive field.

The method can further include receiving information about a desired myopiagenic level from the user and presenting the one or more combinations of colors according to the received information, the presented combinations of colors having a myopiagenic effect corresponding to the desired level. The information about the desired myopiagenic level can be a desired percentage reduction of myopia potential as calculated using a myopia scale that calculates an impact on the retina based on a differential stimulation between the center and surround of a modeled visual receptive field. The presented combinations of colors can have a myopiagenic level within 10% (e.g., within 5%, 3%, 2%, 1%) of the desired percentage reduction of myopia potential as calculated using the myopia scale. The myopia scale can be a LMS Myopia Scale.

The e-book can be a file in any of the following formats: Broadband eBooks (BBeB), Comic Book Archive, Compiled HTML, DAISY, DjVu, DOC, DOCX, EPUB, eReader, FictionBook, Founder Electronics, HTML, iBook, IEC62448, INF, KF8, KPF, Microsoft LIT, MOBI, Mobipocket, Multimedia eBooks, Newton eBook, Open Electronic Package, PDF, Plain text, Plucker, PostScript, RTF, SSReader, Text Encoding Initiative, TomeRaider, and Open XML Paper Specification.

The e-book can be displayed on a mobile device, such as a smartphone, a tablet computer, or a dedicated e-reader (e.g., a Kindle e-reader, a Nook e-reader).

In general, in a further aspect, the invention features a device for displaying an e-book, including: a display; an interface for receiving input from a user; and an electronic processing module programmed to cause the device to: (i) present the user with one or more combinations of colors for text and background identified as having a reduced myopiagenic effect, wherein none of the presented combinations include either black or white text or either black or white background, and, when viewed by the user's retina, an image composed of text and background rendered in any of the presented color combinations provides reduced center-surround contrast on the user's retina compared to the image viewed as black text on white background; (ii) receive a selection of one of the color combinations from the user via the interface; (iii) retrieve the e-book from memory; and (iv) display, using the display, the e-book using the combination of colors for the text and background selected by the user.

Embodiments of the device can include one or more of the following features and/or features of other aspects. For example, the reduced center-surround contrast due to the color combinations can yield a myopiagenic effect reduced by at least 35% (e.g., 40% or more, 50% or more, 60% or more, 70% or more, 80% or more, up to 90%) as calculated using a myopia scale that calculates a center-surround contrast of a modeled visual receptive field and assigns a score to the color combinations based on the calculated center-surround contrast. The center-surround contrast can be calculated based on a difference between an average stimulation of the visual receptive field and a stimulation of the surround. The visual receptive field can correspond to a cone and its nearest neighbors.

The electronic processing module can be further programmed to cause the device to receive information about a desired myopiagenic level from the user and present the one or more combinations of colors according to the received information, the presented combinations of colors having a myopiagenic effect corresponding to the desired level. The information about the desired myopiagenic level can be a desired percentage reduction of myopia potential as calculated using a myopia scale that calculates an impact on the retina based on a differential stimulation between the center and surround of a modeled visual receptive field.

The interface can include a touch panel, mouse, or keyboard.

The display can be a flat panel display.

The device can be a smartphone, a tablet computer, or a dedicated e-reader.

In general, in another aspect, the invention features a method for displaying an e-book using a combination of colors for text and background that have a reduced myopiagenic effect compared to black text on white background, the method including: displaying text using a text color other than black or white; and displaying a background to the text using a background color other than black or white, wherein an image displayed using the displayed text color on the displayed background color, when viewed by the user's retina, provides reduced center-surround contrast on the user's retina compared to the image when viewed in black and white.

Implementations of the method can include one or more of the following features and/or features of other aspects. The text color and background color can yield a ratio of a Text Readability score to myopia score on a LMS myopia scale is greater than 0.60 (e.g., 0.65 or more, 0.7 or more, 0.75 or more).

The myopia potential can be reduced by more than 58% as calculated using a LMS myopia scale and a Text Readability score is decreased no more than 65% (e.g., 60% or less, 50% or less, 40% or less) compared to the image when viewed as black text on white background. ;Among other advantages, the disclosed implementations can reduce the myopiagenic effect of electronic displays.

BRIEF DESCRIPTION OF THE DRAWINGS

FIG. 5C shows a level of stimulation of the cones in the simulated retina shown in FIG. 5B by the stimulus shown in FIG. 5A.

FIG. 6C shows a level of stimulation of the cones in the simulated retina shown in FIG. 6B by the stimulus shown in FIG. 6A.

FIG. 14A is a table listing calculated myopiagenic scale values and readability values for different text and background color combinations.

FIG. 14B is another table listing calculated myopiagenic scale values and readability values for different text and background color combinations.

FIG. 15A is a further table listing calculated myopiagenic scale values and readability values for two text and background color combinations.

FIG. 16A is another table listing calculated myopiagenic scale values and readability values for two additional text and background color combinations.

FIG. 18. is a schematic diagram of an electronic processing module.

Like reference numbers and designations in various drawings indicate like elements.

DETAILED DESCRIPTION

Figure 2:
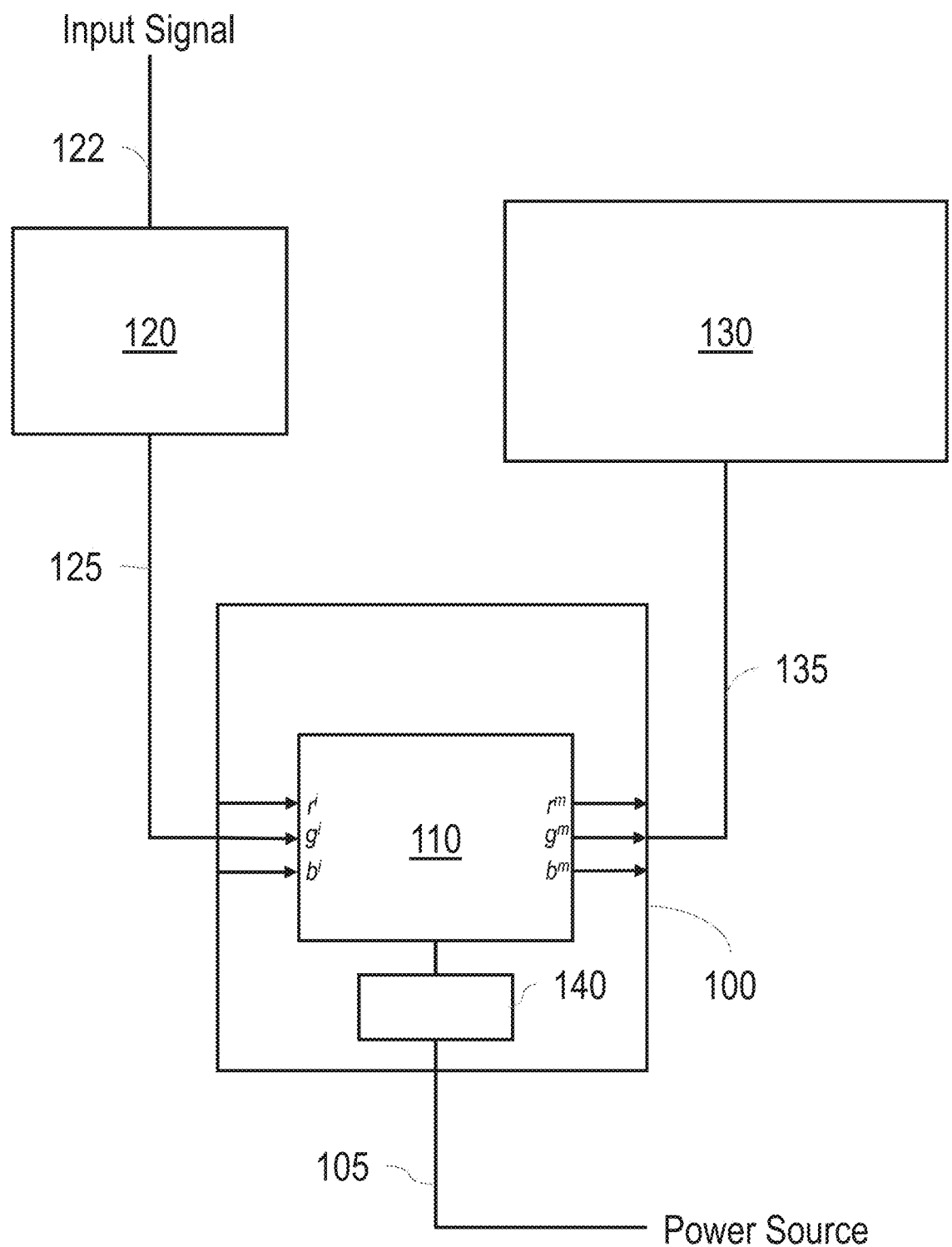
FIG. 2 shows an embodiment of a system including a set top box for reducing the myopiagenic effect of a TV set.

Referring to FIG. 2, a set top box 100 for reducing the myopiagenic effect of a television (TV) set 130 is connected between a cable box 120 and TV set 130. A cable 125 connects an output port of cable box 120 to an input port of set top box 100, and another cable 135 connects an output port of set top box 100 to an input port of TV set 130. Cables 125 and 135 are cables capable of carrying a video signal, including analogue video cables (e.g., composite video cables, S-video cables, component video cables, SCART cables, VGA cables) and digital video cables (e.g., serial digital interface (SDI) cables, digital visual interface (DVI) cables, HDMI cables, DisplayPort cables).

Set top box 100 includes an electronic processing module 110 and an internal power supply 140. Electronic processing module 110 includes one or more electronic processors programmed to receive an input video signal from the input port of set top box 100 and output a modified video signal to the output port. In general, a variety of electronic processors can be used, such as an application-specific integrated circuit (ASIC) or a general purpose integrated circuit (e.g., a field programmable gate array or FPGA) programmed appropriately. Electronic processing module 110 may include other integrated circuit components (e.g., one or more memory blocks) and/or electronic components.

Internal power supply 140 is connected to a power port, to which a power supply cable 105 is connected. The power supply cable 105 connects set top box 100 to an external power source, such as a standard plug socket. Power supply 140 is configured to receive electrical power from the external power source and convert that power to power appropriate for powering electronic processing module 110 (e.g., AC-to-DC conversion at suitable current and voltage levels). Internal wiring connects power supply 140 to electronic processing module 110.

TV set 130 may include any appropriate color display including, for example, a light emitting diode display (LEDs), liquid crystal displays (LCD), a LED-backlit LCD, an organic light emitting diode (OLED) display, a color projector displays, a quantum dot display, a cathode ray tube (CRT), or a MEMS-based display, such as a digital micromirror device (DMD). TV set 130 may be a direct view display or a projection display (e.g., a front or rear projection display).

During operation, cable box 120 receives an input signal, including a video signal, from a source via cable 122. In general, cable 122 can be any of a variety of cables capable of carrying a video signal, such as an Ethernet cable, a co-axial cable, a DSL line. The input signal source can be a satellite dish, a cable TV and/or broadband internet provider, or a VHF or UHF antenna. Furthermore, the input signal can include content in addition to video signals, such as audio signals, internet web pages, interactive video games, etc.

Cable box 120 directs an input RGB video signal to set top box 100 via cable 125. The input video signal includes a sequence of image frames. Each frame is composed of a series of rows and columns of pixels, possibly arranged as a pixel array, and the input video signal includes information about the color of each pixel in each frame. In general, the input RGB video signal includes, for each pixel in each frame, a value for red, $r^i$, and value for green, $g^i$, and a value for blue, $b^i$. Typically, the higher the value for each color, the higher the intensity of the primary contributing to the pixel color. The range of values for each color depends on the number of bits, or color depth, of the signal. For 24-bit color, for example, each component color has a value in a range from 0 to 255, yielding $256^3$ possible color combinations. Other color depths 8-bit color, 12-bit color, 30-bit color, 36-bit color, and 48-bit color.

More generally, alternative forms for color coding in video signals to RGB may be used (e.g., Y'CbCr, Y'UV) and algorithms for transforming RGB signals to other color signal formats and back are known.

The electronic processing module 110 generates an output RGB video signal based on the input video signal so that the corresponding image displayed using TV 130 produces either (i) a reduced level of differential stimulation between L cones and M cones in a viewer's eye and/or (ii) a reduced level of differential stimulation between neighboring cones, compared with the viewing an image produced using the input video signal. The electronic processing modules achieves this by outputting a video signal that includes, for each pixel in each frame, having a value for red, $r^m$, a value for green, $g^m$, and a value for blue, $b^m$, based on at least the respective values $r^i$, $g^i$, and $b^i$ for the corresponding pixel in the corresponding frame in the input video signal. In order to provide reduced myopiagenia in the displayed image, for certain pixels either $r^m \ne r^i$, $g^m \ne g^i$, and/or $b^m \ne b^i$. In general, the video signal modification can vary depending on the factors that include, e.g., settings on TV 130, content being viewed, viewing time, viewer's retinal composition, viewer's age, viewer's race or ethnicity, viewer's color vision status, etc. Exemplary algorithms for video signal modification are described below.

While set top box 100 includes an internal power supply 140, other configurations are also possible. For example, in some embodiments, an external power supply is used. Alternatively, or additionally, set top box 100 can draw power from batteries or from cable box 120 via cable 125 or a separate cable connecting the two components. Set top box 100 can include additional components, such as memory buffers for buffering input signals before processing them, or modified signals after processing them before sending them to TV set 130. Memory buffers may reduce latency during operation.

Moreover, while the components depicted in FIG. 2 are connected to each other via physical cables, in general, one or more of the connections can be wireless connections (e.g., Wi-Fi connections or Bluetooth).

Figure 3:
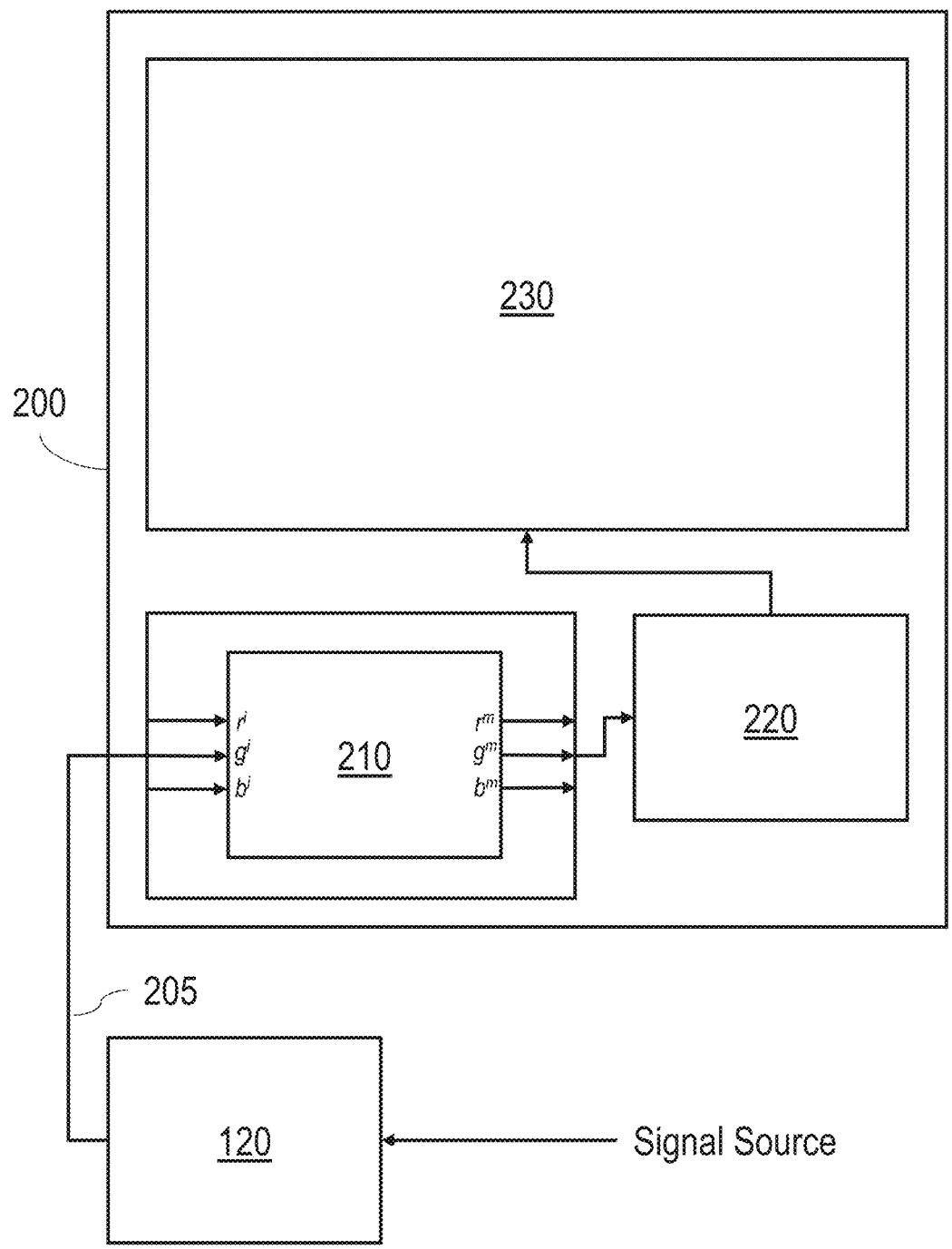
FIG. 3 shows another embodiment of a system including a set top box for reducing the myopiagenic effect of a TV set.

Referring to FIG. 3, in some embodiments, the electronic processing module for reducing the myopiagenic effect is housed in the TV set itself, rather than as a separate set top box as previously described. Here, a TV set 200 includes an electronic processing module 210 in addition to a display panel 230 and display driver 220. A cable 205 connects cable box 120 to TV set 200.

Electronic processing module 210 operates in a similar way as electronic processing module 110 described above in that it receives an input video signal from cable box 120 and outputs a modified video signal that for reduced myopiagenia. Electronic processing module 210 directs the modified video signal to display driver 220, which in turn directs drive signals to display panel 230 to display the modified images.

Furthermore, while the foregoing examples described in FIGS. 2 and 3 receive digital video signals from a cable box, the video signals can be from other sources. For example, video signals may be supplied from a video game console or television set top box instead of (or in addition to) a cable box. For instance, video signals from commercially-available set top box (such as Roku, Apple TV, Amazon Fire, etc.) or digital video recording (DVR) device such as TiVO or similar, video game consoles, such as X-box consoles (from Microsoft Corp., Redmond Wash.), PlayStation consoles (from Sony Corp., New York, N.Y.), or Wii consoles (from Nintendo, Redmond, Wash.), can be modified.

Figure 4A:
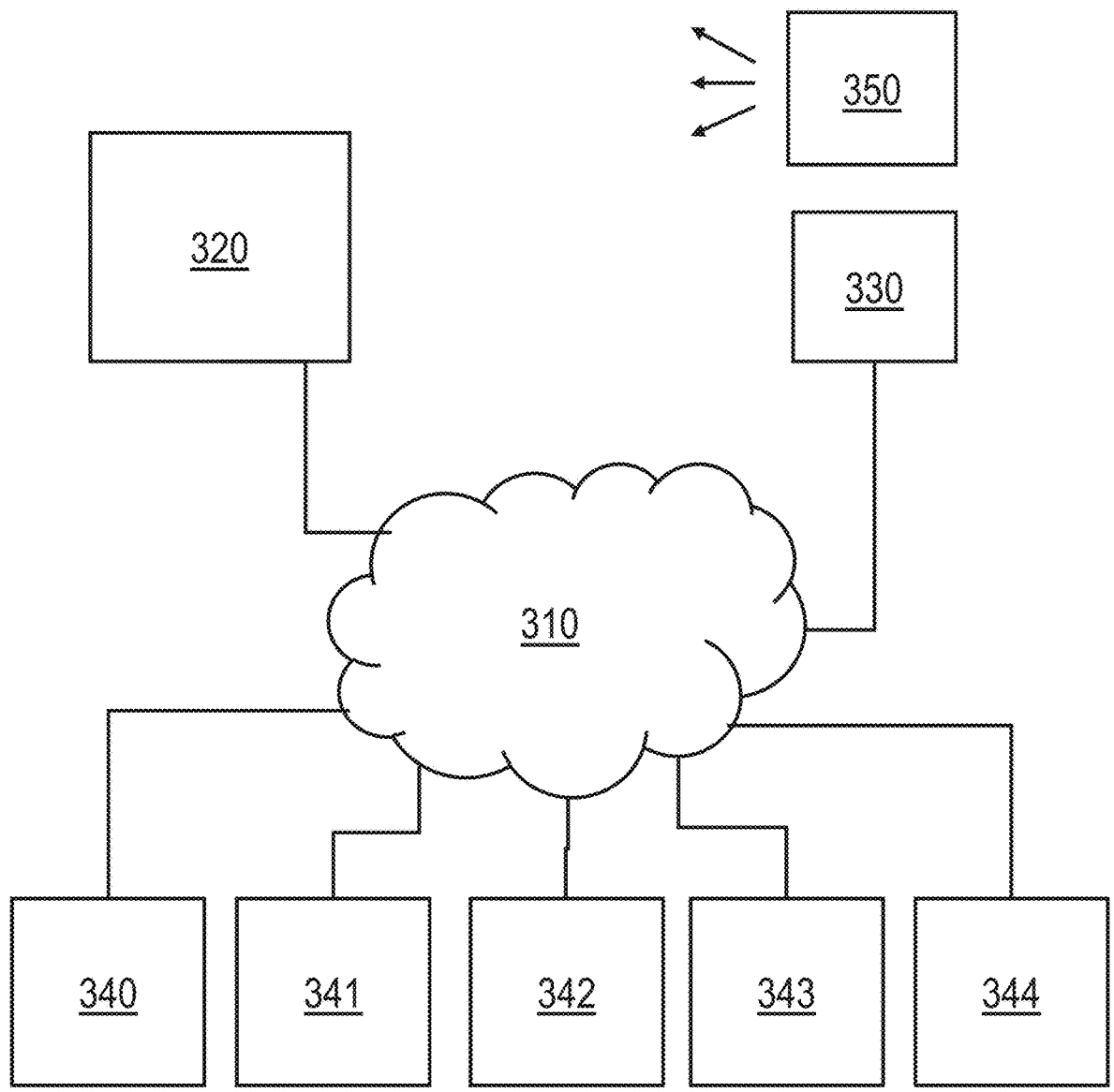
FIG. 4A shows an embodiment of a local area network including a server for delivering content for which the myopiagenic effect has been reduced.

Other implementations are also possible. For example, referring to FIG. 4, in some embodiments, a modified video signal is provided by a networked server 320 via a WAN 310 (e.g., the internet) to one or more end users 340-344 and no additional hardware is required by the end user. The original (unmodified) video signal may be received by networked server 330 from either a networked provider 330 or via broadcast signal (e.g., VHF, UHF, or satellite signal) from a broadcaster 350.

While the foregoing examples relate to modifying color in a TV set, the concepts disclosed herein may be generally applied to other devices that contain a color display. For example, the concepts may be implemented in computer monitors, digital signage displays, mobile devices (e.g., smart phones, tablet computers, e-readers), and/or wearable displays (e.g., head-mounted displays such as virtual reality and augmented reality headsets, Google glass, and smart watches).

Moreover, while the foregoing examples utilize a dedicated electronic processing module for modifying display signals, other implementations are also possible. For example, in some embodiments, video signal modification can be applied via software solutions alone. In other words, video signals can be modified using software solutions installed on existing hardware (e.g., using a display's video card or a computer's or mobile device's processor).

In some embodiments, video signals are modified using an app downloaded, e.g., from the internet. For instance, on a mobile device (e.g., running Google's Android operating system or Apple's iOS operating system) signal modification may be implemented using a downloaded app.

More generally, versions of the system can be implemented in software, in middlewear, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The Myopiagenic Effect

Figures 4B, 4C:
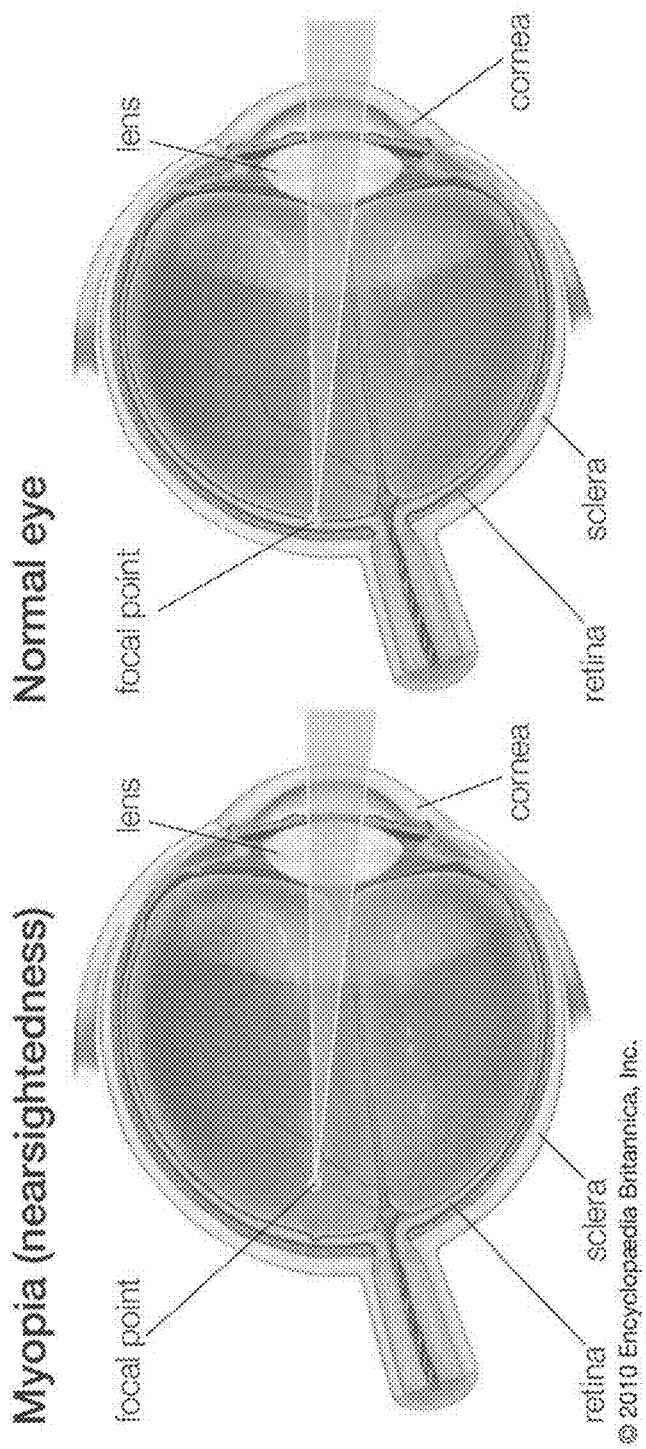
FIGS. 4B-4C show side cross-sections of a myopic eye and a normal eye, respectively.

Before discussing algorithms for modifying video signals, it is instructive to consider the cause of the myopiagenic effect of electronic displays. Myopia—or nearsightedness—is a refractive effect of the eye in which light entering the eye produces image focus in front of the retina, as shown in FIG. 4B for a myopic eye, rather than on the retina itself, as shown in FIG. 4C for a normal eye. Without wishing to be bound by theory, it is believed that television, reading, indoor lighting, video games, and computer monitors all cause progression of myopia, particularly in children, because those displays produce stimuli that cause uneven excitation of L and M cones (for example stimulating L cones more than M cones) and/or uneven excitation of neighboring cones in the retina. During childhood (approximately age 8), adolescence (before age 18), and young adulthood (until age 25 years or age 30 years), these factors of differential stimulation result in abnormal elongation of the eye, which consequently prevents images from be focused on the retina.

There are two factors in an image that can result in a high degree of retinal cone contrast and high center-surround antagonism in the visual system: one spatial and one chromatic. The spatial factor refers to the degree to which an image contains high spatial frequency, high contrast features. Fine contrast or detail, such as black text on a white page, form a high contrast stimulation pattern on the retinal cone mosaic. The chromatic factor refers to how uniform blocks of highly saturated colors stimulate cone types asymmetrically, and therefore form a high contrast pattern on the retina. For example, red stimulates L cones more than M cones, whereas green light stimulates M cones more than L cones. Shorter wavelength light, such as blue, stimulates S cones more than either L or M cones. The degree of color can refer to either the number of pixels of that color as well as their saturation levels, or both. Here, for example, red pixels may be identified as pixels for which r is greater than g and/or b by a threshold amount or a percentage amount. Alternatively, or additionally, red pixels may be identified as pixels that have a red hue in the 1931 or 1976 CIE color space. Similarly, green pixels could be identified as pixels for which g is greater than r and/or b by a threshold or percentage amount; or green pixels may be identified as pixels that have a green hue in the 1931 or 1976 CIE color space. Similarly, blue pixels could be identified as pixels for which b is greater than r or g by a threshold amount or a percentage amount; or blue pixels could be identified as pixels that have a blue hue in the 1931 and 1976 CIE color space.

Figures 5A, 5B:
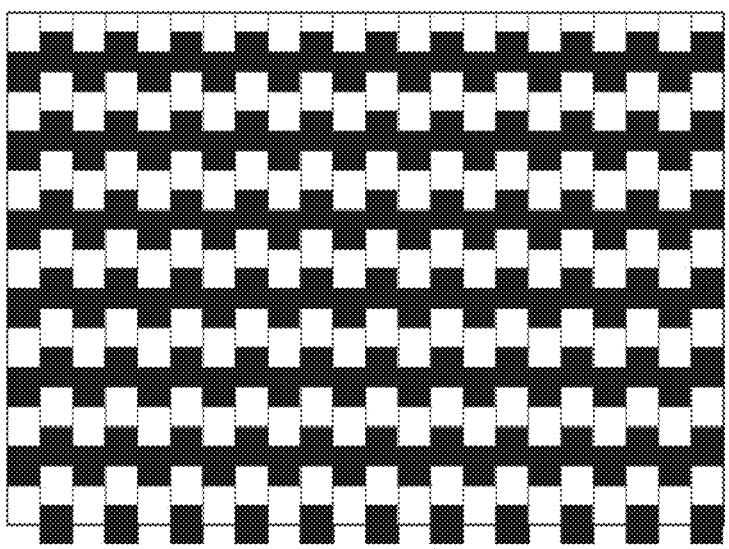
FIG. 5A shows a stimulus composed of a black and white checkerboard array.
FIG. 5B shows a distribution of L, M, and S cones in a simulated retina.
Figure 6B:
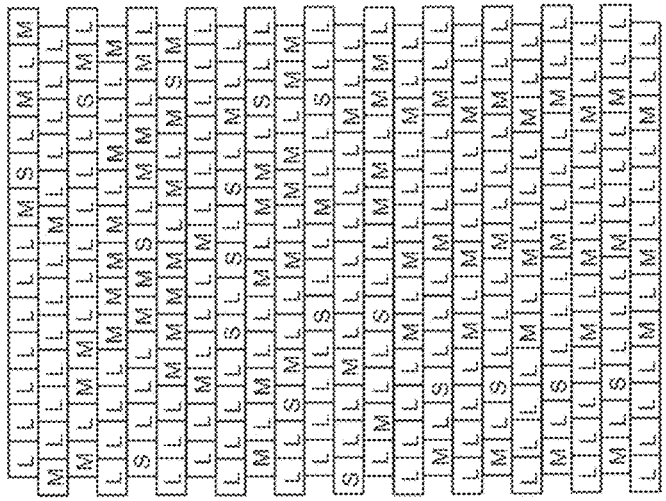
FIG. 6B shows a distribution of L, M, and S cones in a simulated retina.
Figure 6A:
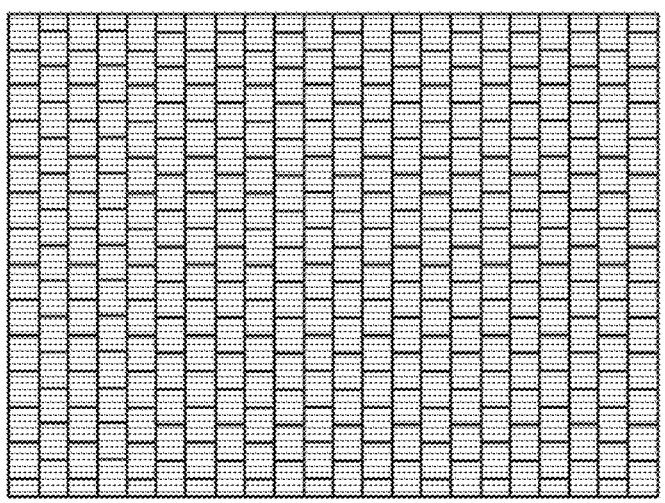
FIG. 6A shows a stimulus composed of an array of red pixels.

Referring to FIGS. 5A-5C and 6A-6C, the spatial and chromatic effects can be explained as follows. Each figure shows a hexagonal mosaic, corresponding to the spatial mosaic of cones on a retina. The arrangement of cones is depicted in FIGS. 5B and 6B, where the L cones are colored red, the M cones are colored green, and the S cones are colored blue. FIGS. 5A and 6A show two different types of stimuli at the retina and FIGS. 5C and 6C depict the cone responses due to the respective stimuli.

The stimuli in FIG. 5A corresponds to a high frequency, high contrast checkerboard pattern of white and black across the retina. As used herein, black refers to a pixel in its darkest state and white refers to a pixel in its brightest state. For 8-bit color in an RGB color system, for example, black is typically represented by the values (0, 0, 0) and white by (255, 255, 255). The spatial frequency of the checkerboard pattern is half the spatial frequency of the cones so, on a row by row basis, every alternate cone is has a high response (due to stimulation by white light) and the adjacent cones see no response (because there is no incident light at all). This response is depicted in FIG. 6C and the result is a high degree of differential stimulation in the cone mosaic, including between at least some of the L cones and some of the M cones. The response is shown on a scale from 0 to 1, where 0 is no stimulus and 1 is maximum stimulus. A legend showing the grayscale ranges on this scale is provided.

The stimuli in FIG. 6A corresponds to homogeneous red light of uniform intensity across the retina. As depicted in FIG. 6C, there is a low response by the M and S cones (depicted by black squares in the mosaic) and some response by the L cones (depicted as grey squares). Accordingly, the red stimulus results in a differential stimulation of cones within the retina, particularly L cones compared to M cones.

Prior approaches to addressing the myopiagenic effect of displays focused on excess stimulation of L cones compared to M cones (see, e.g., WO 2012/145672 A1). In other words, the prior approach focused on reducing the saturation of red pixels in an image. The focus on L and M cones is also understandable, because together they make up ~95% of cones in the human eye. The focus on red wavelengths in particular is also understandable for two reasons: (1) red wavelengths stimulate L and M cones at a high differential (~4.5:1) compared to green light (~1:1.5) or blue light (~1:1); and (2) artificial light from screens, for example from video games and animation, contains abundant red light in comparison with sources of red in the outdoor world, where it is found sparingly. However, the present disclosure further recognizes that high spatial frequency, high contrast images can similarly result in a similar myopiagenic response and a more comprehensive solution should account for the effect of such images. For example, if one considers only the amount of red in an image when applying a correction, the myopiagenic effect of a red image (e.g., that has L>M) is reduced, e.g., by introducing a green ring around the image and/or reducing saturation of the red image by decreasing the red level and/or increasing green. However, such as approach would not apply any improvement to an image on the basis of neighboring cone contrast. Similarly, a black and white checkerboard would not be improvable under the prior approach, because each black and each white pixel approximates an equal energy illuminant, and therefore would not be subject to an improved L/M ratio. However, such a black/white checkerboard would be subject to improvement in the present disclosure, because it creates high neighboring cone contrast; methods to improve such images are disclosed and described herein. Accordingly, algorithms that account for high spatial frequency effects are disclosed which can be used either alone or in combination with algorithms which reduce red saturation.

Algorithms for Myopia Reduction

Turning now to algorithms for reducing the myopiagenic effect of displayed images, in general, the color of each pixel in each frame can be modified based on one or more of the following parameters: (i) the color of the pixel in the frame itself; (ii) the location of the pixel in the frame, such as the proximity of the pixel to the edge of the frame; (iii) the color of another pixel in the frame, such as a neighboring pixel; (iv) the color of that same pixel in another frame, such as the preceding frame; and/or (v) the color of a different pixel in a different frame.

Implementations may reduce saturation of red pixels in an image, reduce contrast between adjacent pixels, or both.

Figure 7:
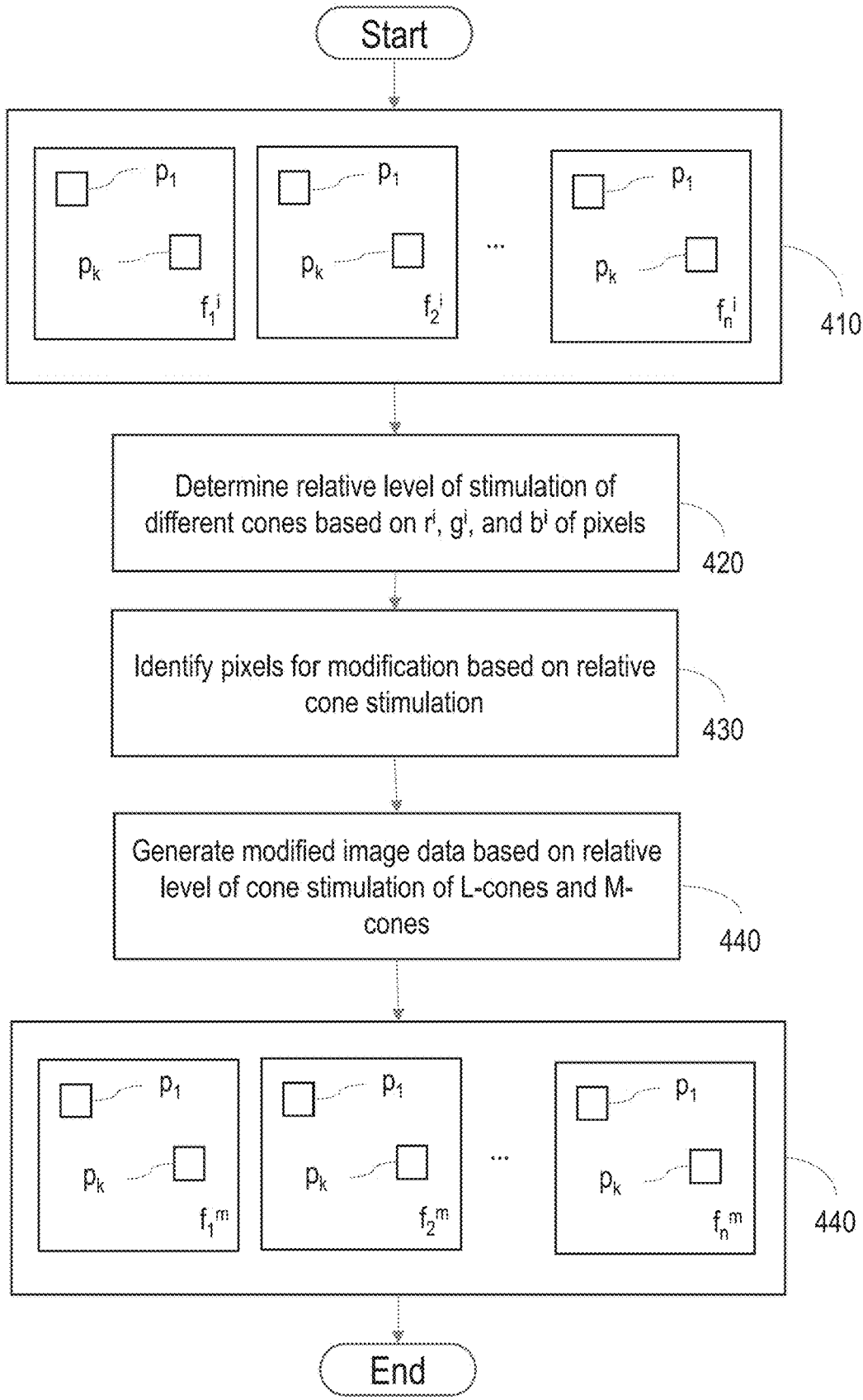
FIG. 7 shows a flowchart of an algorithm for producing a modified video signal for reducing the myopiagenic effect of a display.

Referring to FIG. 7, an initial video signal 410 is provided that includes image information for a series of n initial frames, $f_1{}^i, f_2{}^i, \ldots, f_n{}^i$. Each frame is composed of k pixels, $p_1, p_2, \ldots, p_k$. Each pixel is composed of three color component values, $r^i$, $g^i$, and $b^i$, corresponding to values for red, green, and blue, respectively.

In step 420, a relative level of stimulation of L cones, M cones, and/or S cones is determined for each pixel in each frame based on the values $r^i$, $g^i$, and $b^i$. For example, this step may simply involve comparing the value of $r^i$ to the value of $g^i$ and/or $b^i$ for a pixel. Alternatively, or additionally, XYZ tristimulus values, LMS values, or other ways to measure cone stimulation may be calculated from the RGB values.

Next, in step 430, one or more pixels are identified for color modification based on the relative level of L, M, and/or S cone stimulation by each pixel. For example, in some embodiments, red pixels are identified by comparing the RGB values or based on a hue of each pixel. In other embodiments, pixels are chosen because of high levels of color contrast with other neighboring pixels. In still other embodiments, pixels are chosen because of high differences in cone stimulation levels among neighboring cones.

In some embodiments, pixels are identified based on the color of other pixels in the frame. For example, groups of adjacent red pixels (e.g., corresponding to red objects in an image) are identified for modification but lone red pixels are left unmodified. Alternatively, or additionally, pixels may be identified for color modification based on the color of the same pixel in other frames. For example, in some embodiments, red pixels that persist for more than one frame (e.g., for one or several seconds, or more) may be identified for color modification, but those red pixels that exist for only one or just a few frames (e.g., a <1 second, <0.1 seconds, or <0.01 seconds) may be left unmodified.

In step 440, modified image data is generated based on the relative level of stimulation of L cones to M cones, or the level of adjacent cone contrast, and, in some cases, other factors (e.g., user preferences and/or aesthetic factors). A variety of modification functions may be used. In general, the modification will reduce the level of red saturation in a pixel's color and/or reduce the contrast level between adjacent pixels or adjacent groups of pixels.

In some embodiments, for those pixels identified for color modification, modified image data is generated by scaling $r^i$, $g^i$, and/or $b^i$, e.g., by a corresponding scale factor $\alpha$, $\beta$, $\gamma$.

In other words:

$r^m = \alpha r^i$,
$g^m = \beta g^i$, and/or
$b^m = \gamma b^i$.

In general, the scale factors $\alpha$, $\beta$, and/or $\gamma$ for each pixel may vary depending on a variety of factors, such as, for example $r^i$, $g^i$, and/or $b^i$ for that pixel, $r^i$, $g^i$, and/or $b^i$ of another pixel in the same frame, $r^i$, $g^i$, and/or $b^i$ of the same pixel in a different frame, $r^i$, $g^i$, and/or $b^i$ of a different pixel in a different frame, and/or other factors.

For example, in some embodiments, where $r^i > g^i$ and $r^i > b^i$ in a pixel, $r^i$ may be decreased for that pixel by some amount (i.e., $0 < \alpha < 1$) and/or $g^i$ may be increased for that pixel by some fractional amount (i.e., $1 < \beta$). $b^i$ may be unchanged (i.e., $\gamma = 1$), or can be increased or decreased. In certain implementations, $\alpha$ and/or $\beta$ are functions of the difference between $r^i$ and $g^i$. For instance, scale factors can be established so that the larger the difference between $r^i$ and $g^i$, the more the red value in the modified signal is reduced relative to the initial signal and/or the more the green value in the modified signal is increased. By way of example, one simple mathematical formulation for this type of scale is:

$\alpha = k_\alpha (r^i - g^i) + c_\alpha$, and $\beta = k_\beta (r^i - g^i) + c_\alpha$.

Here, $k_\alpha$ and $k_\beta$ are proportionality constants and $c_\alpha$ and $c_\beta$ are constant offsets. $k_\alpha$ is negative so that a larger difference between $r^i$ and $g^i$ results in a smaller value for $\alpha$. Conversely, $k_\beta$ is positive so that increases proportionally to the difference between $r^i$ and $g^i$. The proportionality constants and constant offsets may be determined empirically.

Generally, in implementations where $0 < \alpha < 1$ and $\beta = \gamma = 1$, red pixels in the modified image will appear darker than in the initial image. In implementations where $\alpha = \gamma = 1$ and $1 < \beta$, red pixels in the modified image will appear whiter lighter than in the initial image. In both cases, the degree of red saturation in the red pixels will decrease as the amount of red decreases relative to green.

In yet another embodiment, matrix multipliers may be used that create a linear transformation:

$$\begin{bmatrix} r_f \\ g_f \\ b_f \end{bmatrix} = \begin{bmatrix} \alpha \\ \beta \\ \gamma \end{bmatrix} \begin{bmatrix} r_i & g_i & b_i \\ r_i & g_i & b_i \\ r_i & g_i & b_i \end{bmatrix}$$

In some embodiments, values for $r_f$, $g_f$, and $b_f$ are derived from linear combinations of their corresponding initial values and the difference between r and g. To illustrate an example that is not meant to bound the invention:

$r_f = r_i + \alpha(r_i - g_i)$ $g_f = g_i + \beta(r_i - g_i)$ $b_f = b_i + \gamma(r_i - g_i)$ In one embodiment, $-1 < \alpha < 0$ and $\beta$ and $\gamma$ are both values between 0 and 1. More specifically, where $\beta = \gamma = -\alpha/2$, the transformation results in a final pixel that is equilluminant to the initial pixel. The condition of equilluminance is satisfied when $(r_f + g_f + b_f) = (r_i + g_i + b_i)$.

While the modification of each component color described above is proportional to the input component color value, non-linear scaling is also possible (e.g., involving more than one scale factor and one or more additional higher order terms in the input component color value).

Finally, a modified video signal 440 is output, containing image information for a series of n modified frames, $f_1^m, f_2^m, \ldots, f_n^m$, each containing the same number of pixels, f f k, as the initial frames. For at least a subset of pixels, the RGB values are modified from the input signal. The other pixels may be unchanged from the input signal. For example, the color of all the red pixels may be modified, while the color of the pixels that are not red are left unchanged.

As noted previously, in some embodiments, a pixel's color is modified based on the color of a different pixel in the same frame. For example, the algorithm can include adjacent red pixels (e.g., corresponding red objects in an image), and reduce $r^i-g^i$ for those pixels by a certain amount, while leaving isolated red pixels unchanged or reducing $r^i-g^i$ by a different (e.g., lesser) amount.

By basing a pixel's color modification on the color of a different pixel in the same frame, the effect of color modification perceived by a viewer's visual processing in the brain may be reduced, e.g., using perceptual illusions such as the so-called watercolor effect or so-called Cornsweet effect. In the watercolor effect, a red object may appear to be more saturated than it actually is when the edge of the object is more saturated than the interior. The watercolor effect may be used when modifying the color of objects in a frame, particularly when they are bordered by pixels that have chromaticies in opposite direction in color space or much darker pixels. See, e.g., http://www.scholarpedia.org/article/Watercolor illusion.

Figure 8A:
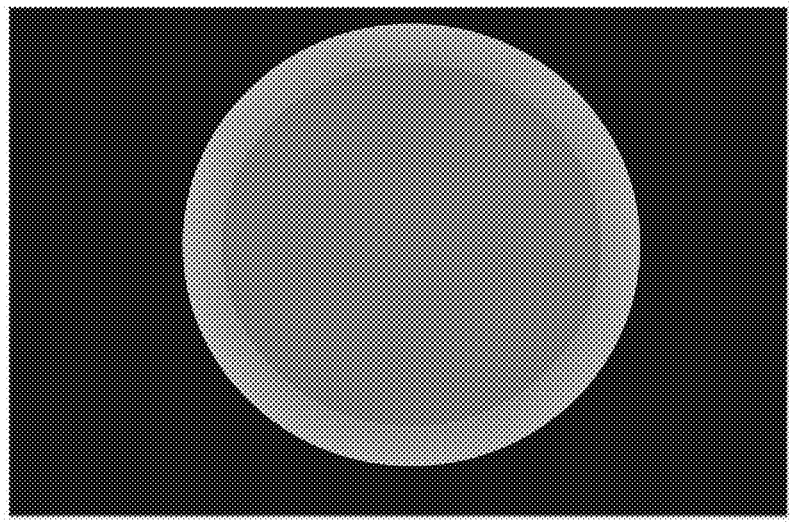
FIG. 8A shows a stimulus for which the watercolor effect has been used to reduce the myopiagenic effect of the image.

Referring to FIG. 8A, the watercolor effect is illustrated for a red circle against a black background. The initial image features a highly saturated, uniformly red circle. The modified image, as shown, maintains the highly saturated red pixels (R=255, G=0, B=0) at the boundary of the circle, but reduces red saturation towards the interior of the circle (R=177, G=57, B=55). There is a radial gradient toward the center, where the gradient occurs on the outer ½ to ⅓ of the circle, avoiding the appearance of an annular discontinuity of the circle color.

The Cornsweet effect is an optical illusion where the gradient within a central line or section creates the impression that one side of the image appears darker than it actually is in reality. This effect may be utilized to reduce the brightness of red objects that border other red objects, for example, to allow a reduction in myopiagenic contrast while preserving an impression to the viewer that the image is highly saturated.

Figure 8B:
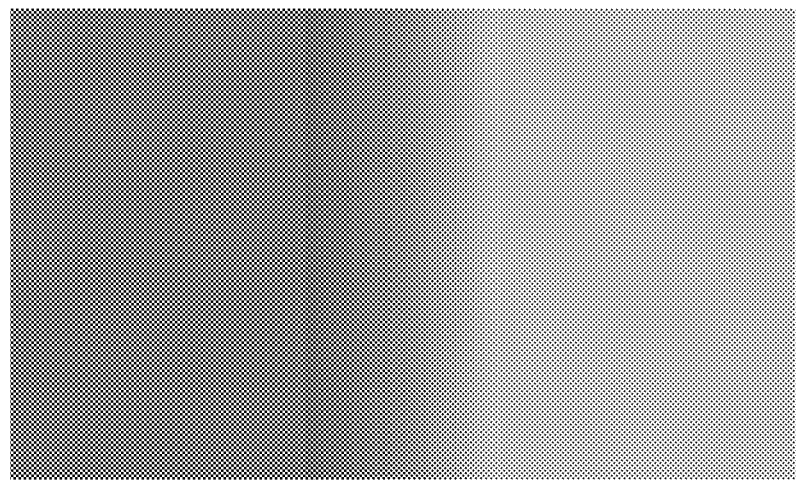
FIG. 8B shows a stimulus for which the cornsweet effect has been used to reduce the myopiagenic effect of the image.

FIG. 8B shows an example of the Cornsweet effect. Here, the left most side of figure appears to be a brighter red than the right hand side. In reality, both sides have the same brightness. The illusion is created by the dark to bright gradient between the two sides when viewed from left to right. Using the cornsweet effect it may be possible to reduce the saturation of certain red objects adjacent less saturated red objects with minimal change perceived by the viewer by introducing a light to dark gradient between the two objects.

Implementations that use illusions like the watercolor effect and Cornsweet effect may include additional image processing steps, such as identifying red objects in an image that may be candidates for the effect. Establishing candidacy of objects for these effects can be done based on factors such as the size and shape of the red object, uniformity of the red color of the object, and/or the nature of the bordering color.

In some embodiments, the modification to a red pixel's color can be modified based on the location of the pixel in a frame. For example, if a pixel located closer to an edge of the frame may be modified, while a pixel of the same color located closer to the middle of the frame is unchanged or modified to a lesser degree.

In other embodiments, the modification to a red pixel's color can be modified based on the type of object that the pixels represent. Certain objects may be deemed to be important to preserve in their original colors. One example might be a company logo or branded product where the colors are very recognizable. Using image analysis, those objects could be identified by comparison to an image database, and flagged for differential treatment in the algorithm.

Alternatively, or additionally, the color of a pixel in one frame may be modified based on the color of that pixel in another frame. For example, the color of colored objects that persist over a series of frames may be modified so that the degree of saturation of the reds in the object lessen over time. The time scale and rate of color change may be sufficient so that the effect is not easily noticeable to a viewer, but effectively reduces color saturation or overall retinal contrast.

In another example, the degree to which red pixels are modified may increase over time. Accordingly, the longer the viewer views the display during a particular viewing session, the greater the degree of modification of the red pixels.

In general, the algorithm may implement one or more techniques to improve computation efficiency and avoid, for example, issues with latency when delivering images to a display. For example, in some embodiments, only a subset of the pixels and/or frames are evaluated for modification. For example, for purposes of computational efficiency, not every frame is evaluated (e.g., only every other frame, or fewer, is evaluated). Such sampling may improve latency of the algorithm when executed in real time.

In some embodiments, not every pixel is evaluated in every frame. For example, only those pixels proximate to the center of the frame (e.g., where the viewer is more likely to focus) are evaluated. Alternatively, only those pixels distant from the center of the frame, where the viewer is less likely to notice changes, are evaluated. Alternatively, or additionally, image analysis techniques can be applied to identify which portions of a frame are in focus (and therefore likely to be focused on by the viewer) and apply color modification only to those pixels in the focused portions.

In some implementations, the algorithm periodically samples pixels in each frame in order to decide whether to evaluate other pixels. For example, the algorithm can check the color of every $2^{nd}$ or fewer pixels (e.g., every $3^{rd}$ pixel or fewer, every $5^{th}$ pixel, every $10^{th}$ pixel or fewer, every $20^{th}$ pixel). In the event that this initial sampling detects a pixel that is a candidate for modification, the algorithm can apply color modification to the identified pixel. Pixels in between the sampled areas can either be left unmodified or further sampled to determine if they are candidates for modification. Alternatively, they could be modified by the same linear transformation as the initially sampled pixel, or interpolated values in between sampled pixels could be used to determine the final pixel values. Such sampling techniques may be useful to improve speed of the algorithm, so that it is not necessary to evaluate every pixel in every frame.

Compression techniques used for encoding images may also be used to improve efficiency. For example, in some embodiments, chroma subsampling may be used. Examples of chroma subsampling include 4:2:2, 4:2:1, 4:1:1, and 4:2:0 subsampling. This subsampling may also be useful to improve speed of the algorithm, so that it is not necessary to evaluate every pixel in every frame. Using these techniques, the resolution of color pixels generally is reduced so that pixel rendering of color becomes easier without being readily noticeable to viewers. Alternatively, the resolution could be kept the same as in the initial image, and in-between pixels would be derived from interpolated values or linear transformation based upon the sampled pixels.

Input from additional hardware components can also be used to modify the color modification algorithm. In some embodiments, the system can include an eye-tracking module in order to follow which location on the display a user is viewing. Subsequently, color modification is applied to only the location on the display being viewed. Alternatively, color modification is applied to only the locations on the display that are not being viewed. Commercially-available eye tracking solutions may be used for this purpose. An example of a commercially-available solution is the Tobii EyeX Controller, available from Tobii AB (Danderyd, Sweden).

In some embodiments, the algorithm modifies those portions of an image that are not the focus of the viewer, but leaves the portion of the image that is focused on unchanged. In this way, the impact of the modification on the viewing experience is reduced because the modified pixels are in the viewer's periphery.

Such an approach may be especially useful in applications which render text, such as in e-readers and word processing software. Text is often displayed in high-contrast black and white which, for reasons discussed previously, can elicit a particularly acute myopiagenic response even though these images typically contain no red pixels. In some embodiments, text can be rendered in high contrast only within a portion of the image (e.g., a viewing bubble) and text outside of this area can be display with reduced contrast and/or with a blurred effect. In some embodiments, there can be a gradient between the defocused/low contrast portion of the image and the viewing bubble. In order to facilitate reading, the bubble can be moved over the text or the text can be moved through a stationary bubble. The speed of relative movement may be selected according to a preferred reading speed of the user (e.g., 20 words per minute or more, 50 words per minute or more, 80 words per minute or more, 100 words per minute or more, 150 words per minute or more, 200 words per minute or more, 250 words per minute or more, 300 words per minute or more, 350 words per minute or more, 400 words per minute or more, 450 words per minute or more, 500 words per minute or more, up to about 800 words per minute).

The size and shape of the viewing bubble can also vary as desired. The viewing bubble can correspond to an angle of about 20° or less in a user's field of view (e.g., 15° or less, 10° or less, 5° or less) in the horizontal and/or vertical viewing directions. The viewing bubble can be elliptical, round, or some other shape. In some embodiments, the user can set the size and/or shape of the viewing bubble.

In some embodiments, the viewing bubble can track the user's finger as it traces across lines of text. Devices may utilize a touch screen for finger tracking. Alternatively, the bubble can be moved by tracing a, stylus, mouse, or other indicator of attention.

A variety of techniques for establishing the viewer's focus can be used depending on the implementation. For example, eye-tracking technology can be used to follow the location on the display a user is viewing. The algorithm can use information from an eye-tracking camera to identify pixels for modification in real time. Those pixels away from the viewed location are modified while the area of focus is unmodified (or modified to a lesser extent). Eye-tracking may be particularly useful in mobile devices (e.g., using the front facing camera), computer monitors (e.g., using a video-conferencing camera), and/or with video game consoles, for example.

Alternative Cone Stimulation Determinations and Myopia Scales

Rather than simply compare the $r^i$, $g^i$, and/or $b^i$ values in order to assess whether a pixel will differentially stimulate cones, including L and M cones, in the retina, in some embodiments the algorithm calculates other quantifiable measures of cone stimulation by the image. For example, it is possible to model how much an image will differentially stimulate center-surround antagonism in the human visual system by directly quantifying the extent of spatial and chromatic contrast contained in the image. Relatively high center-surround antagonism is expected to result in a high degree of differential stimulation and therefore a larger myopia-causing effect than center-surround contrast that is relatively lower. For a discussion of center-surround receptive fields in the visual system, see for example, "Perception Lecture Notes: Retinal Ganglion Cell" by Prof D. Heeger available at http://www.cns.nyu.edu/~david/courses/perception/lecturenotes/ganglion/ganglion.html.

In some embodiments, the algorithm measures include only L cones and M cones. In other embodiments, the contributions of S cones are also included. In some embodiments, calculating cone stimulation first involves translating RGB values for each pixel to a color space that quantitatively links the spectral content of the pixel to the physiologically perceived colors in human vision. One example of such a color space is the CIE 1931 XYZ color space, discussed previously. This color space defines the XYZ tristimulus values analogously to the LMS cone responses of the human eye. Thus, rather than compare $r^i$ and $g^i$ in order to assess which pixels require color modification, algorithms can compare X and Y (or X, Y, and Z, if desired). For example, in some case, color modification is applied to those pixels for which X>Y and Z, but not for pixels where X≥Y and/or Z.

Alternatively, or additionally, cone stimulation values in LMS color space can be calculated from the XYZ tristimulus values (see, e.g., https://en.wikipedia.org/wiki/LMS color space). Algorithms for performing such calculations are known (see, e.g., the xyz2lms program, available at www.imageval.com/ISET-Manual-201506/iset/color/transforms/xyz2lms.html). With LMS values, color modification can be applied to candidate pixels, for example those whose L values are above a certain threshold and/or those pixels for which L>M (e.g., L>M and S).

Alternatively, cone stimulation can be calculated directly using the physical properties of light. Light intensity and wavelength from each of R, G, and B can be measured from a device such as a television, computer, or tablet. The intensity of each wavelength that passes through the eye and reaches the retina can be calculated. These values can then be translated into stimulation of L, M, and S cones, for example by using the Smith-Pokorny cone fundamentals (1992) or the cone fundamentals as modified by Stockman and Sharpe (2000). In general, scales derived from calculations that determine cone stimulation based on LMS values are referred to as LMS myopia scales.

While the foregoing techniques may be useful for modifying displayed images to reduce their myopiagenic effects, these techniques are based solely on the image information and do not account for variations between people's retina or conditions under which the images are viewed.

It is also possible to account for varying ratios of different cones a viewer's eyes and/or varying spatial distributions of cones. This is important because different individuals are known to have different proportions of L cones to M cones. In addition, different population groups, on average, have different proportions of L cones to M cones. Caucasians, for example, have approximately 63% L cones on average, while Asians have equal numbers of L to M cones on average. Accordingly, the myopiagenic effect of a particular stimulus can differ for different population groups.

Figure 9:
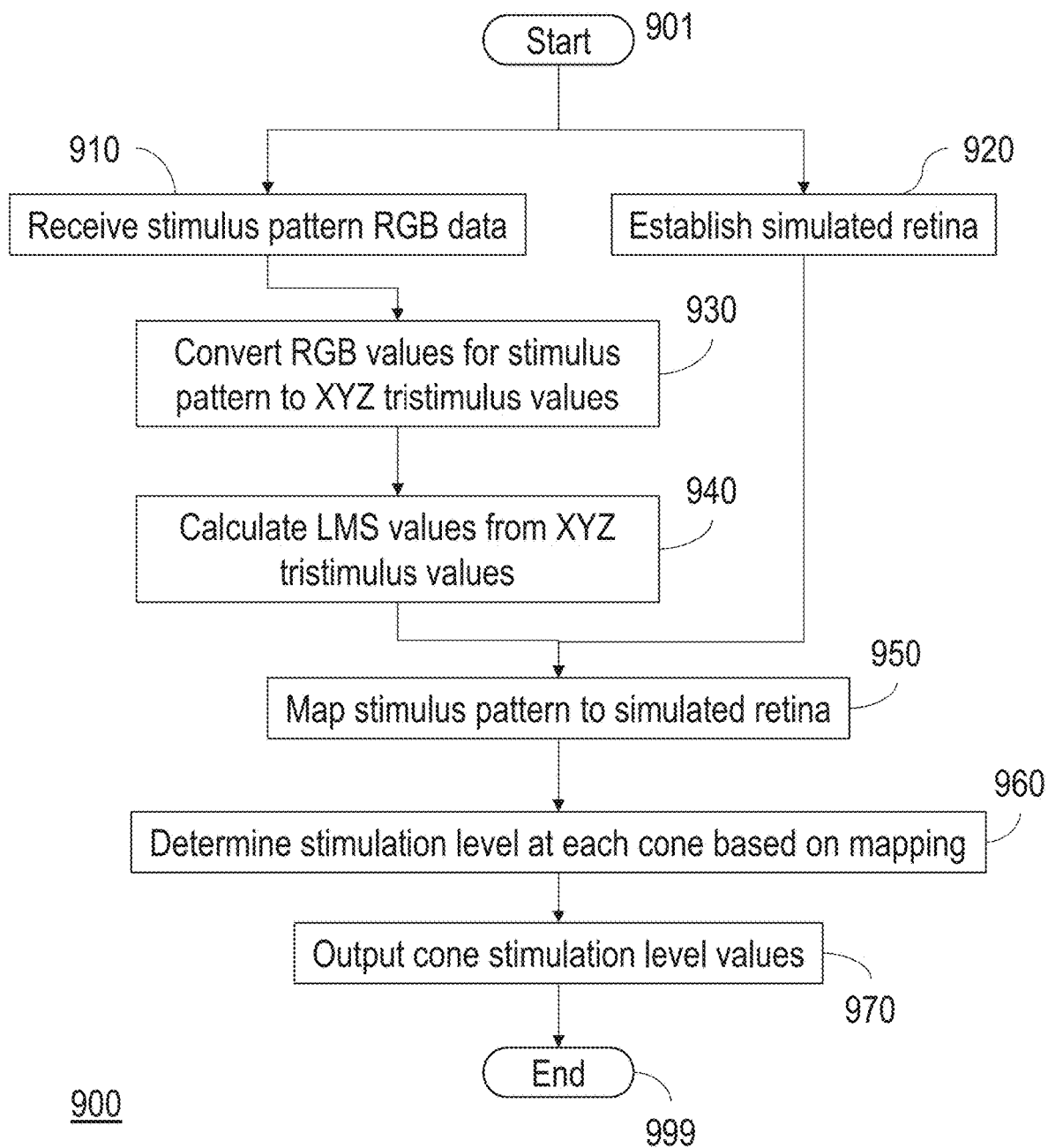
FIG. 9 is a flowchart showing an algorithm for determining a cone stimulation level in a simulated retina.

The effects of a stimulus on differing retina may be calculated based on retina models (or 'simulated retina'), for example. Referring to FIG. 9, an exemplary algorithm 900 for determining cone stimulation levels by an RGB formatted stimulus on a simulated retina is as follows. Algorithm 900 starts (901) by establishing a simulated retina (920). Generally, this involves establishing a relative number of L, M, and S cones, and establishing their arrangement pattern. FIG. 6B shows an example of a simulated retina. Here, different numbers of L, M, and S cones are randomly arranged with hexagonal packing (i.e., on a brickwall-patterned grid).

Algorithm 900 receives the stimulus pattern in RGB format (910). The RGB stimulus pattern corresponds to the colors of a pixel array, as discussed previously. In general, the pixel array can correspond to a single image frame or a portion of an image frame, for example. Generally, where an input video file is being analyzed, each frame will correspond to a separate RGB stimulus pattern. FIG. 6A shows an example of a stimulus pattern.

In step 930, the RGB values for each element of the stimulus pattern are converted into a corresponding set of XYZ tristimulus values. Such transformations are well-known. See, e.g., "Colour Space Conversions," by Adrian Ford (ajoec1@wmin.ac.uk <defunct>) and Alan Roberts (Alan.Roberts@rd.bbc.co.uk), Aug. 11, 1998, available at http://www.poynton.com/PDFs/coloureq.pdf. Next, in step 940, LMS values are calculated from each of the XYZ tristimulus values using, e.g., xyz2lms.

In step 950, the stimulus pattern is then mapped onto the simulated retina. In this example, the elements of the stimulus pattern is in a 1:1 correspondence with the cones of the simulated retina and the mapping results in the selection of the L, M, or S value at each element of the stimulus pattern depending on whether the cone at the corresponding retina location is an L cone, an M cone, or an S cone, respectively.

A stimulation level at each cone is determined from the mapping (step 960). In some implementations, this determination simply involves assigning each cone the L, M, or S value based on the mapping. In certain cases, the LMS value is scaled to fall within a particular range or the LMS value is weighted to increase or decrease a contribution due to certain portions of the spectrum or other factors.

The algorithm ends (999) after outputting the cone stimulation levels.

Implementations may involve variations of algorithm 900. For example, while algorithm 900 involves a 1:1 pixel to cone mapping, higher or lower mapping ratios may be used. For example, in some instances, cone stimulation can be calculated for stimuli where more than one pixel is imaged to a single cone. This may occur, for example, in high resolution displays or where a display is viewed from relatively far away. In such arrangements, the algorithm can include an additional step of averaging the color of groups of pixels to provide a stimulus pattern having the same resolution and grid shape as the simulated retina. The number of pixels per cone may vary. 2 or more pixels per cone may be used (e.g., 3 or more pixels per cone, 4 or more pixels/cone, 5 or more pixels per cone, 6 or more pixels per cone, 7 or more pixels per cone, 8 or more pixels per cone, 9 or more pixels per cone, or 10 pixels per cone).

In some cases, the algorithm may account for fewer than one pixel being imaged to each cone (e.g., 2 or more cones per pixel, 3 or more cones per pixel, 4 or more cones per pixel, 5 or more cones per pixel, 6 more cones per pixel, 7 or more cones per pixel, 8 or more cones per pixel, 9 or more cones per pixel, up to 10 cones per pixel). This is the case with lower resolution displays, or when displays are viewed from a closer distance. In such cases, a pixel can be assigned to more than one grid point in a stimulus pattern having the same resolution and grid shape as the simulated retina.

Some implementations can include calculating (i.e., accounting for) the number of pixels per cone for a specific display and/or user. For example, referring to FIGS. 12A and 12B, the number of pixels per cone may be calculated from the pixel density for a display as follows. First, the typical maximum retinal resolution, $\theta$, of 1 arc minute, is assumed, as well as a viewing distance, d, that is typically ≈2.5 times the display's diagonal dimension (i.e., a 60" TV is viewed from 12.5' away, and an iPhone 6 is viewed from a foot away). The calculation can be adjusted for other viewing distances, as desired. Accordingly, knowing a screen's size and resolution (e.g., 1,920×1,080 for a 1080p 60" TV set, 1,334×750 for the Apple iPhone 6), one can compare the number of pixels per square area of screen and the number of cones per square area of screen. The ratio of these numbers gives the number of pixels per cone (or the reciprocal). This illustrated for a 60" 1080P TV in FIG. 12B, for which the screen area per cone equals 0.24 mm$^2$.

Apply this calculation for a 60" 1080P TV and iPhone 6, the pixels per cone are 0.49 and 0.24, respectively.

In some embodiments, the point spread function of light can be used to map the light coming from the pixels to cones in the retina. As understood by skilled artisans, the point spread function of light is due to imperfect optics of the human eye, and effects how incident light strikes the retinal cone mosaic.

Figure 1A:
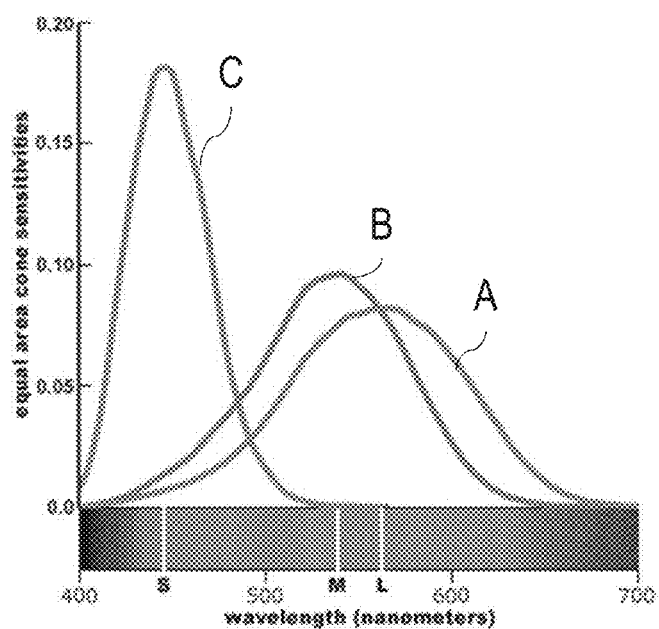
FIG. 1A is a plot showing normalized responsivity spectra of human cone cells, S, M, and L types.
Figure 1B:
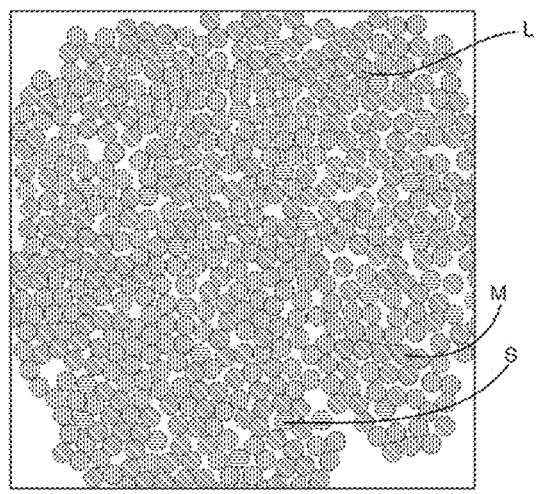
FIG. 1B shows an example of cone mosaic on a retina.
Figure 1C:
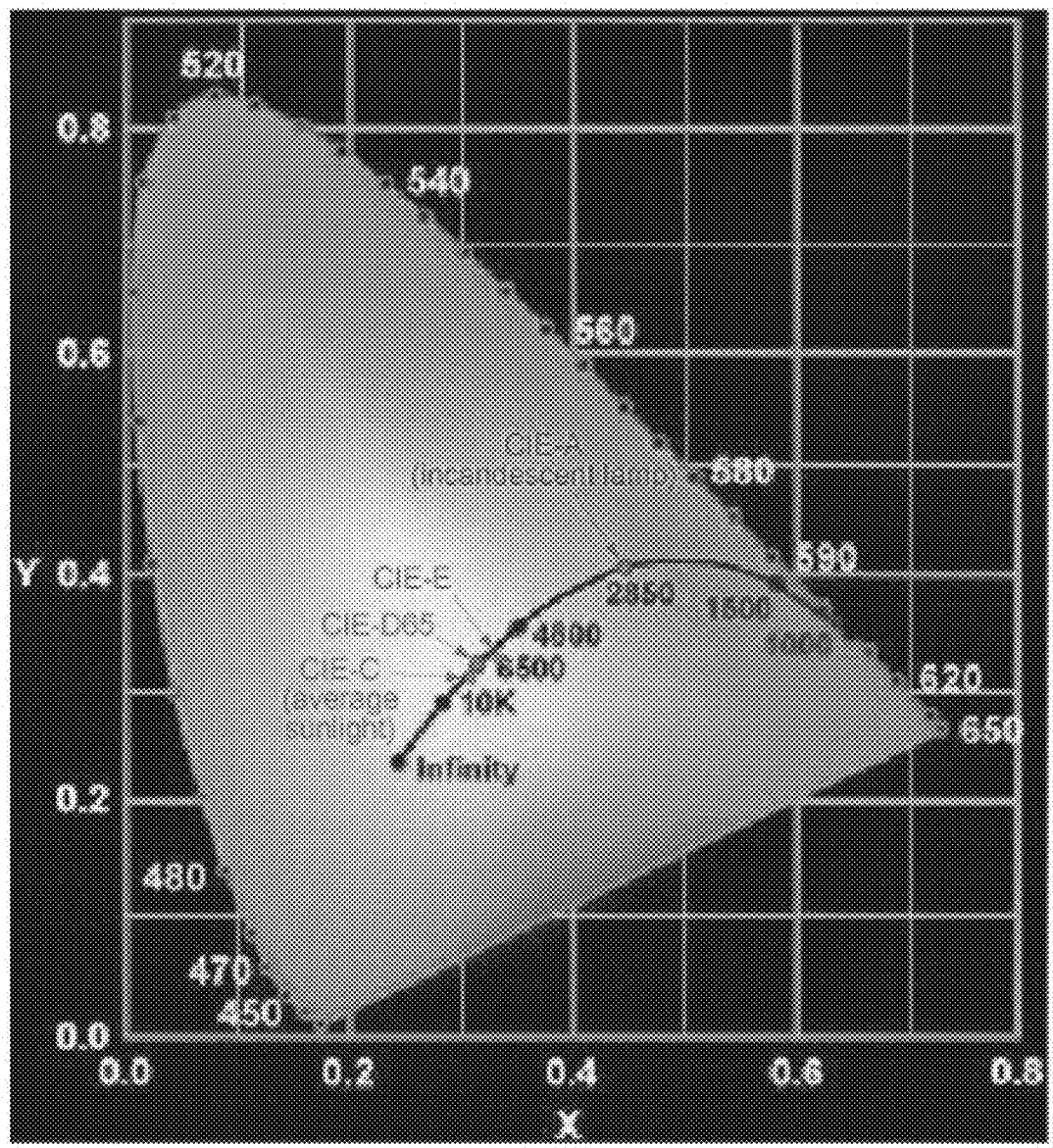
FIG. 1C is CIE 1931 chromaticity diagram showing equal energy illuminant points CIE-E, CIE-D65, and CIE-C.

In some embodiments, the equal area cone fundamentals from FIG. 1 are used to calculate the relative excitation of L, M, and S cones. Other implementations using other representations of the cone fundamentals are possible. These include cone fundamentals based on quanta, those corrected to energy terms, and those that have been normalized to peak values. Cone fundamentals for either a two-degree or ten-degree observer could be used, or any other observer for which cone fundamental data is available can be used. In addition, these calculations can be adjusted and made specific for a person's age, macular pigmentation, cone mosaic composition, and/or other factors.

In some embodiments, the equal energy illuminant D65 is used for conversions between RGB, XYZ, and LMS. In other embodiments, other illuminants can be used, such as CIE-A (incandescent lamps), CIE-C, or CIE-E.

In some embodiments, the CIECAM02 matrix is used to convert between XYZ values and LMS values. In other embodiments, other matrices are used to perform linear transformations. Any acceptable transformation matrix (or none at all, if XYZ values are used directly) can be used in this respect.

By calculating a quantifiable value for LMS cone stimulation by a stimulus pattern, it is possible to quantify the degree to which a given stimulus will differentially stimulate cones, including L cones and M cones. This quantification allows for the scoring of a stimulus (e.g., a particular image, a video file), which in turn—by comparing scores—allows for the objective comparison of the myopiagenic effect of different media.

Figure 10:
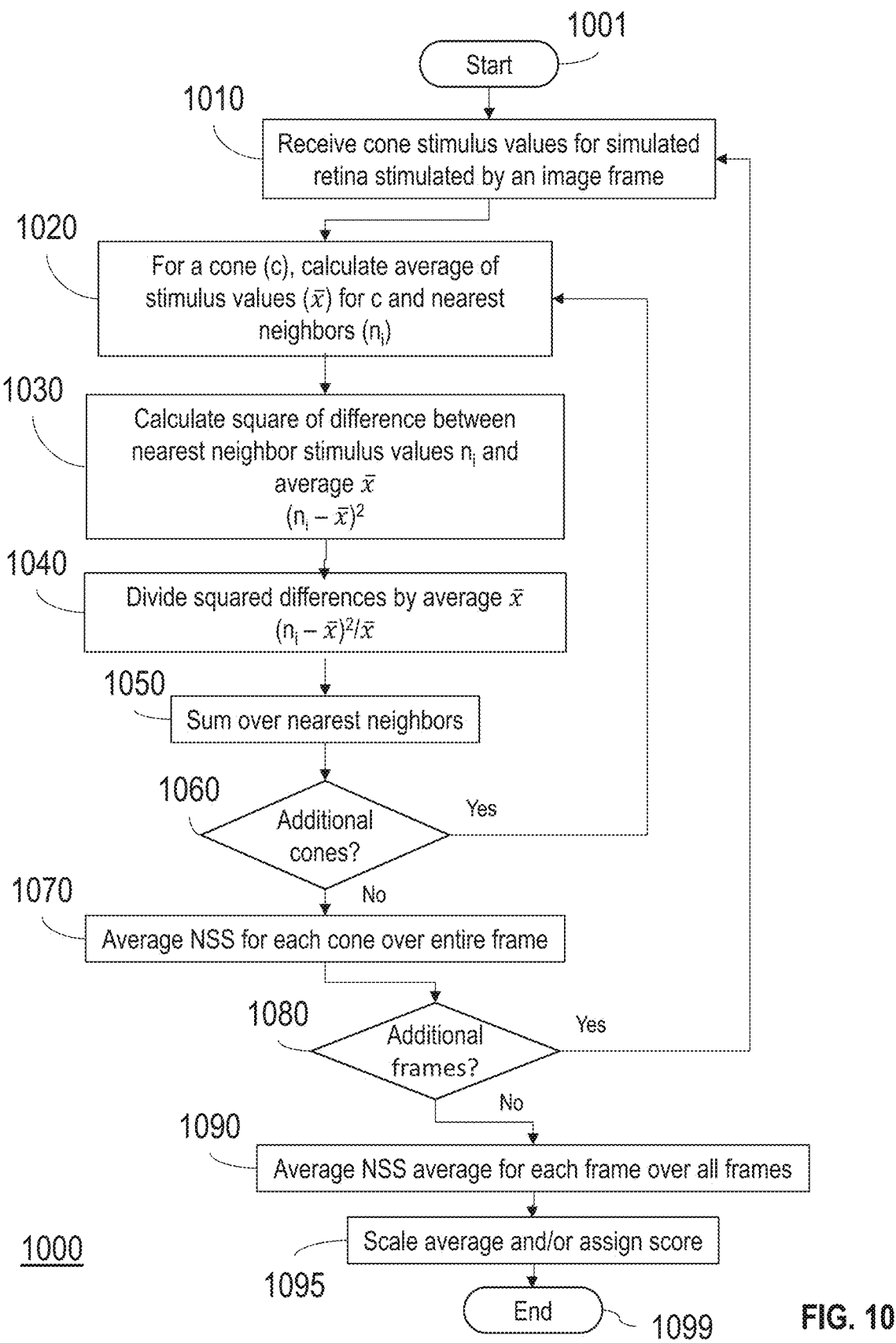
FIG. 10 is a flowchart showing an algorithm for quantifying the myopiagenic effect of a stimulus.

Referring to FIG. 10, an algorithm 1000 for scoring a digital video file is as follows. This algorithm, or similar algorithms, may be applied to other media, such as image files. The algorithm starts (1001) by receiving (or generating) cone stimulus values for a simulated retina stimulated by a frame of the digital video file (step 1010). The cone stimulus values may be determined using algorithm 900 shown in FIG. 9, for example.

For each cone, the algorithm calculates an average $\bar{x}$ of the LMS stimulus values for that cone (c) and each of its neighbors ($n_i$). In such implementations, cone c is considered the center of a visual receptive field and the nearest neighbors are the surround. For m-nearest neighbors, $\bar{x}$ is calculated as:

$$\bar{x} = \frac{1}{m+1}\left(\sum_{i=1}^{m} n_i + c\right).$$

Figures 11A, 11B, 12B:
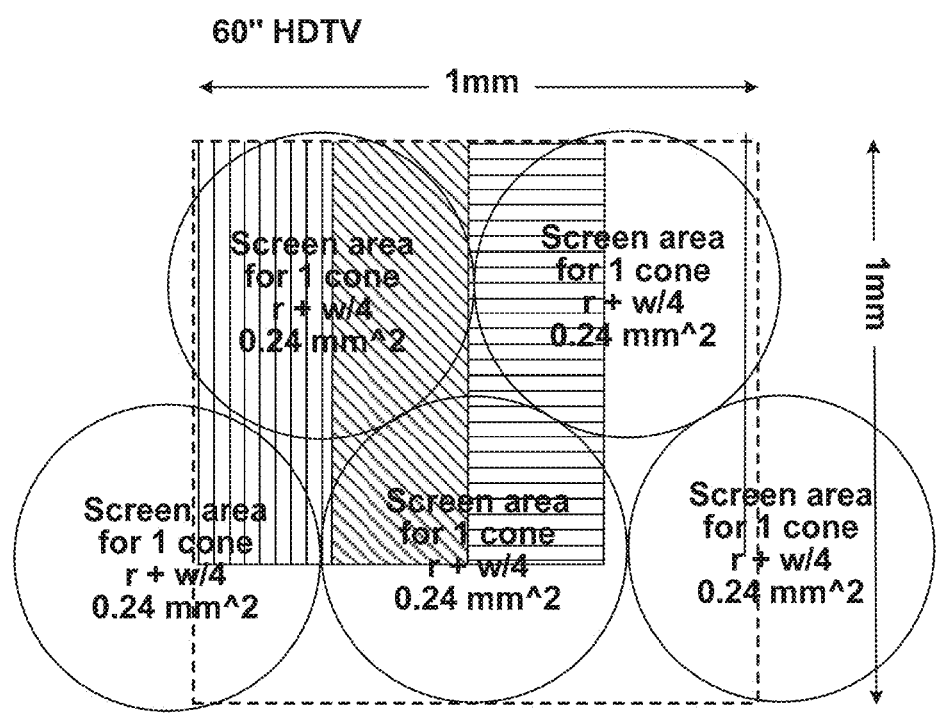
FIGS. 11A and 11B show possible arrangements of cones in a simulated retina.
FIG. 12B is a schematic diagram illustrating a cone to pixel mapping for a 1080P 60" display.
Figure 12A:
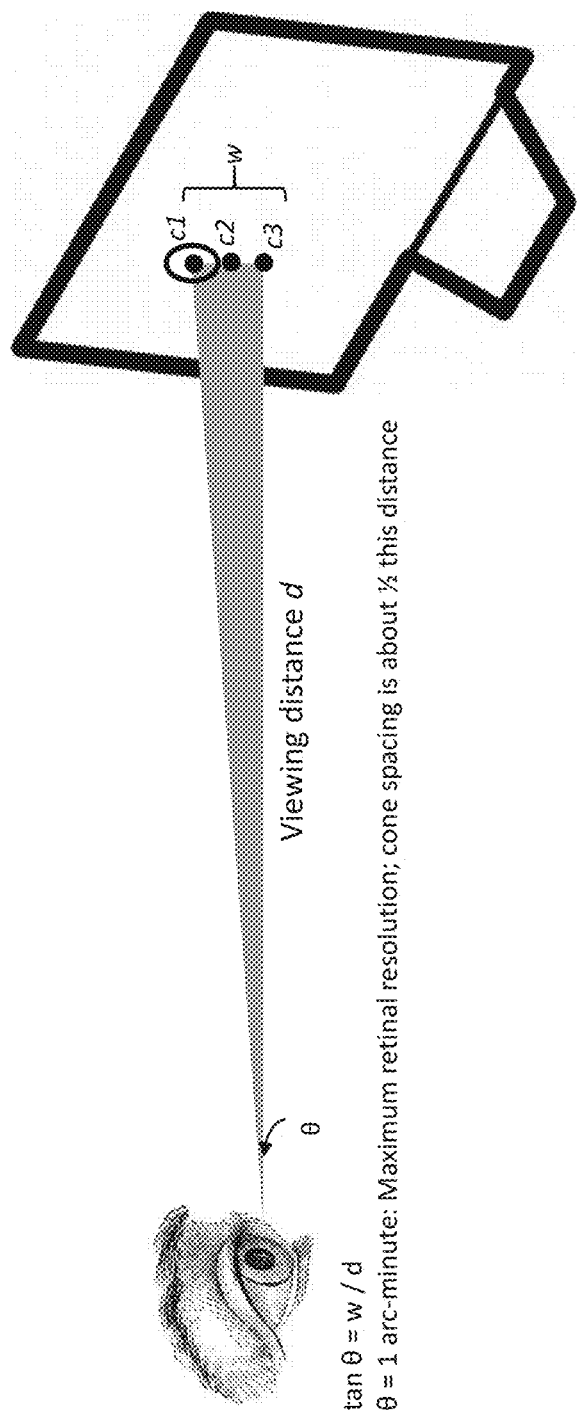
FIG. 12A is a schematic diagram showing the relationship between viewing distance and cone separation at maximal retinal resolution.

In general, the number of neighbors will depend on the cone pattern in the stimulated retina and how many neighbors are included for each cone. In one embodiment, only the nearest neighbors are considered. For example, in a grid pattern, a cone has eight nearest neighbors. Such a pattern is illustrated in FIG. 11A. With hexagonal packing, each cone has six nearest neighbors as shown in FIG. 11B.

In steps 1030 and 1040, the difference between the neighbor stimulus values, $n_i$, and the average, $\bar{x}$, is calculated, and squared, and divided by $\bar{x}$: $(n_i - \bar{x})^2/\bar{x}$. This provides a measure of the relative difference in stimulation between the cone, c, and each of its nearest neighbors. These values are summed, providing a value for the Neighbor Sum of Squares (NSS) for cone, c:

$$NSS = \sum_{i=1}^{m} \frac{(n_i - \bar{x})^2}{\bar{x}}.$$

This value provides a quantitative measured of the level of stimulation of cone, c, relative to its nearest neighbors. It is believed that a relatively high NSS value represents a large differential response and corresponds to a larger myopiagenic response from cone, c, than a lower NSS value.

While the sum of squares is used in this case to calculate a measure of relative cone stimulation, other approaches are possible. For example, the sum of absolute values of the difference between n, and x may be used instead. Alternatively, the relative absolute value $|n_i - \bar{x}|/\bar{x}$ or the overall range $|n_{max} - n_{min}|$ may be used. Other alternatives include calculate a variance of the values or a standard deviation.

NSS values are calculated for each cone in the stimulated retina (1060) and then the NSS values can be averaged over the entire frame (1070). This process is repeated for each frame (1080) and then the NSS values averaged over all frames (1090).

Finally, the frame-averaged NSS value is scaled to a desired range (e.g., a percentage) and/or the media file is scored based on the frame-averaged NSS value.

Table 1, below, provides exemplary results of such a calculation for varying stimuli. The first column, "Frame", lists the stimulus for each experiment. A 100×100 pixel array was used ("pixel count"), and a 1:1 cone-to-pixel mapping assumed. The percentage of L-to-M-to-S cones varied as indicated in columns 2-4. The results of each calculation is provided in column 6 ("Raw Scale"). The score is quoted raw, un-normalized to any particular value.

Other center-surround models are also possible. In general, such models can account for a variety of factors that are believed to influence center-surround interactions, such as relative center and surround contrasts, relative phase/collinearity, width of surround, relative orientations, spatial frequencies, and speeds, threshold vs. suprathreshold, and individual differences, which are not generally mutually exclusive. Another model for center-surround interactions, for example, is described by J. Xing and D. J. Heeger in "Measurement and modeling of center-surround suppression and enhancement," in *Vision Research*, Vol. 41, Issue 5 (March 2001), pp. 571-583. Here, the model is based on a non-linear interaction of four components: local excitation, local inhibition, surround excitation, and surround inhibition.

TABLE 1

Exemplary Myopiagenic Scale Scores

| Frame | % L | % S | % M | Pixel Count | Raw Scale | Comment |
|---|---|---|---|---|---|---|
| R = G = 100 | 63 | 5 | 32 | 100 × 100 | 4.123 | |
| R = 100 | 63 | 5 | 32 | 100 × 100 | 10.08 | |
| R = 255 | 63 | 5 | 32 | 100 × 100 | 79.4 | |
| G = 255 | 63 | 5 | 32 | 100 × 100 | 61.39 | |
| R = 255 | 48 | 5 | 48 | 100 × 100 | 97.96 | Asian ratio |
| R = 100 | 48 | 5 | 48 | 100 × 100 | 12.61 | Asian ratio |
| R = G = B = 100 | 63 | 5 | 32 | 100 × 100 | 0.217 | |
| R = G = B = 75 | 63 | 5 | 32 | 100 × 100 | 0.12 | |
| R = G = B = 255 | 63 | 5 | 32 | 100 × 100 | 1.71 | |
| R = G = B = 0 | 63 | 5 | 32 | 100 × 100 | 0 | |
| R = 255 | 0 | 5 | 95 | 100 × 100 | 1.3215 | protanope |
| R = 255 | 95 | 5 | 0 | 100 × 100 | 14.7700 | deuteranope |
| BW Checker | 63 | 5 | 32 | 100 × 100 | 438.04 | |
| BW Checker | 48 | 5 | 48 | 100 × 100 | 444.014 | |
| BW Checker | 0 | 5 | 95 | 100 × 100 | 460.9 | protanope |
| BW Checker | 95 | 5 | 0 | 100 × 100 | 425.4 | deuteranope |

In general, the myopiagenic value can be normalized to a scale or assigned some other identifier indicative of the contents myopiagenic effect. For example, the value can be presented as a value in a range (e.g., from 1 to 10), as a percentage, or by some other alphanumeric identifier (e.g., as a letter grade), color scale, or description.

Myopiagenic scales for content, such as the scale described above, may be useful in many ways. For example, a scale allows one to rate content (e.g., movies or other video files) as to its myopiagenic effect on a viewer.

A scale also provides an objective way to measure algorithms that modify images, including changing colors of images. They can be used to rate efficacy of algorithms designed to increase or decrease neighboring cone contrast. They can also be used to rate efficacy of algorithms designed to increase or decrease myopiagenicity. For example, one can compare algorithms by comparing the score of a common video file after it is modified using a respective algorithm. In some embodiments, one can compare the effect on myopiagenic reduction of algorithms having differing computational efficiencies using the scale. For instance, one can evaluate the tradeoff between an algorithm that modifies every frame in a video file, versus one that modifies fewer frames (e.g., every other frame, every third frame, etc) Similarly, one can evaluate the tradeoff between algorithms that evaluate every pixel versus sampling pixels within frames.

While the examples herein describe electronic images and videos, the skilled artisan will appreciate that such a scale may be useful in the non-digital world, for example to rate the neighboring cone contrast or myopiagenicity of printed media, including books, newspapers, board games, etc. Light reflected from such physical media could be measured and retinal stimulation could be calculated in the manner set forth above.

E-Readers and Word Processors Designed Using a Myopiagenic Scale

Quantitative myopiagenic scales may be useful in the design of products in addition to evaluating media. For example, myopiagenic scales can be used to evaluate combinations of colors in certain types of displays and identify those color combinations rating favorably on the myopiagenic scale.

Such color combinations are useful when displaying text, in particular, which is commonly displayed using black text on a white background at the maximum contrast allowed by the display. However, it is believed that the high level of contrast between the text and background produces high levels of contrast at a viewer's retina, which in turn leads myopia. Accordingly, it is believed that the myopiagenic effects of reading may be reduced by selecting a color combination offering relatively low overall cone contrast. This may be useful in displaying text in various settings, including but not limited to e-book hardware, e-book software, word processing software, and the like.

Accordingly, a myopiagenic scale, such as the one described above, may be useful for selecting color combinations for displaying text. This can be accomplished by evaluating, using the scale, different combinations of colors for text and background.

By way of example, an exemplary evaluation was performed for a series of color combinations modeled using a 100×100 checkerboard of candidate text and background colors, with varying contrast edges. This pattern provides a stimulus with 50% text color and 50% background color. Other patterns providing different ratios between text and background colors can be used, which may be more representative of certain fonts, spacing, and margins (for example, approximately 5% text color, approximately 10% text color, approximately 15% text color, approximately 20% text color, approximately 25% text color, approximately 30% text color, approximately 35% text color, approximately 40% text color, or approximately 45% text color).

A simulated retina was used having a 100×100 cone pattern in linear row and column grid, and a 1:1 ratio of pixels to cones was used.

For purposes of the example, 8-bit color was assumed. Accordingly, each color was selected with values from 0-255 for each RGB. The available color space was sampled using every color in steps of 50 ($6^3$ values for each of text and background), resulting in a total of $6^6$ or 46,656 combinations in total.

Figure 13:
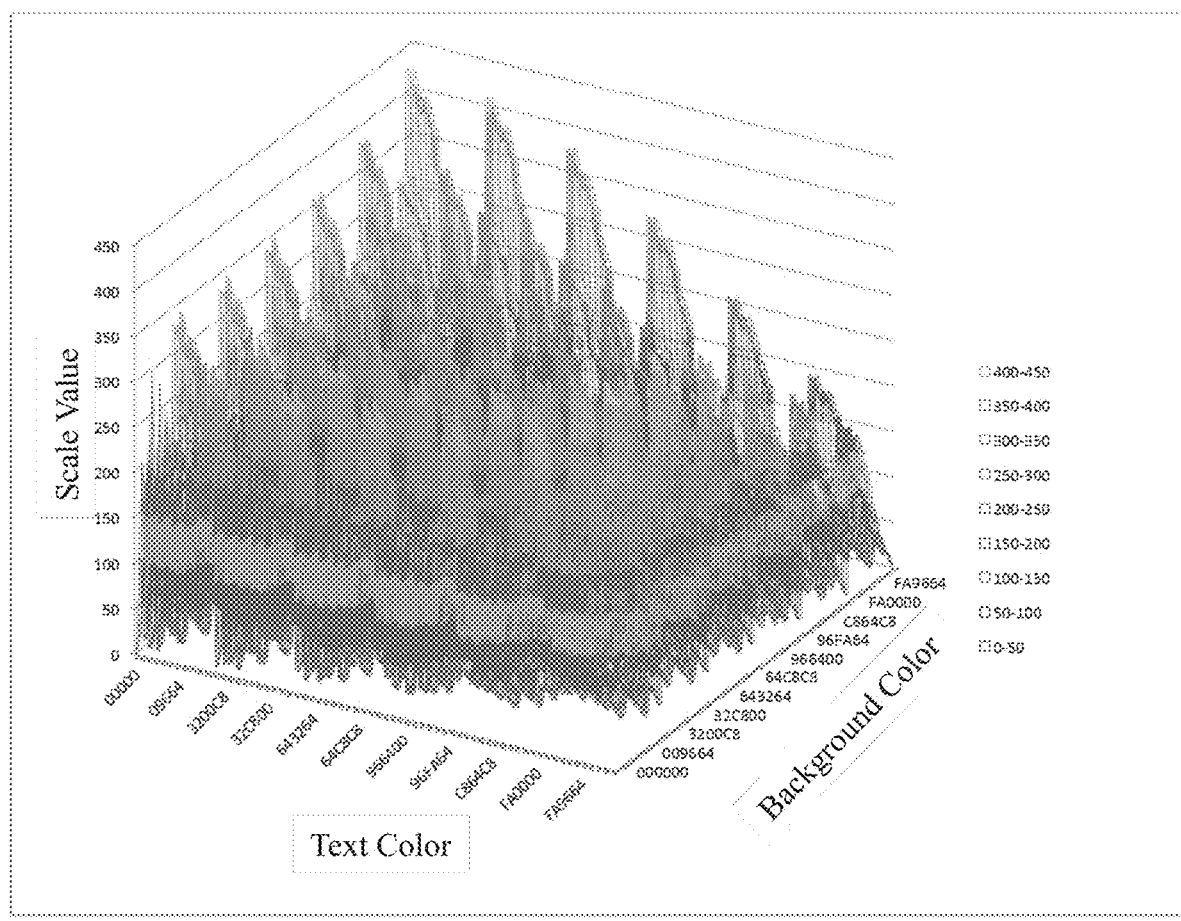
FIG. 13 is a three-dimensional plot of calculated myopiagenic scale values as a function of different text and background colors.

Referring to FIG. 13, a three-dimensional plot shows the results of the experiment. The vertical scale gives the unscaled myopiagenic score. The horizontal axes give the respective Text Color and Background Color. Note that the values on the horizontal scales are expressed in hexadecimal, where the 0-255 RGB values is converted to hex and the colors reported as RRGGBB.

Results range from myopiagenic scores of 0 (white text on white background and black text on black background) to 419.34 (black text on white background). Accordingly, color combinations that provide a reduced myopiagenic score compared to black text on white background (e.g., light green on cyan, with a score of 155) may be selected for use when displaying text.

Obviously, the lowest scores (white on white, black on black) are impractical because they provide no contrast between text and background and cannot be read. However, generally, color combinations with low but non-zero scores can be selected. In some cases, there is a tradeoff in the readability of the text due to low color contrast between the text and background. Accordingly, additional criteria may be considered when selecting e-reader color combinations. For example, an objective index for readability may be considered. Highest readability is expected to occur when the color system can differentiate best between text and background colors (e.g., when L and M values are most different between text and background). This is different from the myopiagenic scale which assumes that the highest myopiagenic effect occurs when adjacent cones have highest differential stimulation. In other words, the myopiagenic effect comes from both differences between text and background (which improves readability but increases myopia), but also from within text and background (which does not improve readability but increases myopia).

By way of example, readability (R) may be scored by surveying respondents. Alternatively, it can be scored based on color contrast between text and background using the LMS system or another color system. Such differences may be quantified using a formula such as the following:

$$R = \alpha_R\left(\frac{(L_1 - L_2)^2}{\frac{1}{2}(L_1 + L_2)}\right) + \beta_R\left(\frac{(M_1 - M_2)^2}{\frac{1}{2}(M_1 + M_2)}\right) + \gamma_R\left(\frac{(S_1 - S_2)^2}{\frac{1}{2}(S_1 + S_2)}\right)$$

Here, L, M, and S are the values described above for which the subscript 1 refers to the text color and 2 refers to the background color. $\alpha_R$, $\beta_R$, and $\gamma_R$ are weighting factors for weighing the relative contributions of cone systems. These factors can be determined empirically. In this example, equal area functions were used for L, M, and S, and values of $\alpha_R=0.17$, $\beta_R=0.84$, $\gamma_R=0.01$ were determined for a population of four observers (three trichromatic females and one male protanope), to use an example. Readability scored using this method is referred to herein as a "Text Readability" score.

Readability can also be scored in other ways, for example the distance between the two colors in CIELAB space $\Delta E^*_{ab}$. This measure of color differentiation was described by Brainard and Stockman (*Vision and Vision Optics*, 2009, "Chapter 10: Colorimetry"):

$$\Delta E^*_{ab} = \sqrt{(\Delta L^*)^2 + (\Delta a^*)^2 + (\Delta b^*)^2}$$

Figure 14A:
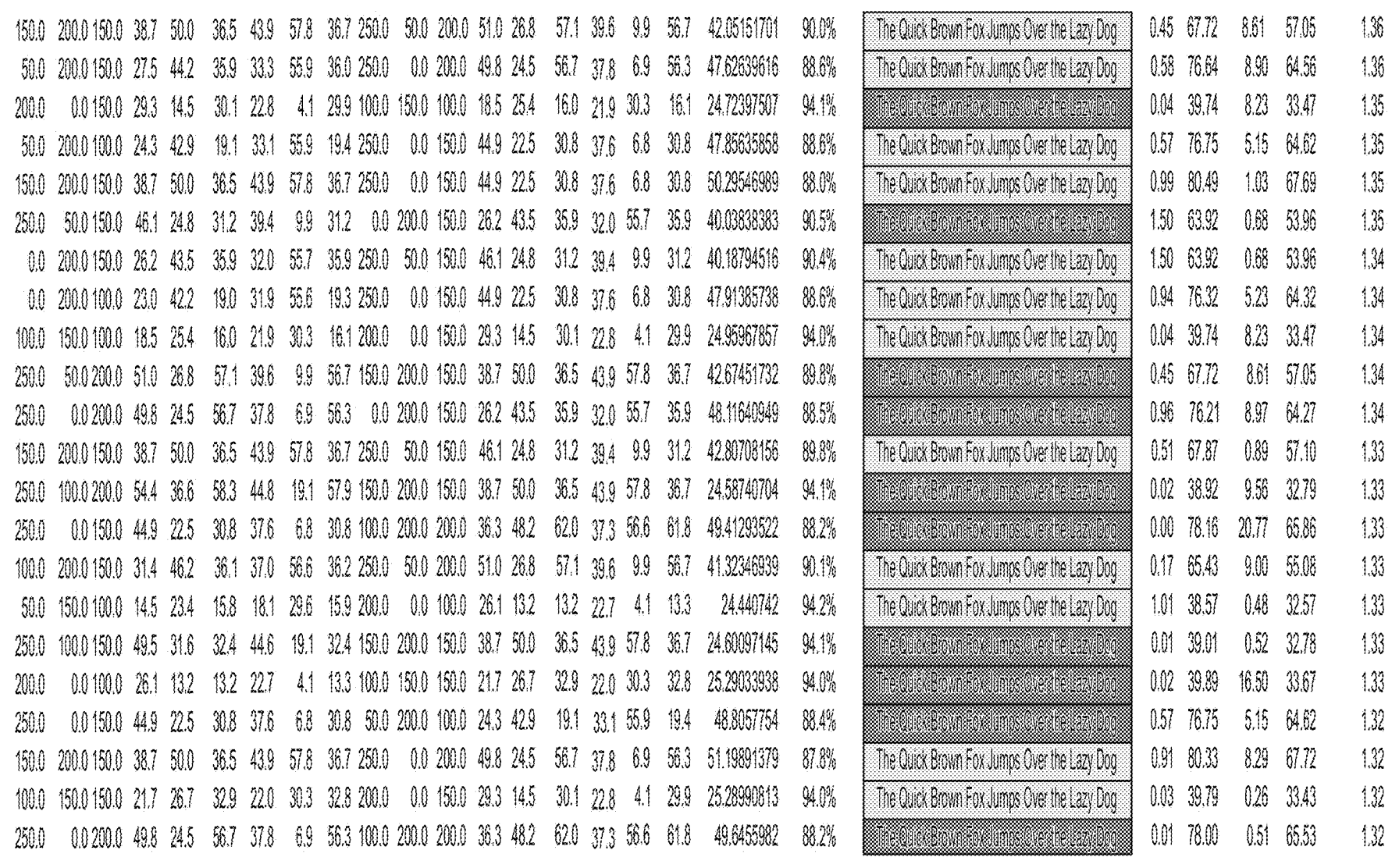
Figure 14A:
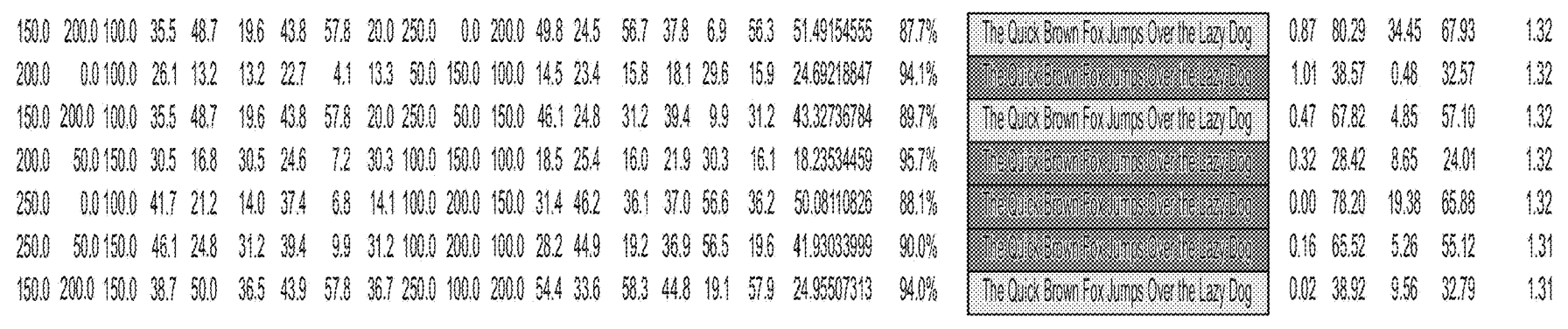
Figure 14B:
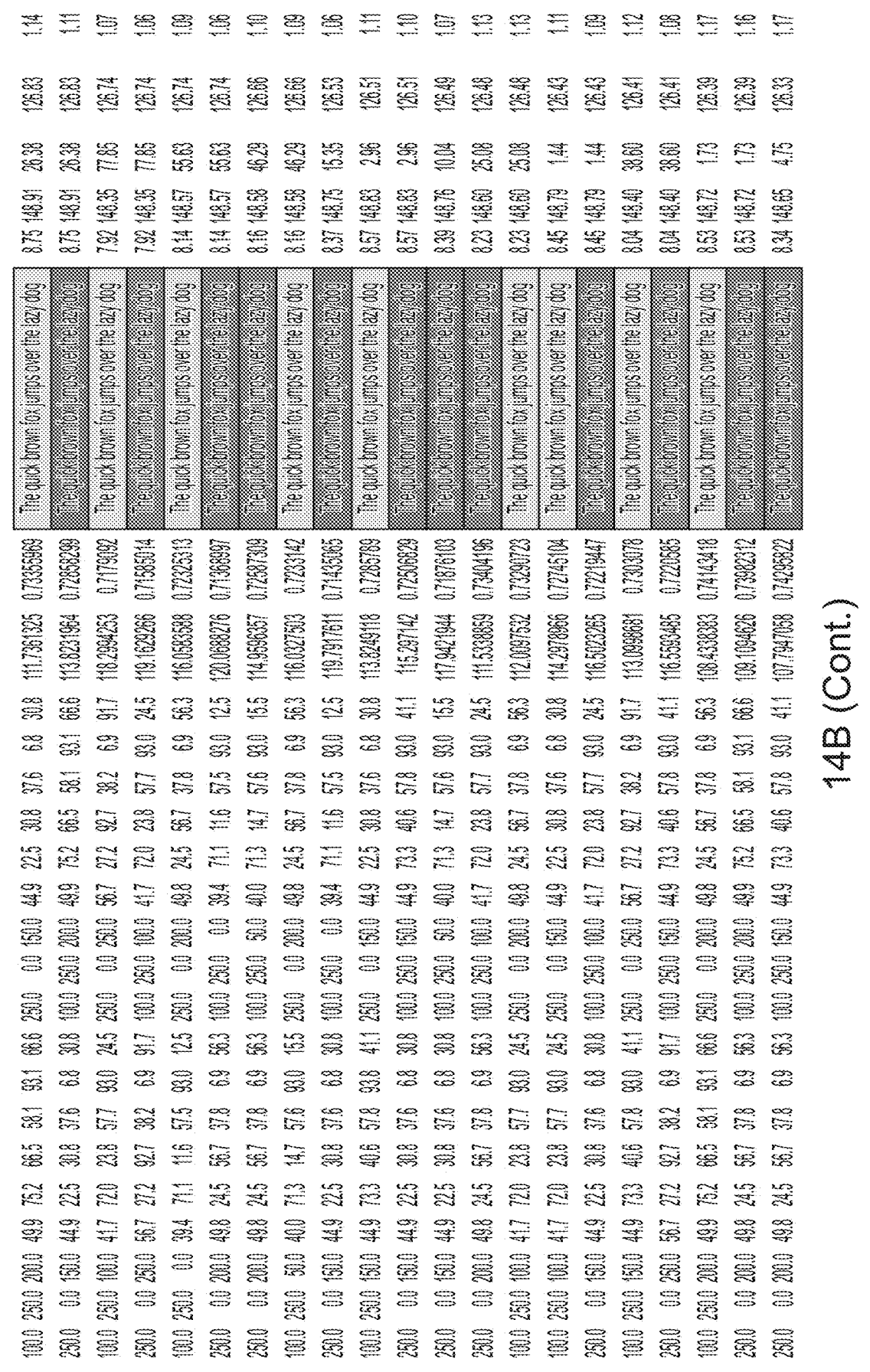
Figure 14B:
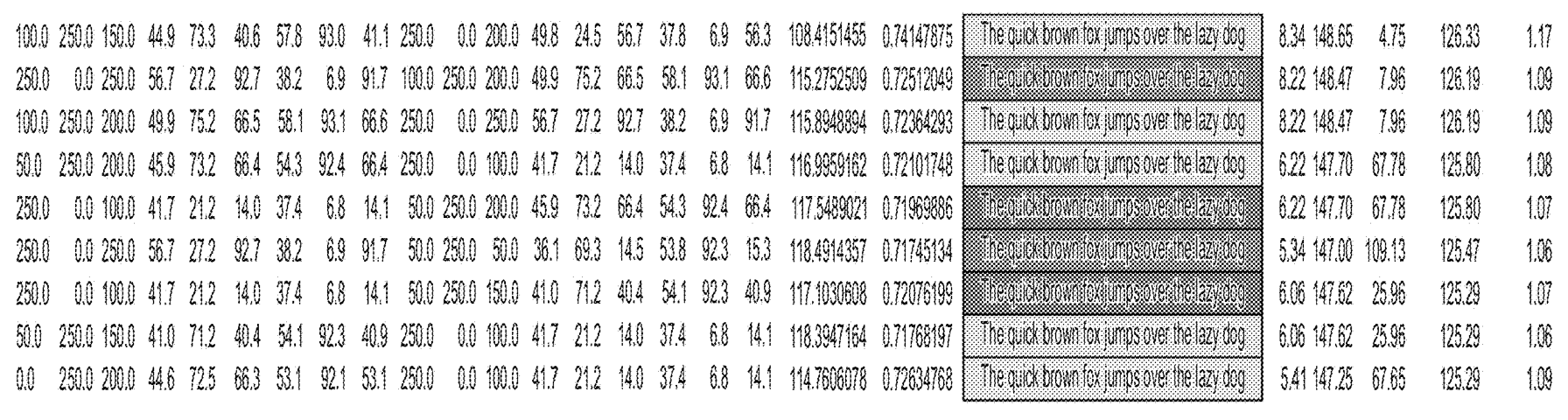

Referring to FIGS. 14A and 14B, results of several color combinations from an experiment are tabulated. In each table, columns 1, 2, and 3 are the RGB values for the background color (each from 0-255), columns 4-6 are the corresponding X, Y, Z tristimulus values, and columns 7-9 the corresponding LMS values. Columns 10, 11, and 12 are the RGB values for the text color (each from 0-255), columns 13-15 are the corresponding X, Y, Z tristimulus values, and columns 16-18 the corresponding LMS values. The calculated myopiagenic scale score based on a 100×100 checkerboard grid with 50% text/50% background is given in column 19 and the % reduction in score relative to black text on white background (row 1) is given in column 20. An example of the color scheme is shown in column 21. The next four columns (22-25) give values related to the readability score. In particular, column 22 gives the values for $$\left(\frac{(L_1-L_2)^2}{\frac{1}{2}(L_1+L_2)}\right), \left(\frac{(M_1-M_2)^2}{\frac{1}{2}(M_1+M_2)}\right), \text{ and } \left(\frac{(S_1-S_2)^2}{\frac{1}{2}(S_1+S_2)}\right)$$

respectively. Column 25 gives the readability score, R, where the values $\alpha_R=0.17$, $\beta_R=0.84$, $\gamma_R=0.01$ are used. Column 26 provides a composite score that consists of the ratio readability/myopia score.

It is instructive to consider certain examples to illustrate the importance of considering readability when identifying text/background color combinations for text rendering. For example, consider a first color combination having RGB values of (200, 150, 150) for background and (100, 150, 200) for text, respectively, and a second color combination having RGB values of (250, 150, 100) for background and (250, 150, 150) for text, respectively. FIG. 15A shows a table in which columns 1, 2, and 3 are the RGB values for the background color, columns 4-6 are the corresponding X, Y, Z tristimulus values, and columns 7-9 the corresponding LMS values. Columns 10, 11, and 12 are the RGB values for the text color, columns 13-15 are the corresponding X, Y, Z tristimulus values, and columns 16-18 the corresponding LMS values. Column 19 shows the myopiagenic scale score and column 20 shows the percent reduction (as a decimal) from black text on white background; column 21 shows an example of text rendered using the color combination. Columns 22-24 give the same parameters as columns 22-24 in FIG. 14, and column 25 gives the readability score. Accordingly, using the scale described above, the myopia scores for the first and second combinations are similar (both ~18). As is evident (at least anecdotally) from the example text in column 21, the first color combination is easier to read than the second color combination. This is borne out by their relative readability scores, which are approximately 2.0 and 0.1, respectively.

Figure 15B:
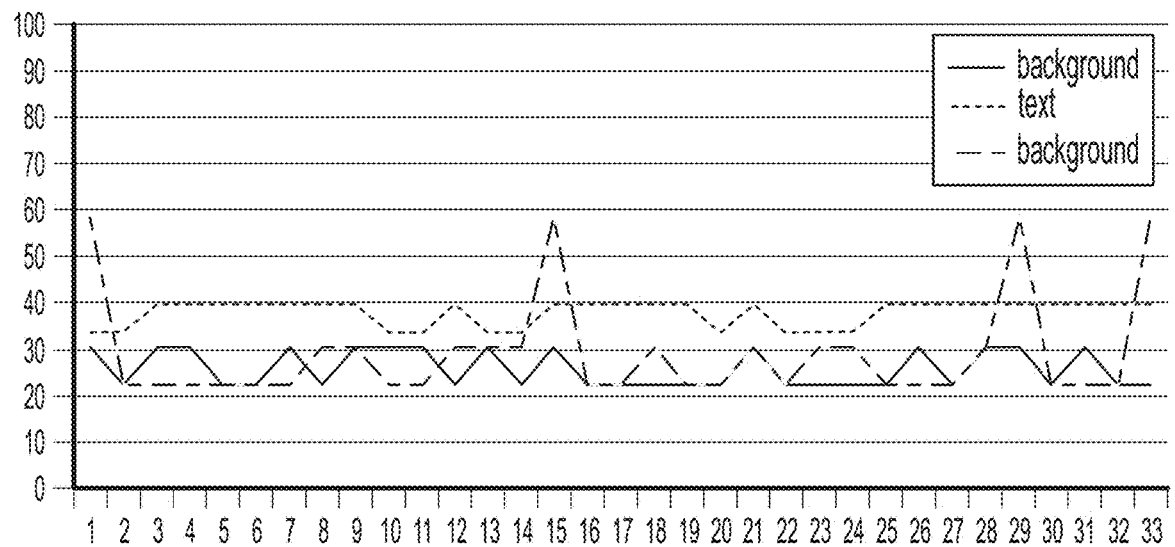
FIG. 15B is a plot showing calculated cone stimulation from a strip of text between two strips of background for the color combination specified in the first row of the table in FIG. 15A.
Figure 15C:
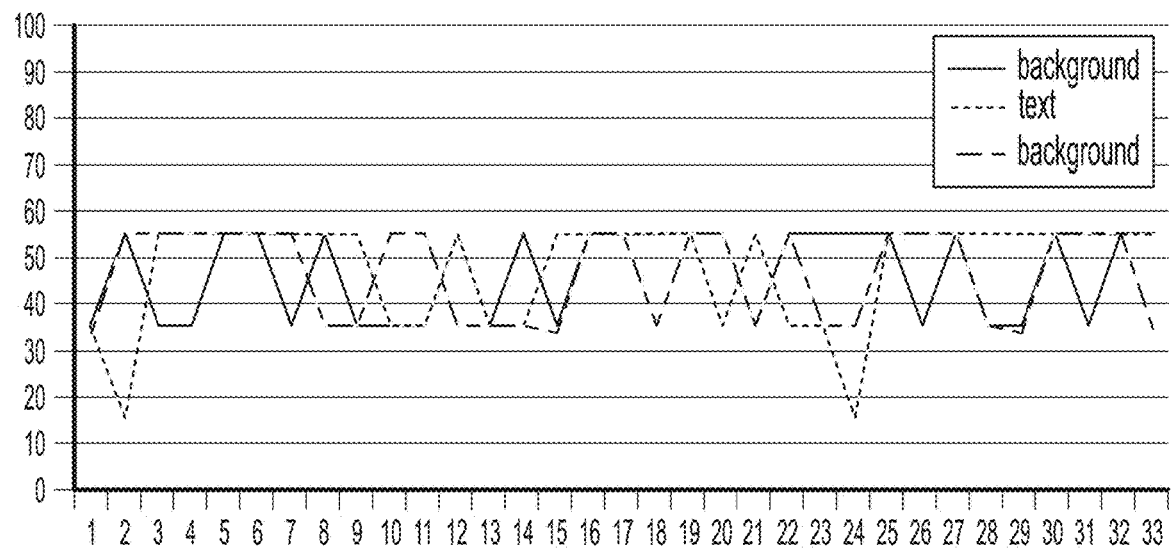
FIG. 15C is a plot showing calculated cone stimulation from a strip of text between two strips of background for the color combination specified in the second row of the table in FIG. 15A.

This is further illustrated in the plots shown in FIGS. 15B and 15C, respectively, which simulate cone stimulation for a stripe of text between two stripes of background across three rows having 33 cones each. FIG. 15B shows simulated cone stimulation for the first color combination. In general, the text and cones have different levels of stimulation with text stimulation levels varying approximately within a range from 32 to 40. With the exception of a few peaks of high stimulation (in this example, resulting from simulated S cones), the background stimulation levels vary within a lower, largely non-overlapping range approximately from 22 to 30.

FIG. 15C shows cone stimulation levels for the second color combination. Here, variance within text and background is similar to variance between text and background. Both text and background have larger variance compared to the first color combination (ranging from approximately 35 to 55, with the exception of a few cones having lower stimulation values due to background, in this example from simulated S cones). Cone stimulation of text overlaps with cone stimulation of background.

Figure 16B:
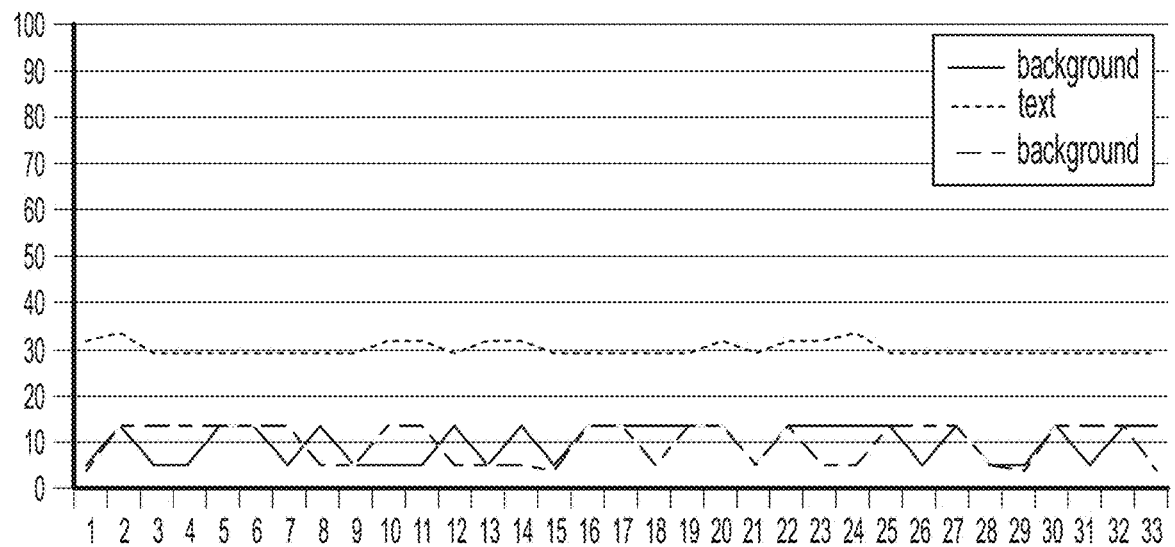
FIG. 16B is a plot showing calculated cone stimulation from a strip of text between two strips of background for the color combination specified in the first row of the table in FIG. 16A.
Figure 16C:
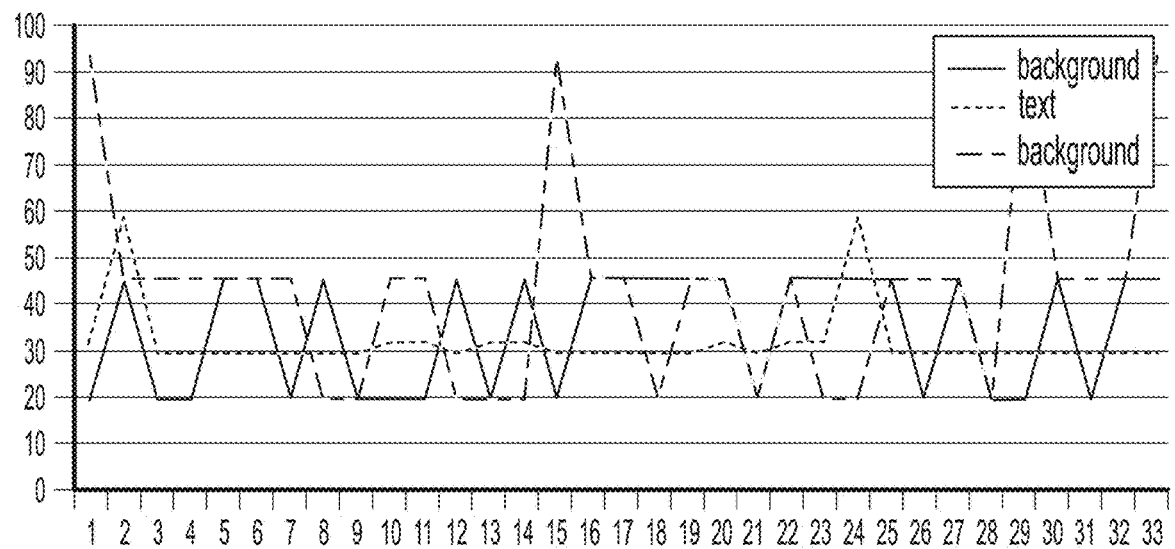
FIG. 16C is a plot showing calculated cone stimulation from a strip of text between two strips of background for the color combination specified in the second row of the table in FIG. 16A.

FIGS. 16A-16C illustrate the same principle for two further color combination examples. Referring to FIG. 16A, the first color combination has RGB values (150, 150, 150) for background and (150, 50, 50) for text. The second color combination has RGB values (250, 100, 250) for background and (150, 150, 200) for text. Again, anecdotally, the first color combination is significantly more readable than the second color combination. Columns 1-26 shows the same parameters as columns 1-26 in FIG. 15A.

FIG. 16B show a plot of cone stimulation for a stripe of text between two stripes of background for the first color combination. The text and background have significantly different levels of stimulation and variance for within the text and within the background are low compared to variance between text and background levels.

FIG. 16C show a plot of cone stimulation for a stripe of text between two stripes of background for the second color combination. Variance within text and background is similar to variance between text and background. Both text and background have larger variance compared to the first color combination and cone stimulation of text overlaps with cone stimulation of background.

While commercially-available e-readers include modes of operation that display text in color combinations other than black and white that may have a reduced myopiagenic effect compared to black text on a white background, it is believed that the disclosed implementations provide color combinations offering substantially greater reductions. For example, the NookColor offers "color text modes" such as "Night," "Gray," "Butter," "Mocha," and "Sepia" in addition to "Day" (basic black text against white background (see, e.g., http://www.dummies com/how-to/content/nook-tablet-text-and-brightness-tools.html). In particular, "Night" is described as "white type against a black or gray background." "Gray" is "black text on a light gray background." "Butter" uses "dark brown text against a pale yellow page." "Mocha" is "white text against a light brown backdrop," and "sepia" is "black text against a yellow-brown page." It is instructive to calculate myopia scores for these modes based on estimated RGB values (8-bit) corresponding to these descriptions using the LMS myopia model described above. These estimates and corresponding scores, along with readability values, R, are summarized in table 2, below.

TABLE 2

Myopia and Readability Scores for Estimated NookColor Modes

| | Background | | | Text | | | | Reduction | Read- | Com- |
|---|---|---|---|---|---|---|---|---|---|---|
| Mode | R | G | B | R | G | B | Score | % | ability | posite |
| Night | 0 | 0 | 0 | 255 | 255 | 255 | 438 | 0 | 208 | 0.48 |
| Gray | 150 | 150 | 150 | 0 | 0 | 0 | 133 | 70 | 64 | 0.48 |
| Butter | 255 | 255 | 224 | 165 | 42 | 42 | 300 | 32 | 171 | 0.57 |
| Mocha | 200 | 100 | 100 | 255 | 255 | 255 | 200 | 54 | 119 | 0.60 |
| Sepia | 175 | 175 | 21 | 0 | 0 | 0 | 190 | 57 | 88 | 0.47 |

Accordingly, it is believed that such modes offer a lowest myopia score of about 133 (as calculated using the scale described above which yields a score of about 438 for black (0, 0, 0) text on white (255, 255, 255) background) and a readability/myopia score ratio in a range from about 0.47 to 0.60.

As is evident from the tables shown in FIGS. 14A and 14B, color combinations having a myopia score using the LMS myopia scale of less than about 130 are possible (e.g., about 120 or less, about 110 or less, about 100 or less, about 90 or less, about 80 or less, about 70 or less, about 60 or less, about 50 or less, about 40 or less, about 30 or less, such as from about 20 to about 30). Compared to black and white text, such colors can offer an improvement in myopia reduction of about 65% or more (e.g., about 70% or more, about 75% or more, about 80% or more, about 85% or more, about 90% or more, about 95% or more). Color combinations having a composite readability/myopia score of 0.80 or more are possible (e.g., 0.85 or more, 0.90 or more, 0.95 or more, 1.00 or more, 1.05 or more, 1.10 or more, 1.15 or more, 1.20 or more, 1.25 or more, 1.30 or more, 1.35 or more, 1.40 or more, such as 1.45).

In general, e-reader or word processing solutions based on the above may be implemented in a variety of ways. For example, in an e-reader with a color display or an e-reader application on a mobile device, color combinations with favorable myopiagenic scores and readability scores may be selected by the user as an option. For example, during setup or via a settings menu, the e-reader can present the user with a variety of color combination options, from which the user can selected a desirable choice. This is advantageous because preferred color combinations are expected to vary from user to user and providing a selection of choices will allow each user to use a color combination most desirable to them. By analogy, word processing solutions could be determined in a similar fashion.

Monochrome e-readers, on the other hand, such as those using electrophoretic displays, may be used having color combinations have reduced myopiagenic scores and relatively good readability based on scales such as the those described above. In some implementations of monochrome e-readers, each pixel is composed of one or more "microcapsules" containing two types of pigmented particles having opposite charge. When a charge is applied to a particular pixel, the particles having like charge are repelled from one side of the pixel to the other, and those having opposite charge are attracted. Accordingly, by reversing the charge on the pixel, the pixel can take on the color of one pigment or the other, or various combinations of the two depending on how long the charge is applied. According, in embodiments, pigments can be selected (alone or in combination with black and/or white pigments) to correspond to color combinations that have reduced myopiagenic scores relative to black and white pigments. When displayed, such pigment combinations can reduce contrast between adjacent neurons of the retina and/or reduce center-surround antagonism.

Figure 17:
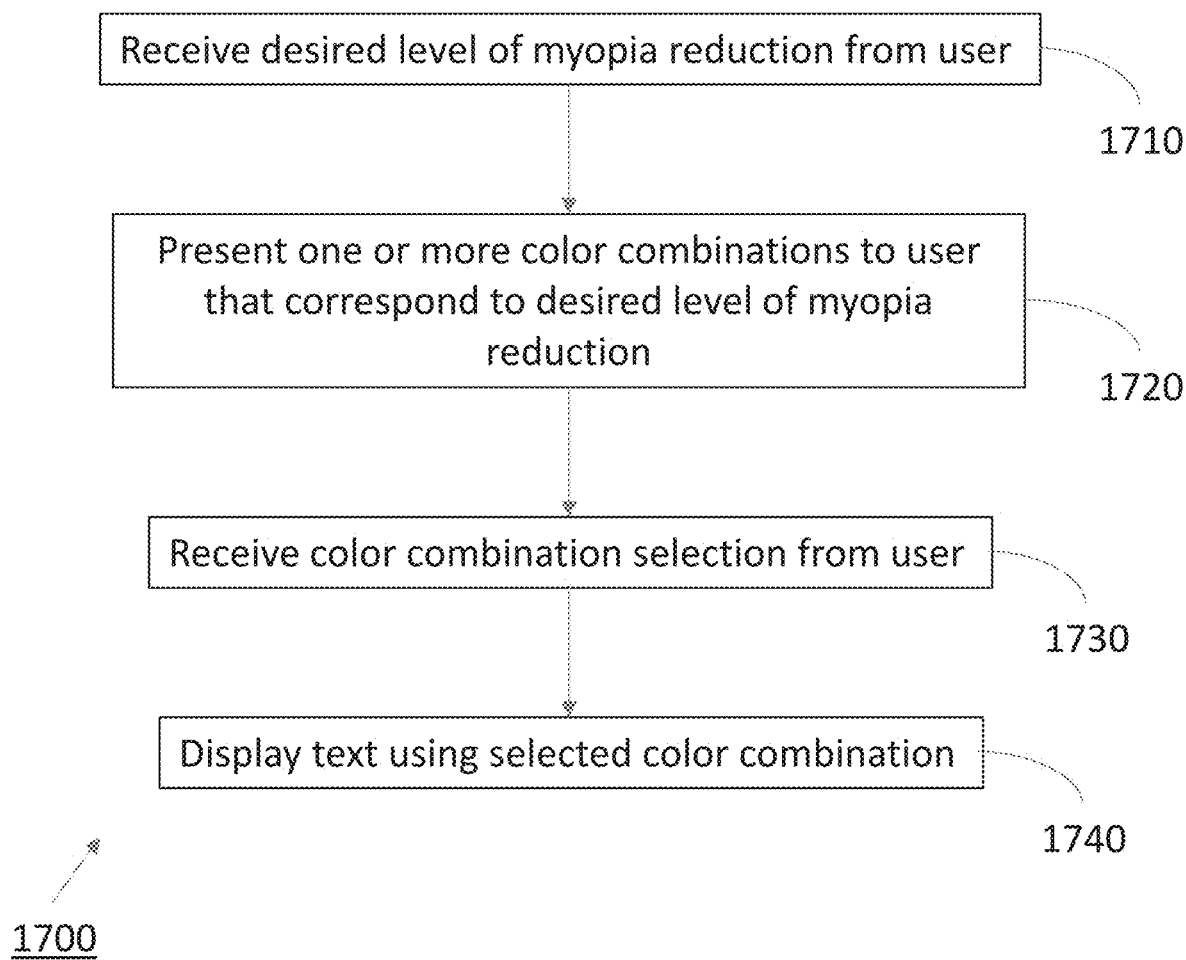
FIG. 17 is a flowchart showing an algorithm for displaying an e-book with a combination of colors for text and background that have a reduced myopiagenic effect compared to black text on white background.

In some embodiments, a user can input a desired level of myopia reduction and the e-reader returns a selection of color combinations that correspond to the desired level. For example, FIG. 17 shows an algorithm 1700 in which a user can select text-background color combinations having a desired level of myopia reduction. Here, as part of the e-reader setup or within a menu of options that are part of the e-reader's operating system, for example, the e-reader presents the user with an interface, such as an input box, slider, dropdown box, radio buttons, or other input tool, in which the user can input a desired level of myopia reduction. The desired level can be a minimum amount of myopia reduction, a range of myopia reduction values, or a single value indicative of the desired level. Levels may be expressed as a percentage (e.g., where the most myopiagenic combination corresponds to 0% reduction and the most myopia reducing combination is 100%) or on some other scale (e.g., from 0 to 10 or some other alphanumeric scale).

Upon receiving the user's input (step 1710), algorithm 1700 retrieves color combinations corresponding to the level designated by the user and presents one or more combinations to the user (step 1720). The color combinations can be calculated using a myopia scale such as by the algorithm, or can be calculated beforehand and stored in a database (e.g., locally or remote) that is accessed by the algorithm.

The number of color combinations presented to the user can vary. For example, the algorithm can present only a subset of combinations that most closely match the user's desired level (e.g., 10 or fewer, 8 or fewer, 5 or fewer). In some implementations, the algorithm can present those color combinations that match the user's desired myopia reduction level within a certain range (e.g., within 10% of the desired level, within 5%, within 2%, within 1%).

Upon viewing the presented color combinations, the user selects the desired combination. Upon receiving the selection (step 1730), the algorithm displays text using the selected color combination (step 1740).

In some embodiments, the algorithm can present color combinations to the user based on one or more criteria in addition to the desired level of myopia reduction. For instance, the user can be presented color combinations based on a readability score (see above) in addition to level of myopia reduction. Alternatively, the user can be presented color combinations based on the preferences gathered from other users or the preferences previously expressed by a particular user and/or derived by previous behavior of a particular user or group of users.

In some embodiments, the algorithm includes a recommendation engine that provides a selection of myopia-reducing color combinations based on the nature of content in the e-book. For instance, the recommendation can vary depending on whether the e-book is primarily text (e.g., a novel or nonfiction book), contains both text and figures (e.g., a textbook, magazine, or newspaper), or is primarily figures (e.g., a graphic novel or comic). Recommended color combinations for different e-book content can be based on a myopiagenic scale (e.g., the LMS scale described above) which is used to evaluate the myopiagenic effect of different types of content. Alternatively, or additionally, recommendations can be based on data collected and observed about user preferences (e.g., the individual user in front of the screen at the moment, broad sets of user data about which is accumulated over time from many users, or both) that may be preferable or suitable for e-reading different types of content.

In certain implementations, an e-reader can include modes for users: a conventional mode that displays e-books using conventional color schemes, and a myopia-safe mode for displaying e-books using a color combination with a reduced myopiagenic effect compared to the conventional mode. In other words, different color combinations can be associated with different accounts on device. For example, an e-reader can feature a user experience that allows a parent to create settings for children (e.g., one or more) as well as themselves that have different myopia reduction levels. In other words, kids may not be able to select color combinations when operating the e-reader under their account (or at least have a reduced ability to change display colors). Accordingly, in certain implementations, an administrator (e.g., adult account) can associate color combinations with a myopia-reduced mode which will then be used by the e-reader when e-books are accessed using certain user accounts (e.g., children's accounts).

Moreover, in certain embodiments, the color combinations used to present text and background can vary (automatically, or upon prompting) over time. For instance, in some embodiments, a myopia-reduced mode can begin a reading session using a color combination have a first level of myopia reduction and change the color combination as the reading session progresses. For example, colors with increasing myopia reduction can be used as a reading session progresses (e.g., as measured by time or progress in reading the content). The color changes can happen automatically. Alternatively, the user can be prompted to change the color combination as the reading session progresses. In some embodiments, the e-reader can change between color combinations that have similar myopia scores as a reading session progresses, e.g., simply to present a change for the user. Myopia-reduced color combinations can be implemented in an e-reader in a variety of ways. For example, myopia-reduced color combinations can be included as part of the operating system of the e-reader as discussed above. Alternatively, the myopia-reduced color combinations can be implemented via software as an add-on to existing e-reader programs or as standalone e-reader applications that can be installed on an e-reader, other mobile device, or any other device used for reading e-books.

In general, any format e-book can be displayed using a combination of colors that have a reduced myopia potential compared to black and white, including (without limitation) Broadband eBooks (BBeB) (e.g., e-book files using extensions .lrf; .lrx), Comic Book Archive file (e.g., e-book files using file extensions .cbr (RAR); .cbz (ZIP); .cb7 (7z); .cbt (TAR); .cba (ACE)), Compiled HTML (e.g., e-book files using extension .chm), DAISY—ANSI/NISO Z39.86, DjVu (e.g., e-book files using extension .djvu), DOC (e.g., e-book files using extension .DOC), DOCX (e.g., e-book files using extension .DOCX), EPUB (e.g., e-book files using extension .epub), eReader (e.g., e-book files using extension .pdb), FictionBook (e.g., e-book files using extension .fb2), APABI (e.g., e-book files using extensions .xeb; .ceb), Hypertext Markup Language (e.g., e-book files using extensions .htm; .html and typically auxiliary images, js and css), iBook (e.g., e-book files using extension .ibooks), IEC 62448, INF (e.g., e-book files using extension .inf), KF8 (Amazon Kindle) (e.g., e-book files using extensions .azw3; .azw; .kf8), Microsoft LIT (e.g., e-book files using extension .lit), MOBI or Mobipocket (e.g., e-book files using extensions .prc; .mobi), Multimedia eBooks (e.g., e-book files using extensions .exe or .html), Newton eBook (e.g., e-book files using extension .pkg), Open Electronic Package (e.g., e-book files using extension .opf), Portable Document Format (e.g., e-book files using extension .pdf), Plain text files (e.g., e-book files using extension .txt), Plucker (e.g., e-book files using extension .pdb), PostScript (e.g., e-book files using extension .ps), Rich Text Format (e.g., e-book files using extension .rtf), SSReader (e.g., e-book files using extension .pdg), Text Encoding Initiative (e.g., e-book files using extension .xml), TomeRaider (e.g., e-book files using extensions .tr2; .tr3), and Open XML Paper Specification (e.g., e-book files using extensions .oxps, .xps).

Aspects of the systems and methods described here can be implemented in digital electronic circuitry, or in computer software, firmware, or hardware, including the structures disclosed in this specification and their structural equivalents, or in combinations of one or more of them. For example, in some implementations, the electronic processing modules disclosed above can be implemented using digital electronic circuitry, or in computer software, firmware, or hardware, or in combinations of one or more of them.

The term "electronic processing module" encompasses all kinds of apparatus, devices, and machines for processing data and/or control signal generation, including by way of example a programmable processor, a computer, a system on a chip, or multiple ones, or combinations, of the foregoing. The module can include special purpose logic circuitry, e.g., an FPGA (field programmable gate array) or an ASIC (application specific integrated circuit). The module can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The module and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes described above can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a flat panel display, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computing system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

FIG. 18 shows an example electronic processing module 800 that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the module 800.

The input/output device 840 provides input/output operations for the module 800. In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 860. In some implementations, mobile computing devices, mobile communication devices such as smart phones or tablet computers, and other devices can be used.

Other embodiments are in the following claims.

What is claimed is:

1. A system, comprising:
  a full-color electronic display;
  an eye-tracking module arranged to track an eye of a viewer of the display during operation of the system;
  at least one programmable processor; and
  a machine-readable medium storing instructions that, when executed by the at least one programmable processor to perform operations, comprising:
    assessing uncorrected image data comprising one or more image frames, wherein the assessing comprises determining an initial color of one or more pixels in at least one of the image frames;
    assessing, based on data from the eye-tracking module, a location on the display where the viewer's eye is looking;
    modifying a color of one or more of the pixels from its initial color to a modified color based on the location of the pixel relative to the location on the display where the viewer's eye is looking and the initial color of the pixel; and
    displaying, on the display, the one or more image frames in which the one or more pixels have the modified color and other pixels have their initial color,
  wherein the initial color for each pixel is defined by initial r, g, b values corresponding to an intensity value for a red sub-pixel, a green sub-pixel, and a blue sub-pixel, respectively,
  wherein only pixels with r>g and r>b are changed from their initial color to a modified color by reducing the initial r-value to a modified r-value, and
  wherein a reduction of the initial r-value to the modified r-value is proportional to a difference (r−g).

2. The system of claim 1, wherein the one or more pixels with the modified color are at the location on the display where the viewer's eye is looking.

3. The system of claim 2, wherein pixels not at the location on the display where the viewer's eye is looking are displayed with their initial color.

4. The system of claim 1, wherein the one or more pixels with the modified color are at the locations on the display where the viewer's eye is not looking.

5. The system of claim 4, wherein pixels at the location on the display where the viewer's eye is looking are displayed with their initial color.

6. The system of claim 1, wherein only the color of red-hued pixels is modified.

7. The system of claim 1, wherein for pixels that are modified, the modified color has a reduced red saturation compared to the initial color.

8. The system of claim 1, wherein the system is a mobile device and the eye-tracking module comprises a front facing camera.

9. The system of claim 1, wherein the system is a virtual reality display system or an augmented reality display system.

10. A method, comprising:
  assessing uncorrected image data comprising one or more image frames, wherein the assessing comprises determining an initial color of one or more pixels in at least one of the image frames;
  assessing a location on a full-color electronic display where a viewer's eye is looking;
  modifying a color of one or more of the pixels from its its initial color to a modified color based on the location of the pixel relative to the location on the display where the viewer's eye is looking and the initial color of the pixel; and
  displaying, on the display, the one or more image frames in which the one or more pixels have the modified color and other pixels have their initial color,
  wherein the initial color for each pixel is defined by initial r, g, b values corresponding to an intensity value for a red sub-pixel, a green sub-pixel, and a blue sub-pixel, respectively,
  wherein only pixels with r>g and r>b are changed from their initial color to a modified color by reducing the initial r-value to a modified r-value, and
  wherein a reduction of the initial r-value to the modified r-value is proportional to a difference (r−g).

11. The method of claim 10, wherein the one or more pixels with the modified color are at the location on the display where the viewer's eye is looking.

12. The method of claim 11, wherein pixels not at the location on the display where the viewer's eye is looking are displayed with their initial color.

13. The method of claim 10, wherein the one or more pixels with the modified color are at the locations on the display where the viewer's eye is not looking.

14. The method of claim 13, wherein pixels at the location on the display where the viewer's eye is looking are displayed with their initial color.

15. The method of claim 10, wherein for pixels that are modified, the modified color has a reduced red saturation compared to the initial color.

16. The method of claim 10, wherein the location on the display where a viewer's eye is looking is assessed using a camera for tracking the viewer's eye.

17. The method of claim 16, wherein the camera is a front-facing camera of a mobile device comprising the display.

* * * * *